US010887478B2

(12) United States Patent
Tokuchi

(10) Patent No.: US 10,887,478 B2
(45) Date of Patent: Jan. 5, 2021

(54) INFORMATION PROCESSING APPARATUS AND NON-TRANSITORY COMPUTER READABLE MEDIUM FOR PROVIDING NOTIFICATION OF A FUNCTION SELECTED USING AN AERIAL IMAGE

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 48 days.

(21) Appl. No.: 16/052,645

(22) Filed: Aug. 2, 2018

(65) Prior Publication Data

US 2019/0245988 A1 Aug. 8, 2019

(30) Foreign Application Priority Data

Feb. 6, 2018 (JP) .................................. 2018-019327

(51) Int. Cl.
*H04N 1/00* (2006.01)
*G09G 3/00* (2006.01)

(52) U.S. Cl.
CPC ..... *H04N 1/00411* (2013.01); *H04N 1/00267* (2013.01); *H04N 1/00474* (2013.01); *H04N 1/00493* (2013.01); *H04N 1/00514* (2013.01); *G09G 3/003* (2013.01)

(58) Field of Classification Search
CPC .................................................. H04N 1/00267
See application file for complete search history.

(56) References Cited

U.S. PATENT DOCUMENTS

| 9,972,231 | B1* | 5/2018 | Furutani | G03G 15/5016 |
| 2010/0097447 | A1* | 4/2010 | Tomisawa | H04N 13/305 |
| | | | | 348/51 |
| 2011/0093778 | A1* | 4/2011 | Kim | G06F 3/041 |
| | | | | 715/702 |
| 2011/0128555 | A1* | 6/2011 | Rotschild | G02B 30/50 |
| | | | | 356/625 |
| 2013/0162762 | A1* | 6/2013 | Cohen | H04N 13/128 |
| | | | | 348/42 |
| 2016/0269578 | A1* | 9/2016 | Nozawa | G06T 11/60 |
| 2016/0295031 | A1* | 10/2016 | Tobinaga | H04N 1/00267 |
| 2017/0358323 | A1* | 12/2017 | Wagatsuma | B41J 3/44 |
| 2018/0157202 | A1* | 6/2018 | Watanabe | G03G 15/6502 |
| 2018/0205839 | A1* | 7/2018 | Suzuki | H04N 1/00482 |
| 2018/0218178 | A1* | 8/2018 | Chung | H04N 13/361 |
| 2019/0146653 | A1* | 5/2019 | Ikuta | G09G 3/002 |
| | | | | 715/863 |
| 2019/0243469 | A1* | 8/2019 | Kuribayashi | G09G 5/02 |
| 2019/0279283 | A1* | 9/2019 | Benkar | H04N 9/3185 |
| 2019/0373119 | A1* | 12/2019 | Tokuchi | G06F 3/017 |

FOREIGN PATENT DOCUMENTS

| JP | 2015-060295 | 3/2015 |
| JP | 2016-095634 | 5/2016 |
| JP | 2017-062709 | 3/2017 |

* cited by examiner

*Primary Examiner* — Benjamin O Dulaney
(74) *Attorney, Agent, or Firm* — JCIPRNET

(57) ABSTRACT

An information processing apparatus includes a controller. The controller performs control to provide a notification of a function interrelated with information in a depth direction of an image being displayed in mid-air.

17 Claims, 25 Drawing Sheets

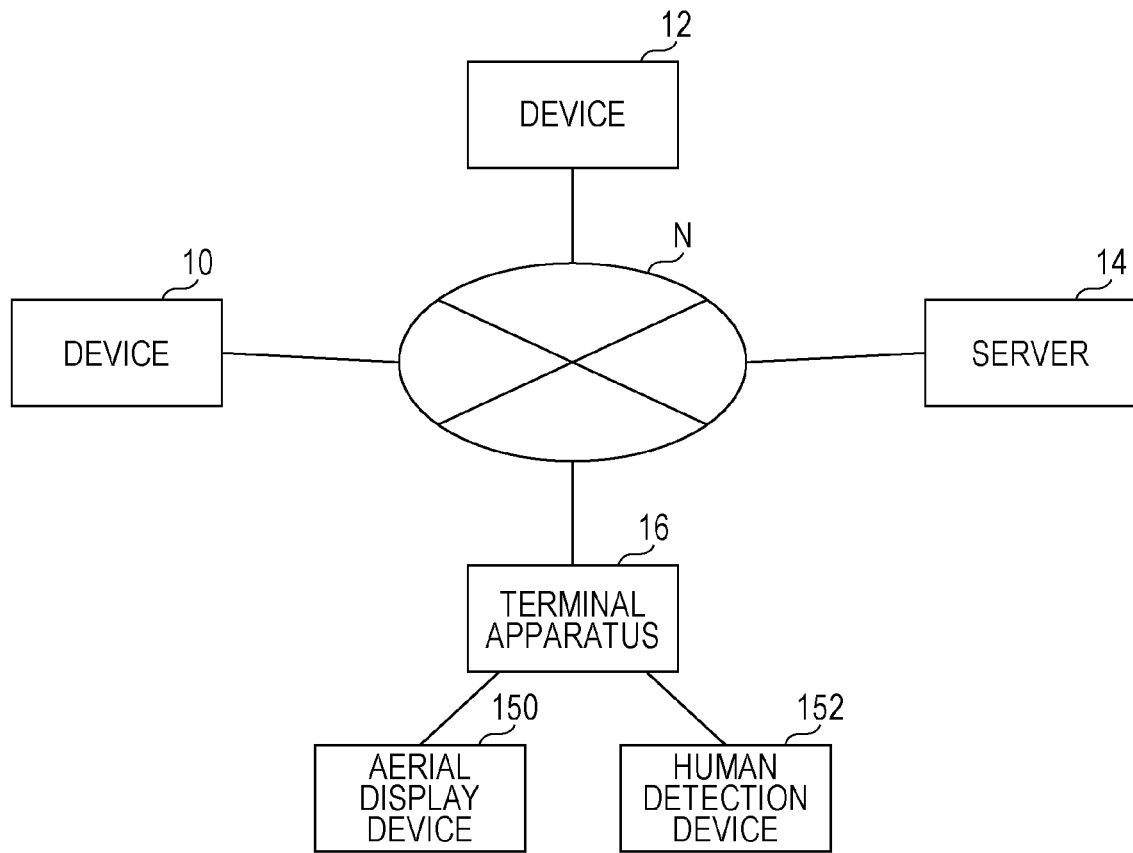
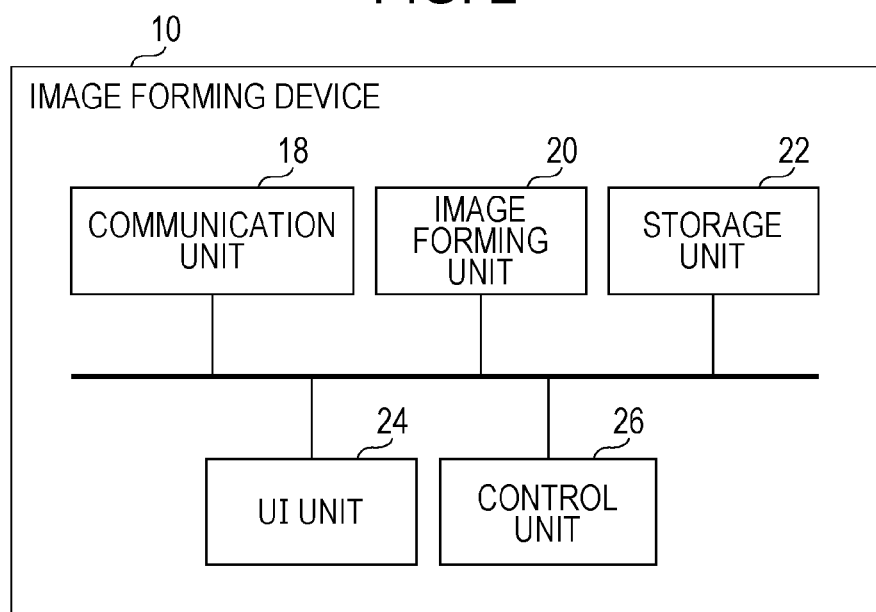

FIG. 6

| DEVICE ID | DEVICE NAME (TYPE) | FUNCTION | IMAGE ID |
|---|---|---|---|
| A | PC | DISPLAY FUNCTION, SAVING FUNCTION, ... | ... |
| B | MULTIFUNCTION DEVICE | PRINTING FUNCTION, SCANNING FUNCTION, COPYING FUNCTION, FACSIMILE FUNCTION, POST-PROCESSING FUNCTION, ... | ... |
| C | PROJECTOR | PROJECTION FUNCTION, ... | ... |
| ... | ... | ... | ... |

FIG. 7

| COMBINATION OF DEVICE IDs | DEVICE NAME (TYPE) | COLLABORATIVE FUNCTION |
|---|---|---|
| A, B | PC (A), MULTIFUNCTION DEVICE (B) | SCAN-AND-TRANSFER FUNCTION |
| | | PRINTING FUNCTION |
| A, C | PC (A), PROJECTOR (C) | PROJECTION FUNCTION |
| | | PRINTING FUNCTION |
| B, C | MULTIFUNCTION DEVICE (B), PROJECTOR (C) | PROJECTION FUNCTION |
| | | PRINTING FUNCTION |
| ... | ... | ... |

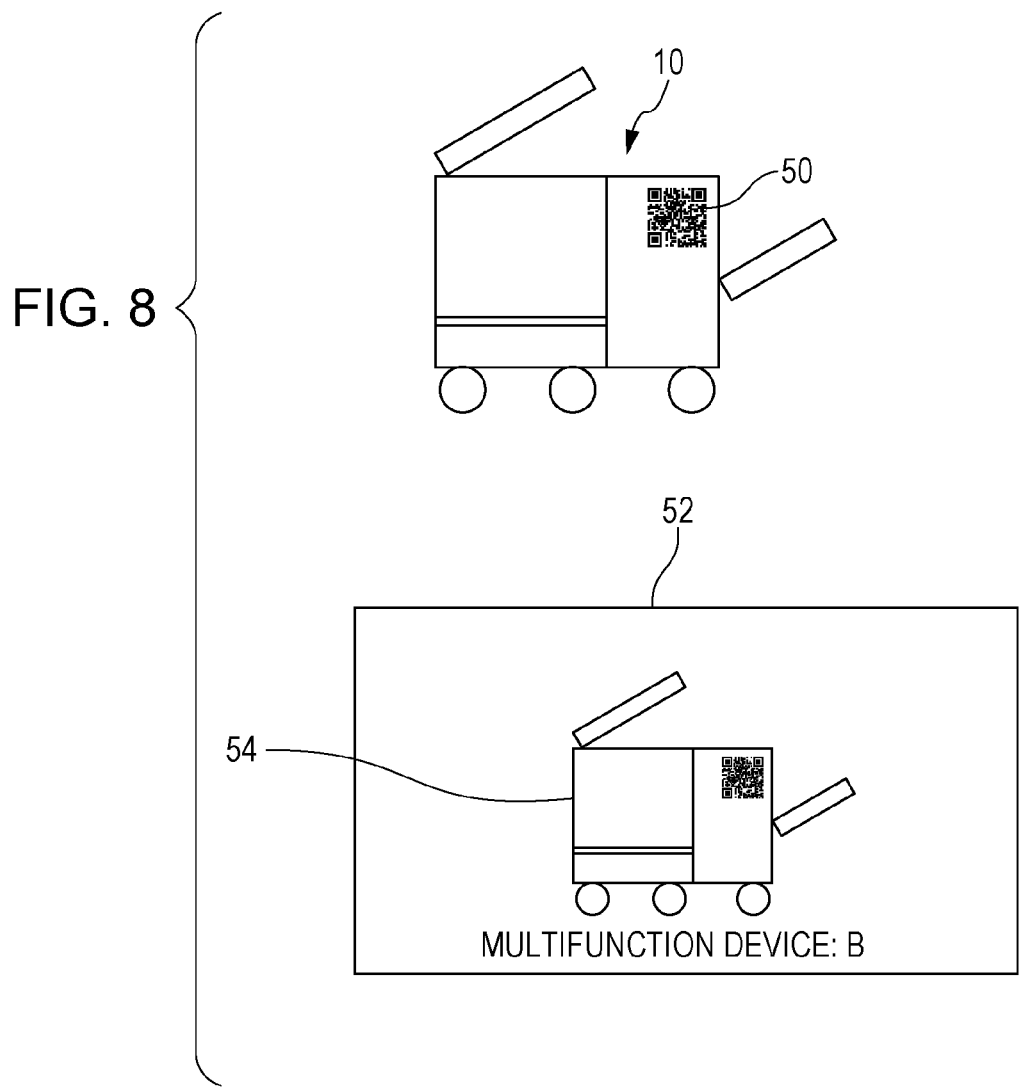

FIG. 17

| DEVICE | DEPTH POSITION | NAME | POSITION INFORMATION (x, y, z) | MULTIFUNCTION DEVICE ||| ROBOT ||| TELEVISION SET |||
|---|---|---|---|---|---|---|---|---|---|---|---|---|
| | | | | FRONT | MIDDLE | BACK | FRONT ||| MIDDLE | BACK | FRONT | MIDDLE | BACK |
| | | | | UI UNIT COVER | CARTRIDGE | SHEET TRANSPORTATION PATH | | CAMERA | ARM | MOVABLE UNIT (LEG) | | | SCREEN | | CONNECTION TERMINAL |
| MULTIFUNCTION DEVICE | FRONT | UI UNIT | | | | | | | | | | | | | |
| | | COVER | | | | | | | | | | | | | |
| | MIDDLE | CARTRIDGE | | | | | | | | | | | | | |
| | | SHEET TRANSPORTATION PATH | | | | | | | COL-3 | | | | | | |
| | BACK | | | | | | | | | | | | | | |
| ROBOT | FRONT | CAMERA | | | | | | | | COL-1 | | | | | |
| | | ARM | | | | | | | | | | | | | |
| | | MOVABLE UNIT (LEG) | | | | | | | | | | | | | |
| | MIDDLE | | | | | | | | | | | | | | |
| | BACK | | | | | | | | | | | | | | |
| TELEVISION SET | FRONT | SCREEN | | | | | | | | | | | | COL-2 | |
| | MIDDLE | | | | | | | | | | | | | | |
| | BACK | CONNECTION TERMINAL | | | | | | | | | | | | | |

| COMBINATION OF FUNCTION IDs | FUNCTION NAME (TYPE) | COLLABORATIVE FUNCTION |
|---|---|---|
| α, β | DATA TRANSMISSION (α), PASSWORD (β) | ... |
| | | ... |
| α, γ | DATA TRANSMISSION (α), AUDIO REPRODUCTION (γ) | ... |
| | | ... |
| β, γ | PASSWORD (β), AUDIO REPRODUCTION (γ) | ... |
| | | ... |
| ... | ... | ... |

| COMBINATION OF IDs | DEVICE NAME, FUNCTION NAME (TYPE) | COLLABORATIVE FUNCTION |
|---|---|---|
| A, α | PC (A), DATA TRANSMISSION (α) | ... |
|  |  | ... |
| A, β | PC (A), PASSWORD (β) | ... |
|  |  | ... |
| B, α | MULTIFUNCTION DEVICE (B), DATA TRANSMISSION (α) | ... |
|  |  | ... |
| ... | ... | ... |

FIG. 30

| COMBINATION OF DEVICE IDs | DEVICE NAME (TYPE) | COLLABORATIVE FUNCTION | CONNECTION ORDER | PRIORITY ORDER |
|---|---|---|---|---|
| A, B | PC (A), MULTIFUNCTION DEVICE (B) | SCAN-AND-TRANSFER FUNCTION | B→A | 1 |
| | | | A→B | 2 |
| | | PRINTING FUNCTION | A→B | 1 |
| | | | B→A | 2 |
| A, C | PC (A), PROJECTOR (C) | PROJECTION FUNCTION | A→C | 1 |
| | | | C→A | 2 |
| | | ... | C→A | 1 |
| | | | A→C | 2 |
| ... | ... | ... | ... | ... |

FIG. 31    130

CANDIDATE COLLABORATIVE FUNCTIONS:
(1) TRANSFERRING DATA SCANNED
   BY MULTIFUNCTION DEVICE (B) TO PC (A)
       EXECUTE?  YES (2) PRINTING DATA SAVED IN PC (A)
       EXECUTE?  YES

FIG. 32    130

CANDIDATE COLLABORATIVE FUNCTIONS:
(1) PRINTING DATA SAVED IN PC (A)
       EXECUTE?  YES (2) TRANSFERRING DATA SCANNED
   BY MULTIFUNCTION DEVICE (B) TO PC (A)
       EXECUTE?  YES

| DEVICE ID | DEVICE NAME (TYPE) | POSITION IN IMAGE | FUNCTION | IMAGE ID |
|---|---|---|---|---|
| A | PC | ... | SCREEN DISPLAY FUNCTION | ... |
| | | ... | DATA SAVING FUNCTION | |
| | | ... | ... | |
| B | MULTIFUNCTION DEVICE | ... | PRINTING FUNCTION | ... |
| | | ... | SCANNING FUNCTION | |
| | | ... | STAPLING FUNCTION | |
| | | ... | ... | |
| ... | ... | ... | ... | ... |

CANDIDATE COLLABORATIVE FUNCTIONS:
(1) DISPLAYING DATA SCANNED
    BY MULTIFUNCTION DEVICE (B) ON SCREEN OF PC (A)
       EXECUTE?   YES (2) TRANSFERRING DATA SCANNED
    BY MULTIFUNCTION DEVICE (B) TO PC (A)
       EXECUTE?   YES

FIG. 36

| DEVICE ID | DEVICE NAME (TYPE) | PORTION | PORTION ID | FUNCTION | PARTIAL IMAGE ID |
|---|---|---|---|---|---|
| A | PC | DISPLAY UNIT | Aa | SCREEN DISPLAY FUNCTION | ... |
| | | MAIN BODY | Ab | DATA SAVING FUNCTION | ... |
| | | ... | ... | ... | ... |
| B | MULTIFUNCTION DEVICE | MAIN BODY | Ba | PRINTING FUNCTION | ... |
| | | READER | Bb | SCANNING FUNCTION | ... |
| | | POST-PROCESSING DEVICE | Bc | STAPLING FUNCTION | ... |
| | | ... | ... | ... | ... |
| C | PROJECTOR | MAIN BODY | Ca | PROJECTION FUNCTION | ... |
| | | ... | ... | ... | ... |
| ... | ... | ... | ... | ... | ... |

| COMBINATION OF PORTIONS OF DEVICES | COMBINATION OF PORTION IDs | COLLABORATIVE FUNCTION |
|---|---|---|
| DISPLAY UNIT OF PC (A), MAIN BODY OF MULTIFUNCTION DEVICE (B) | Aa, Ba | PRINTING FUNCTION |
| | ... | ... |
| MAIN BODY OF MULTIFUNCTION DEVICE (B), MAIN BODY OF PROJECTOR (C) | Ba, Ca | PRINTING FUNCTION |
| | ... | ... |
| READER OF MULTIFUNCTION DEVICE (B), MAIN BODY OF PROJECTOR (C) | Bb, Ca | SCAN-AND-PROJECTION FUNCTION |
| | ... | ... |

INFORMATION PROCESSING APPARATUS AND NON-TRANSITORY COMPUTER READABLE MEDIUM FOR PROVIDING NOTIFICATION OF A FUNCTION SELECTED USING AN AERIAL IMAGE

CROSS-REFERENCE TO RELATED APPLICATIONS

This application is based on and claims priority under 35 USC 119 from Japanese Patent Application No. 2018-019327 filed Feb. 6, 2018.

BACKGROUND

(i) Technical Field

The present invention relates to an information processing apparatus and a non-transitory computer readable medium.

(ii) Related Art

Technologies for displaying three-dimensional images in mid-air have been developed in recent years. Users are able to view three-dimensional images displayed in mid-air from any direction without using accessories such as glasses.

In addition, the position of a user's hand in mid-air is detected by a sensor, thereby allowing the user to perform some operation on an image being displayed in mid-air. For example, a user performs a certain operation on an operation screen being displayed in mid-air to display information, execute an application, control a device, or perform any other suitable processing.

SUMMARY

According to an aspect of the invention, there is provided an information processing apparatus including a controller. The controller performs control to provide a notification of a function interrelated with information in a depth direction of an image being displayed in mid-air.

BRIEF DESCRIPTION OF THE DRAWINGS

Exemplary embodiments of the present invention will be described in detail based on the following figures, wherein:

FIG. 1 is a block diagram illustrating a device system according to a first exemplary embodiment of the present invention;
FIG. 2 is a block diagram illustrating an image forming device according to the first exemplary embodiment;
FIG. 6 illustrates an example device function management table;
FIG. 7 illustrates an example collaborative function management table;
FIG. 8 illustrates a standalone device;
FIG. 17 illustrates an example collaborative function management table for a three-dimensional device image;
FIG. 30 illustrates an example collaborative function management table;
FIG. 31 illustrates an example screen;
FIG. 32 illustrates an example screen;
FIG. 35 illustrates an example screen;
FIG. 36 illustrates an example device function management table.

DETAILED DESCRIPTION

Figure 3:
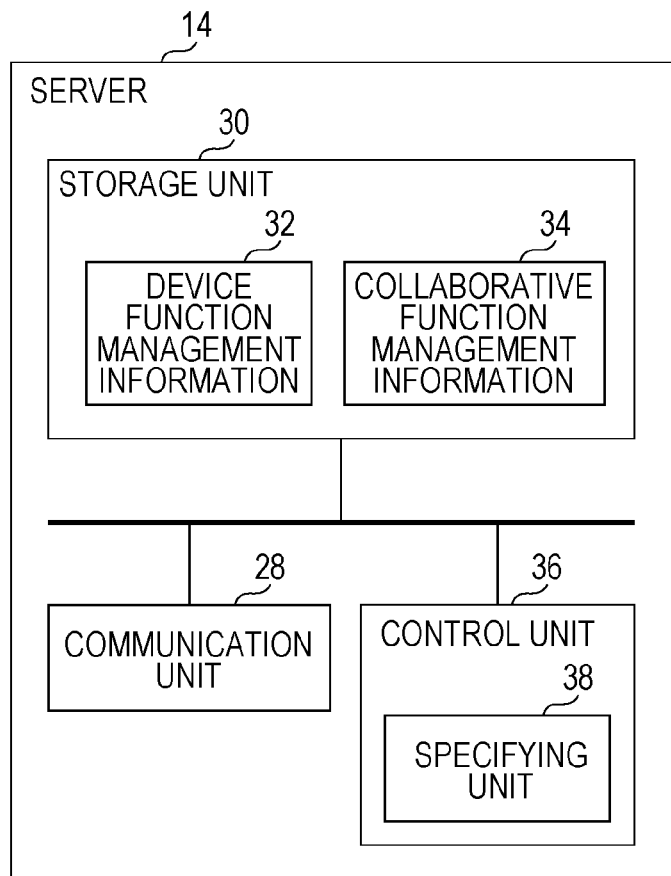
FIG. 3 is a block diagram illustrating a server according to the first exemplary embodiment.

The following describes exemplary embodiments of the present invention with reference to the drawings.

First Exemplary Embodiment

A device system serving as an information processing system according to a first exemplary embodiment of the present invention will be described with reference to FIG. 1. FIG. 1 illustrates an example of the device system according to the first exemplary embodiment.

The device system according to the first exemplary embodiment includes multiple devices (e.g., devices 10 and 12), a server 14, and a terminal apparatus 16. The server 14 is an example of an external device, and the terminal apparatus 16 is an example of an information processing apparatus. In the example illustrated in FIG. 1, the devices 10 and 12, the server 14, and the terminal apparatus 16 have a function of communicating with each other via a communication path N such as a network. It is to be understood that the devices 10 and 12, the server 14, and the terminal apparatus 16 may each communicate with any other device via a different communication path without using the communication path N. In the example illustrated in FIG. 1, the device system includes two devices (i.e., the devices 10 and 12). However, the device system may include one device or three or more devices. Alternatively, the device system may include multiple servers 14 or multiple terminal apparatuses 16.

The devices 10 and 12 are each a device having a specific function. Examples of the device include an image forming device having an image forming function (at least one function among a scanning function, a printing function, a copying function, and a facsimile function), a personal computer (PC), a tablet PC, a smartphone, a mobile phone, a robot (such as a humanoid robot, a non-humanoid, an animal-shaped robot, or any other type of robot), a projector, a display device such as a liquid crystal display, a recording device, a reproduction device, an imaging device such as a camera, a timepiece, a security surveillance camera, a motor vehicle, a two-wheeled vehicle, an aircraft (e.g., an unmanned aerial vehicle, called a drone), a game console, and any type of sensing device (such as a temperature sensor, a humidity sensor, a voltage sensor, or an electric current sensor). Alternatively, the devices 10 and 12 may be each an Internet of Things (IoT) device such as a household electrical appliance, examples of which include a refrigerator, a rice cooker, a microwave oven, a coffee maker, a vacuum cleaner, a washing machine, an air-conditioner, and a lighting device. The device may be a device configured to provide an output to a user, such as an image forming device or a PC, or may be a device configured to provide no output to a user, such as a sensing device. All of the devices that execute a collaborative function described below may be configured to provide an output to a user, or some of them may be configured to provide an output to a user and the other devices may be configured to provide no output to a user. Alternatively, all of the devices may be configured to provide no output to a user. The concept of a device may include general devices. For example, an information device, a video device, an audio device, and other devices may be included in devices according to this exemplary embodiment. Note that each device has a function of transmitting and receiving data to and from other devices.

The server 14 is a device that manages functions of devices. For example, the server 14 manages functions of devices, a collaborative function that uses multiple functions, and so on. The server 14 has a function of transmitting and receiving data to and from other devices.

The server 14 may manage, for each user, functions available to the user. Examples of the functions available to each user include a function provided free of charge to the user and a function provided at cost to the user and purchased by the user. The server 14 may manage, for each user, available-function information (e.g., information on the record of purchased functions) indicating functions available to the user. Since there are also other functions such as functions available free of charge, additional update functions, and functions specially managed by administrators, the server 14 may not necessarily manage functions on the basis of whether purchase is made. A process for purchasing a function is performed by the server 14, for example. It is to be understood that any other device may perform the purchase process.

The terminal apparatus 16 is a device such as a PC, a tablet PC, a smartphone, or a mobile phone and has a function of transmitting and receiving data to and from other devices. The terminal apparatus 16 may be a wearable terminal such as a wristwatch-type terminal, a wristband-type terminal, a glasses-type terminal, a ring-type terminal, a contact-lens-type terminal, a body-embedded terminal, or an in-ear wearable terminal. As will be described in detail below, the terminal apparatus 16 is connected to an aerial display device 150 which is used as a display device thereof. The terminal apparatus 16 may include a flexible display, which is separate from the aerial display device 150. Example of the flexible display include an organic electroluminescent (EL) display (a flexible organic EL display), an electronic paper display, and a flexible liquid crystal display. A flexible display that adopts any other display method may be used. A flexible display is a display having a flexible, deformable display portion such that the display can be bent, folded, rolled, twisted, and/or stretched, for example. The terminal apparatus 16 may be entirely formed as a flexible display or may be divided functionally or physically into a flexible display and other elements.

As illustrated in FIG. 1, the terminal apparatus 16 is connected to an aerial display device 150 and a human detection device 152 in a wired or wireless way. The term "aerial display device", as used herein, refers to a display device capable of displaying an image stereoscopically in an invisible real space (in mid-air). The aerial display device 150 is implemented using, for example, one or more fixed projectors such that lenses, half mirrors, and the like are combined to collect light to form an image in mid-air, thereby displaying an image in mid-air. The aerial display device 150 is different from a device having light-emitting elements that are caused to emit light to display video or a display device that requires a screen. When multiple projectors are used, images are projected from different directions to form an image. Each projector may not necessarily be a fixed one but may be a portable device such as a smartphone that is used to project an image. It is to be understood that any of other techniques that allow an object to be displayed in a mid-air space may be used to implement the aerial display device 150. Such techniques do not exclude, for example, techniques that use accessories such as glasses.

In this exemplary embodiment, furthermore, a mid-air space in which the aerial display device 150 displays an image is referred to as an "aerial display space". Since images are displayed in mid-air, no display screen, such as a liquid crystal panel, exists in a two-dimensional space. In other words, the aerial display space has an unlimited size (display frame). Note that, for example, when an image is displayed in mid-air by a projector, the range over which the image is projected by the projector coincides with a display area (display range) of the image and the size of the aerial display space depends on the range over which the projector projects an image.

Further, the following description is based on the assumption that an image of a real object such as a device handled in this exemplary embodiment is implemented using a stereoscopic image (three-dimensional image) having a depth component. For example, a two-dimensional image may be superimposed on the aerial display space to realize stereoscopic display, or a two-dimensional image may be superimposed on the aerial display space to form an image that is handled as a three-dimensional image. Alternatively, a two-dimensional image with no depth (or a three-dimensional image whose depth is equal to 0) may be displayed in the aerial display space. In the following description, an image displayed in the aerial display space is referred to simply as an "image".

The human detection device 152 is a device that detects a person who has approached an image being displayed in the aerial display space. More specifically, the human detection device 152 detects a person who has approached a position at which an image being displayed in the aerial display space is visible or detects a person who has approached a position at which at least the image can be operated. For example, a sensor such as an infrared sensor or a charge collection sensor may be used or any other means may be used. While this exemplary embodiment will be described assuming that a person approaches and operates the image, any object other than a person, such as a robot, may approach and operate the image. In this case, the human detection device 152 detects an object that has approached the image.

In the operation of the image being displayed in the aerial display space, the human detection device 152 detects a position (a member appearing in the image) pointed at with an operation object. The operation object is used to point at a member appearing in the image to perform some operation. The operation object may be a pointer used to simply point at a member appearing in the image without performing an operation. The operation object is an object with which a person operates the image, such as a fingertip of the person or a pen used by the person. In this exemplary embodiment, a fingertip of a person will be described as an example of the operation object.

A user can touch a real device with their fingertip to specify a position on or in the device to point at. For instance, when the target is a liquid crystal panel, a user can touch the liquid crystal panel to perform an operation such as executing a function process corresponding to the touched position. However, an image being displayed in the aerial display space is floating in mid-air where no screen and the like exist, and thus no object can be actually touched by anyone if they try to do so. That is, the image being displayed in the aerial display space is untouchable. In this exemplary embodiment, accordingly, the human detection device 152 is provided to detect a position pointed at by a person. Specifically, when the human detection device 152 detects the position of a fingertip, the terminal apparatus 16 aligns an image being displayed by the aerial display device 150 to the fingertip whose position has been detected by the human detection device 152 to detect a position (a member) pointed at by the user in the image. In this exemplary embodiment, in particular, a user is able to point at not only a position on the exterior (front surface) of a device appearing in mid-air but also a position inside the device. If the position pointed at by the user is associated with any function, the user is informed of the selection of the function through the user operation or the selected function is started (or executed).

The following describes devices included in the device system according to the first exemplary embodiment in detail.

The configuration of the device 10, which serves as an image forming device, will be described in detail with reference to FIG. 2. In the following, the device 10 may be referred to as an image forming device 10. FIG. 2 illustrates the configuration of the image forming device 10.

A communication unit 18 is a communication interface and has a function of transmitting data to other devices and a function of receiving data from other devices. The communication unit 18 may be a communication interface having a wireless communication function or may be a communication interface having a wired communication function. The communication unit 18 supports one or more communication schemes, for example, and may communicate with a communication partner in accordance with a communication scheme suitable for the communication partner (i.e., a communication scheme supported by the communication partner). Examples of the communication scheme include schemes for infrared communication, visible-light communication, Wi-Fi (registered trademark) communication, and short-range wireless communication such as near field communication (NFC). Examples of the short-range wireless communication include Felica (registered trademark) based communication, Bluetooth (registered trademark) based communication, and radio frequency identifier (RFID) based communication. It is to be understood that wireless communication based on any other scheme may be used as short-range wireless communication. For example, the communication unit 18 may switch communication schemes or frequency bands in accordance with the communication partner or may switch communication schemes or frequency bands in accordance with the surrounding conditions.

An image forming unit 20 has an image forming function. Specifically, the image forming unit 20 has at least one function among a scanning function, a printing function, a copying function, and a facsimile function. The scanning function is executed to read a document and generate scan data (image data). The printing function is executed to print an image on a recording medium such as a sheet of paper. The copying function is executed to read a document and print read data on a recording medium. The facsimile function is executed to transmit or receive image data via facsimile. A collaborative function that uses multiple functions may be executed. For example, a scan-and-transfer function including a combination of the scanning function and a transmission function (transfer function) may be executed. The scan-and-transfer function is executed to read a document, generate scan data (image data), and transmit the scan data to a destination (e.g., an external device such as the terminal apparatus 16). It is to be understood that the collaborative function described above is merely an example and any other collaborative function may be executed.

A storage unit 22 is a storage device, for example, a hard disk or a memory (such as a solid-state drive (SSD)). The storage unit 22 stores, for example, information (such as job information) indicating instructions for forming an image, image data to be printed, scan data generated by executing the scanning function, device address information indicating the addresses of other devices, server address information indicating the address of the server 14, various types of control data, various programs, and so on. It is to be understood that the information and data described above may be stored in separate storage devices or may be stored in a single storage device.

A user interface (UI) unit 24 includes a display unit and an operation unit. The display unit is a display device such as a liquid crystal display. The operation unit is an input device such as a touch panel or a keyboard. It is to be understood that the UI unit 24 may be a user interface that functions as both a display unit and an operation unit (the user interface includes, for example, a touch display or a device having a display on which a keyboard or the like is electronically displayed). The UI unit 24 is optional, and the image forming device 10 may include a hardware user interface unit (hardware UI unit) implemented as hardware having no display unit. Examples of the hardware UI unit include hardware keys specific to number input (e.g., a ten-key pad), and hardware keys specific to direction instructions (e.g., arrow keys).

A control unit 26 controls the operation of each unit of the image forming device 10.

The following describes the configuration of the server 14 in detail with reference to FIG. 3. FIG. 3 illustrates the configuration of the server 14.

A communication unit 28 is a communication interface and has a function of transmitting data to other devices and a function of receiving data from other devices. The communication unit 28 may be a communication interface having a wireless communication function or may be a communication interface having a wired communication function.

A storage unit 30 is a storage device, for example, a hard disk or a memory (such as an SSD). The storage unit 30 stores, for example, device function management information 32, collaborative function management information 34, various types of data, various programs, device address information indicating the addresses of devices, server address information indicating the address of the server 14, and so on. It is to be understood that the information and data described above may be stored in separate storage devices or may be stored in a single storage device. The device function management information 32 and the collaborative function management information 34, which are stored in the storage unit 30, may be provided to the terminal apparatus 16 periodically or at designated timings to update the information stored in the terminal apparatus 16 accordingly. The following describes the device function management information 32 and the collaborative function management information 34.

The device function management information 32 is information for managing functions of devices. For example, the device function management information 32 is information indicating association between device identification information for identifying each device and function information indicating a function or functions of the device. Examples of the device identification information include the device ID, the device name, information indicating the device type, the model number of the device, information for managing the device, such as the resource management number, information indicating the position at which the device is located (position information of the device), a device image interrelated with the device, and address information indicating the address of the device. The device image includes an external appearance image of the device, and an interior image representing the internal structure of the device. The external appearance image may be an image representing the exterior of the device (e.g., the housing of the device) or may be an image of the device, which is wrapped with a packing sheet. The interior image is an image representing the internal structure of the device and is, for example, an image of a cross section of the device taken at a position pointed at with a fingertip. When the device contains one or more parts, the interior image includes the respective images of the parts. The device image may be an image generated by capturing an image of the device (such as an image representing the exterior of the device) or may be an image (such as an icon) that resembles the appearance of the device. Examples of the function information include a function ID and a function name. For instance, when the image forming device 10 has the scanning function, the printing function, the copying function, and the scan-and-transfer function, the device identification information of the image forming device 10 is associated with function information indicating the scanning function, function information indicating the printing function, function information indicating the copying function, and function information indicating the scan-and-transfer function. The device function management information 32 is referred to, thereby specifying (or identifying) a function or functions of each device.

Examples of the devices managed in the device function management information 32 include the devices included in the device system (e.g., the devices 10 and 12). It is to be understood that devices not included in the device system may be managed in the device function management information 32. For example, the server 14 may acquire information (information including device identification information and function information) concerning a new device not included in the device system and may newly register the acquired information in the device function management information 32. The information concerning a device may be acquired by, for example, using the Internet or any other medium or may be input by the administrator or any other suitable person. The server 14 may update the device function management information 32 at any timing, periodically, at a timing specified by the administrator or any other suitable person, or at other timings. Thus, in some cases, function information indicating a function that is not included in a device before update and that becomes included in the device after update may be registered in the device function management information 32. In other cases, function information indicating a function that is included in a device before update and that is no longer included in the device after update may be deleted from the device function management information 32 or may be registered as unavailable information. The information used for update may be acquired by using, for example, the Internet or any other medium or may be input by the administrator or any other suitable person.

The collaborative function management information 34 is information for managing a collaborative function that is executed by enabling collaboration among multiple functions. Multiple functions work in collaboration to execute one or more collaborative functions. Each collaborative function may be executed by, for example, enabling collaboration among multiple functions of a single device (e.g., the device 10 or 12) or may be executed by enabling collaboration among multiple functions of multiple devices (e.g., the devices 10 and 12). Alternatively, a terminal apparatus that provides an operation instruction (in this exemplary embodiment, the terminal apparatus 16) may also be included in the devices to be identified, and a function of the terminal apparatus may be used as a function in the collaborative function.

Each collaborative function may be a function executed without using a device implemented as hardware. For example, each collaborative function may be a function executed by enabling collaboration among multiple pieces of software. It is to be understood that each collaborative function may be a function executed by enabling collaboration between a function of a device implemented as hardware and a function implemented by software.

For example, the collaborative function management information 34 is information indicating association between a combination of pieces of function information, each indicating one of the functions used in each collaborative function, and collaborative function information indicating the collaborative function. Examples of the collaborative function information include a collaborative function ID and a collaborative function name. When a standalone function is updated, the collaborative function management information 34 is also updated in accordance with the update of the standalone function. Thus, a collaborative function implemented by multiple functions that are not allowed to work in collaboration before the update may be rendered available after the update or, conversely, a collaborative function that is available before the update may be rendered unavailable after the update. Collaborative function information indicating a collaborative function rendered available after the update is registered in the collaborative function management information 34, and collaborative function information indicating a collaborative function rendered unavailable after the update is deleted from the collaborative function management information 34 or is registered as unavailable information.

When multiple devices are made to work in collaboration, the collaborative function management information 34 is information for managing a collaborative function that uses multiple functions of the multiple devices. In this case, the collaborative function management information 34 is information indicating association between a combination of pieces of device identification information, each for identifying one of the devices to be used for the collaborative function, and collaborative function information of the collaborative function. As described above, when the device function management information 32 is updated, the collaborative function management information 34 is also updated in accordance with the update. Thus, a collaborative function implemented by multiple devices that are not allowed to work in collaboration before the update may be rendered available after the update or, conversely, a collaborative function that is available before the update may be rendered unavailable after the update.

The collaborative function may be a function executed by enabling collaboration among multiple different functions or may be a function executed by enabling collaboration between the same function of different devices. The collaborative function may be a function that is not available before collaboration. The function that is not available before collaboration may be a function rendered available by using the same function among functions of devices intended for collaboration or may be a function rendered available by combining different functions among functions of the devices intended for collaboration. For example, a device having the printing function, or a printer, and a device having the scanning function, or a scanner, work in collaboration to achieve a collaborative function, namely, the copying function. That is, the printing function and the scanning function work in collaboration, thereby achieving the copying function. In this case, the copying function, which is a collaborative function, is associated with a combination of the printing function and the scanning function. In the collaborative function management information 34, for example, collaborative function information indicating the copying function, which is a collaborative function, is associated with a combination of device identification information for identifying a device having the printing function and device identification information for identifying a device having the scanning function.

The concept of a collaborative function may include a composite function in which multiple functions work in collaboration or multiple devices work in collaboration to make a new function feasible. For example, multiple displays may be combined to implement an enhanced display function as a composite function. As another example, a television set and a recorder may be combined to implement a composite function, namely, a recording function. The recording function may be a function of recording an image being displayed on the television set. Alternatively, multiple cameras may be combined to implement a composite function, namely, an imaging area extension function. The imaging area extension function is a function of, for example, capturing images with the respective imaging areas of the cameras being joined together. A telephone may be combined with a translation machine or translation software to implement a composite function, namely, a telephone conversation translation function (a function of translating conversations over the telephone). In this manner, the concept of a collaborative function includes a function rendered feasible by enabling collaboration between devices or functions of the same type, and a function rendered feasible by enabling collaboration between devices or functions of different types.

The storage unit 30 may store available-function management information. The available-function management information is information for managing a function available to each user. For example, the available-function management information is information indicating association between user identification information for identifying each user and function information indicating a function available to the user (the function information may include collaborative function information). As described above, examples of the function available to each user include a function provided free of charge to the user and a function purchased by the user. The function available to each user may be a standalone function or a collaborative function. Examples of the user identification information include user account information such as the user ID or the user name. The available-function management information is referred to, thereby specifying (or identifying) a function available to each user. For example, the available-function management information is updated each time a function is provided to each user (e.g., each time a function is provided free of charge or at cost to each user).

A control unit 36 controls the operation of each unit of the server 14. The control unit 36 includes a specifying unit 38.

Upon receipt of device identification information for identifying a device, the specifying unit 38 specifies function information indicating functions associated with the device identification information in the device function management information 32 stored in the storage unit 30. Accordingly, functions of the device are specified (or identified). For example, device identification information is transmitted from the terminal apparatus 16 to the server 14, and the specifying unit 38 specifies function information indicating functions associated with the device identification information. Information concerning functions (such as function information or description information of the function) is transmitted from the server 14 to the terminal apparatus 16, for example. The terminal apparatus 16 causes the aerial display device 150 to display information concerning functions of the device specified by the device identification information.

Further, upon receipt of pieces of device identification information, each for identifying one of the devices intended for collaboration, the specifying unit 38 specifies collaborative function information indicating a collaborative function associated with a combination of the pieces of device identification information in the collaborative function management information 34 stored in the storage unit 30. Thus, a collaborative function that is executed by enabling collaboration between the functions of the devices intended for collaboration is specified (or identified). For example, multiple pieces of device identification information are transmitted from the terminal apparatus 16 to the server 14, and the specifying unit 38 specifies collaborative function information indicating a collaborative function associated by the multiple pieces of device identification information. Information concerning the collaborative function (such as collaborative function information or description information of the collaborative function) is transmitted from the server 14 to the terminal apparatus 16, for example. The terminal apparatus 16 causes the aerial display device 150 to display information concerning a collaborative function that is executed by multiple devices specified by the multiple pieces of device identification information.

For instance, when a single device is identified (e.g., when an image of a single device is captured), upon receipt of device identification information for identifying the device, the specifying unit 38 may specify function information indicating functions associated with the device identification information in the device function management information 32. Thus, when a single device is identified (e.g., when an image of a single device is captured), functions of the device are specified (or identified). When multiple devices are identified (e.g., when images of multiple devices are captured), upon receipt of pieces of device identification information, each for identifying one of the multiple devices, the specifying unit 38 may specify collaborative function information indicating a collaborative function associated with a combination of the pieces of device identification information in the collaborative function management information 34. Thus, when multiple devices are identified (e.g., when images of multiple devices are captured), a collaborative function that uses functions of the multiple devices is specified (or identified).

Further, upon receipt of pieces of function information, each indicating one of the functions used in the collaborative function, the specifying unit 38 may specify collaborative function information indicating a collaborative function associated with a combination of the pieces of function information in the collaborative function management information 34 stored in the storage unit 30. Thus, a collaborative function that is executed by enabling collaboration between the functions intended for collaboration is specified (or identified). For example, multiple pieces of function information are transmitted from the terminal apparatus 16 to the server 14, and the specifying unit 38 specifies collaborative function information indicating a collaborative function associated with the multiple pieces of function information. The terminal apparatus 16 causes the aerial display device 150 to display information concerning the collaborative function that is executed by multiple devices specified by the multiple pieces of function information in a way similar to that described above.

When functions available to users are managed, upon receipt of user identification information for identifying a user, the specifying unit 38 may specify function information indicating functions associated with the user identification information in the available-function management information stored in the storage unit 30. Thus, a group of functions available to the user is specified (or identified). For example, user identification information is transmitted from the terminal apparatus 16 to the server 14, and the specifying unit 38 specifies function information indicating functions associated with the user identification information. Information concerning the functions available to the user (e.g., information indicating the names of the functions) is transmitted from the server 14 to the terminal apparatus 16, for example. The terminal apparatus 16 causes the aerial display device 150 to display the information concerning the functions available to the user specified by the user identification information. For example, upon receipt of device identification information and user identification information, the specifying unit 38 specifies function information indicating functions associated with the device identification information in the device function management information 32, and also specifies function information indicating functions associated with the user identification information in the available-function management information. Thus, a function that is included in the device specified by the device identification information and that is available to the user specified by the user identification information is specified.

The control unit 36 may execute a process for purchasing a function and may manage a history of purchase records. For instance, when a chargeable function is purchased by a user, the control unit 36 may apply a charging process to the user.

Further, the control unit 36 may execute functions concerning image processing, such as a character recognition function, a translation function, an image modification function, and an image forming function. It is to be understood that the control unit 36 may execute functions concerning processing other than image processing. The character recognition function is executed to recognize characters in an image and generate text data indicating the characters. The translation function is executed to translate characters in an image into characters expressed in a specific language and generate text data indicating the translated characters. The image modification function is executed to modify an image. For example, the control unit 36 may receive scan data, which is generated by executing the scanning function, from the image forming device 10 and may execute a function concerning image processing, such as the character recognition function, the translation function, or the image modification function, on the scan data. The control unit 36 may receive image data from the terminal apparatus 16 and may execute each function on the image data. The text data or image data generated by the control unit 36 is transmitted from the server 14 to the terminal apparatus 16, for example. The server 14 may be used as an external device, and the collaborative function may be a function that uses functions of multiple devices including the server 14.

Figure 4:
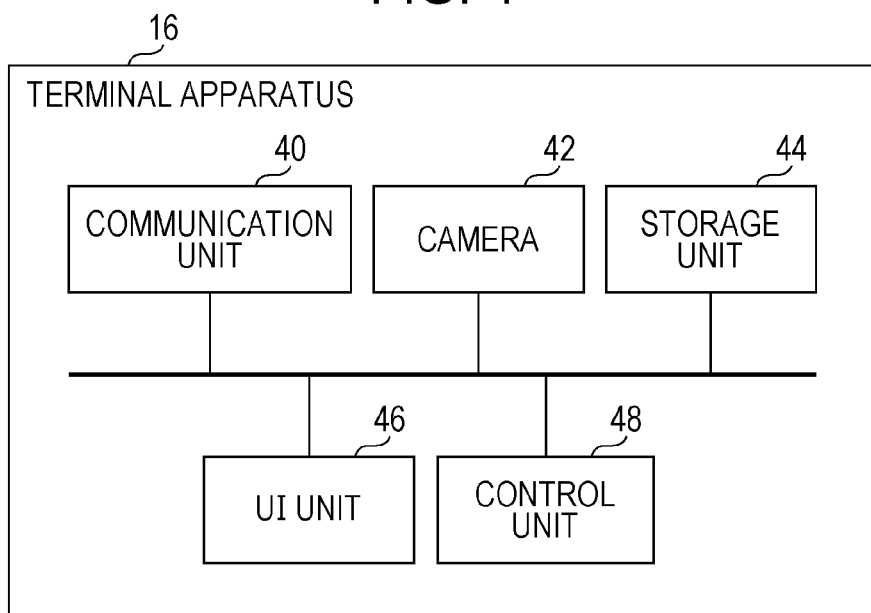
FIG. 4 is a block diagram illustrating a terminal apparatus according to the first exemplary embodiment.

The following describes the configuration of the terminal apparatus 16 in detail with reference to FIG. 4. FIG. 4 illustrates the configuration of the terminal apparatus 16.

A communication unit 40 is a communication interface and has a function of transmitting data to other devices and a function of receiving data from other devices. The communication unit 40 may be a communication interface having a wireless communication function or may be a communication interface having a wired communication function. The communication unit 40 supports one or more communication schemes, for example, and may communicate with a communication partner in accordance with a communication scheme suitable for the communication partner (i.e., a communication scheme supported by the communication partner). Examples of the communication scheme include schemes for infrared communication, visible-light communication, Wi-Fi communication, and short-range wireless communication. For example, the communication unit 40 may switch communication schemes or frequency bands in accordance with the communication partner or may switch communication schemes or frequency bands in accordance with the surrounding conditions.

A camera 42 serving as an imaging unit captures an image of a target object to generate image data (e.g., still image data or moving image data). In addition to image data captured by the camera 42 of the terminal apparatus 16, image data captured by an external camera connected to a communication path such as a network and received by the communication unit 40 may be used, and the aerial display device 150 may be caused to display an image based on the image data to allow the user to operate the image data.

A storage unit 44 is a storage device, for example, a hard disk or a memory (such as an SSD). The storage unit 44 stores various programs, various types of data, address information indicating the address of the server 14, address information indicating the addresses of devices (e.g., address information indicating the addresses of the devices 10 and 12), information concerning identified devices, information concerning identified devices intended for collaboration, information concerning functions of identified devices, information concerning a collaborative function, and so on.

A UI unit 46, which is a user interface unit, includes a device control unit and a position specifying unit. The device control unit controls the operation of the aerial display device 150 in accordance with display control performed by a control unit 48 to display an image in the aerial display space. In the following description, the operation performed by the device control unit described above may be expressed as "the UI unit 46 or the control unit 48 displaying an image in the aerial display space" or "the UI unit 46 or the control unit 48 causing an image to be displayed in the aerial display space", for simplicity of description. The position specifying unit specifies the position of a person detected by the human detection device 152 and the position of the person's fingertip detected as an operation object by the human detection device 152. In this exemplary embodiment, when a space is represented using three-dimensional coordinates whose origin is a predetermined position, the position specifying unit specifies the positions of the detected fingertip and the like by using coordinate data.

The control unit 48 controls the operation of each unit of the terminal apparatus 16. For example, the control unit 48 functions as a display controller (a controller) and causes various types of information to be displayed in the aerial display space.

In the aerial display space, for example, an image captured by the camera 42, an image interrelated with a device identified as a device to be used (e.g., as a standalone device or as devices intended for collaboration), an image interrelated with a function, and so on are displayed. The image interrelated with the device may be an image (a still image or a moving images) representing the device, which is captured by the camera 42, or an image (e.g., a icon) graphically representing the device. Data of the image graphically representing the device may be stored in, for example, the server 14 and may be provided from the server 14 to the terminal apparatus 16. Alternatively, the data may be stored in the terminal apparatus 16 in advance or may be stored in a separate device and provided from the separate device to the terminal apparatus 16. Examples of the image interrelated with the function include an image such as an icon representing the function.

The device function management information 32 described above may be stored in the storage unit 44 of the terminal apparatus 16. In this case, the device function management information 32 may not be stored in the storage unit 30 of the server 14. Likewise, the collaborative function management information 34 described above may be stored in the storage unit 44 of the terminal apparatus 16. In this case, the collaborative function management information 34 may not be stored in the storage unit 30 of the server 14. The control unit 48 of the terminal apparatus 16 may include the specifying unit 38 described above, may identify a device on the basis of device identification information, and may specify a function of the device or specify a collaborative function that uses multiple functions. In this case, the server 14 may not include the specifying unit 38.

When available-function management information is created, the available-function management information may be stored in the storage unit 44 of the terminal apparatus 16. In this case, the available-function management information may not be stored in the storage unit 30 of the server 14. The control unit 48 of the terminal apparatus 16 may manage a history of functions purchased by each user. In this case, the control unit 36 of the server 14 may not have the management function. The control unit 48 of the terminal apparatus 16 may specify functions available to a user on the basis of user identification information.

As still another example, devices such as the devices 10 and 12 may each store the device function management information 32 and the collaborative function management information 34, or devices such as the devices 10 and 12 may each include the specifying unit 38. That is, processes performed by the specifying unit 38 of the server 14, such as a process for identifying a device, a process for identifying a function, and a process for identifying a collaborative function, may be performed by the server 14, the terminal apparatus 16, or each of devices such as the devices 10 and 12.

In this exemplary embodiment, as an example, augmented reality (AR) technology is applied to acquire device identification information and identify a device. For example, AR technology is applied to acquire device identification information of a standalone device and identify the device. In addition, device identification information of devices intended for collaboration is acquired and the devices intended for collaboration are identified. Well-known AR technology is used, examples of which include marker-based AR technology, markerless AR technology, and position information AR technology. The marker-based AR technology uses a marker such as a two-dimensional barcode. The markerless AR technology uses image recognition technology. The position information AR technology uses position information. It is to be understood that device identification information may be acquired without using AR technology and a device may be identified. For example, a device connected to a network may be identified on the basis of the Internet protocol (IP) address of the device or may be identified by reading the device ID of the device. Furthermore, a device or terminal apparatus having various functions for wireless communication, such as infrared communication, visible-light communication, Wi-Fi communication, and Bluetooth (registered trademark) based communication, may identify devices that work in collaboration by acquiring the device IDs of the devices by using the wireless communication functions described above, and may execute a collaborative function.

Figure 5:
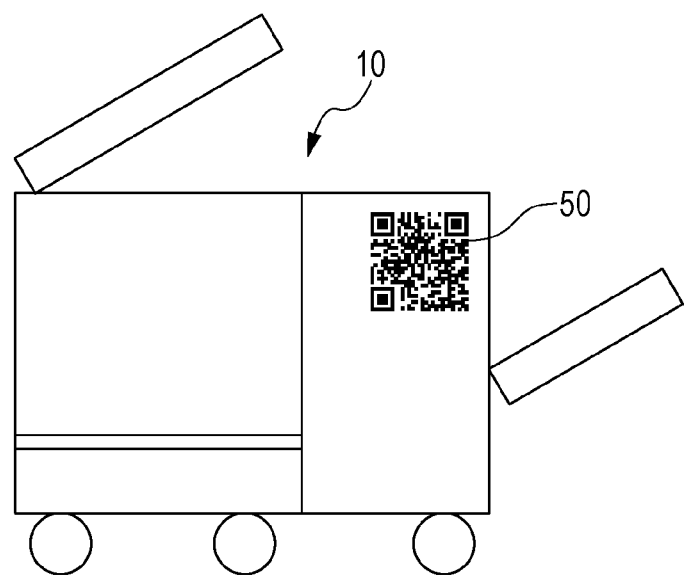
FIG. 5 illustrates a graphical representation of the external appearance of the image forming device.

The following describes a process for acquiring device identification information in detail with reference to FIG. 5. As an example, device identification information of the image forming device 10 will be described. FIG. 5 illustrates a graphical representation of the external appearance of the image forming device 10. The following describes a process for acquiring device identification information by using the marker-based AR technology. A housing of the image forming device 10 has a marker 50, such as a two-dimensional barcode. The marker 50 is coded information of the device identification information of the image forming device 10. A user starts the camera 42 of the terminal apparatus 16 and captures an image of the marker 50 on the image forming device 10 to be used by using the camera 42. Thus, image data indicating the marker 50 is generated. The image data is transmitted from the terminal apparatus 16 to the server 14, for example. In the server 14, the control unit 36 applies a decoding process to a marker image indicated by the image data to extract device identification information. Thus, the image forming device 10 to be used (the image forming device 10 having the marker 50 whose image has been captured) is identified. The specifying unit 38 of the server 14 specifies function information indicating functions associated with the extracted device identification information in the device function management information 32. Accordingly, the functions of the image forming device 10 to be used are specified (or identified).

The control unit 48 of the terminal apparatus 16 may apply a decoding process to the image data indicating the marker 50 to extract device identification information. In this case, the extracted device identification information is transmitted from the terminal apparatus 16 to the server 14. The specifying unit 38 of the server 14 specifies function information indicating functions associated with the device identification information transmitted from the terminal apparatus 16 in the device function management information 32. When the storage unit 44 of the terminal apparatus 16 stores the device function management information 32, the control unit 48 of the terminal apparatus 16 may specify function information indicating functions associated with the extracted device identification information in the device function management information 32.

The marker 50 may include coded function information indicating functions of the image forming device 10. In this case, a decoding process is applied to the image data indicating the marker 50 to extract the device identification information of the image forming device 10 and to also extract function information indicating functions of the image forming device 10. Accordingly, the image forming device 10 is specified (or identified), and the functions of the image forming device 10 are also specified (or identified). The decoding process may be performed by the server 14 or by the terminal apparatus 16.

When a collaborative function that uses functions of multiple devices is to be executed, images of markers on devices intended for collaboration are captured to acquire device identification information of the devices, and thus a collaborative function is specified (or identified).

When the markerless AR technology is to be applied to acquire device identification information, for example, a user captures an image of the entirety or a portion of the external appearance of the device to be used (e.g., the image forming device 10) by using the camera 42 of the terminal apparatus 16. It is useful to obtain information for specifying a device to be used, such as the name (e.g., the product name), model number, or resource management number of the device, by capturing an image of the external appearance of the device. As a result of the image capturing process, external appearance image data indicating the entirety or a portion of the external appearance of the device to be used is generated. The external appearance image data is transmitted from the terminal apparatus 16 to the server 14, for example. In the server 14, the control unit 36 identifies the device to be used on the basis of the external appearance image data. For example, the storage unit 30 of the server 14 stores, for each device, external appearance image association information indicating association between external appearance image data indicating the entirety or a portion of the external appearance of the device and device identification information of the device. As an example, the control unit 36 compares the external appearance image data transmitted from the terminal apparatus 16 with each of the pieces of external appearance image data included in the external appearance image association information and specifies device identification information of the device to be used on the basis of the comparison result. For instance, the control unit 36 extracts features of the external appearance of the device to be used from the external appearance image data transmitted from the terminal apparatus 16, specifies external appearance image data indicating the same or similar features as or to the features of the external appearance from within the external appearance image data group included in the external appearance image association information, and specifies device identification information associated with the specified external appearance image data. Thus, the device to be used (the device whose image has been captured by the camera 42) is identified. As another example, when an image indicating the name (e.g., the product name) or model number of a device is captured and external appearance image data indicating the name or the model number is generated, the device to be used may be identified on the basis of the name or model number indicated by the external appearance image data. The specifying unit 38 of the server 14 specifies function information indicating functions associated with the specified device identification information in the device function management information 32. Thus, functions of the device to be used (e.g., the image forming device 10) are specified.

The control unit 48 of the terminal apparatus 16 may compare external appearance image data indicating the entirety or a portion of the external appearance of the device to be used (e.g., the image forming device 10) with each piece of external appearance image data included in the external appearance image association information and may specify device identification information of the device to be used on the basis of the comparison result. The external appearance image association information may be stored in the storage unit 44 of the terminal apparatus 16. In this case, the control unit 48 of the terminal apparatus 16 refers to the external appearance image association information stored in the storage unit 44 of the terminal apparatus 16 to specify device identification information of the device to be used. As another example, the control unit 48 of the terminal apparatus 16 may acquire external appearance image association information from the server 14 and may refer to the external appearance image association information to specify device identification information of the device to be used.

When a collaborative function that uses multiple functions of multiple devices is to be executed, an image of the entirety or a portion of the external appearance of each of the devices intended for collaboration is captured to acquire device identification information of the device, and thus a collaborative function is specified (or identified).

When the position information AR technology is to be applied to acquire device identification information, for example, a Global Positioning System (GPS) function is used to acquire position information indicating the position at which a device (e.g., the image forming device 10) is located. For example, each device has a GPS function and acquires device position information indicating the position thereof. The terminal apparatus 16 outputs information indicating a request for acquiring device position information to a device to be used, and receives, from the device, device position information of the device as a response to the request. The device position information is transmitted from the terminal apparatus 16 to the server 14, for example. In the server 14, the control unit 36 identifies the device to be used on the basis of the device position information. For example, the storage unit 30 of the server 14 stores, for each device, position association information indicating association between device position information indicating the position at which the device is located and device identification information of the device. The control unit 36 specifies device identification information associated with the device position information transmitted from the terminal apparatus 16 in the position association information. Thus, the device to be used is specified (or identified). The specifying unit 38 of the server 14 specifies function information indicating functions associated with the specified device identification information in the device function management information 32. Thus, functions of the device to be used (e.g., the image forming device 10) are specified (or identified).

The control unit 48 of the terminal apparatus 16 may specify device identification information associated with the position information of the device to be used in the position association information. The position association information may be stored in the storage unit 44 of the terminal apparatus 16. In this case, the control unit 48 of the terminal apparatus 16 refers to the position association information stored in the storage unit 44 of the terminal apparatus 16 to specify device identification information of the device to be used. As another example, the control unit 48 of the terminal apparatus 16 may acquire position association information from the server 14 and may refer to the position association information to specify device identification information of the device to be used.

When a collaborative function implemented using multiple devices is to be executed, pieces of device position information, each of which is information on one of the devices intended for collaboration, are acquired and pieces of device identification information, each of which is information on one of the devices intended for collaboration, are specified on the basis of the pieces of device position information. Thus, a collaborative function is specified (or identified).

Multiple identification techniques may be used to identify a device. For example, multiple technologies selected from among the marker-based AR technology, the markerless AR technology, and the position information AR technology may be used to identify a device. Alternatively, if a certain identification technique fails to identify a device, another identification technique may be used to identify a device. For instance, when the marker-based AR technology or the markerless AR technology fails to identify a device, the position information AR technology may be used to identify a device.

The following describes an image forming system according to the first exemplary embodiment in further detail.

The device function management information 32 will be described in detail with reference to FIG. 6. FIG. 6 illustrates an example of a device function management table serving as the device function management information 32. The device function management table contains, as an example, a device ID, information indicating a device name (e.g., a device type), information (function information) indicating functions of the device, and an image ID, which are associated with each other. The device ID and the device name correspond to examples of device identification information. The image ID is an example of image identification information for identifying a device image interrelated with the device. In the optional device function management table, the image ID is optional. For instance, a device with device ID "B" is a multifunction device (an image forming device having multiple image forming functions) and has functions such as the printing function and the scanning function. Each device is associated with an image ID for identifying a device image interrelated with the device. Data of the device images interrelated with the devices is stored in, for example, the storage unit 30 of the server 14 or any other device.

For example, AR technology is applied to acquire a device ID for identifying a device to be used. The specifying unit 38 of the server 14 refers to the device function management table to specify the device name, function, and image ID associated with the device ID. Thus, the device to be used is identified. For example, information indicating the device name and data of the device image interrelated with the device are transmitted from the server 14 to the terminal apparatus 16 and are displayed in the aerial display space. It is to be understood that the image captured by the camera 42 may be displayed in the aerial display space. Further, when a device image interrelated with a device (e.g., an image captured by the camera 42 or an image graphically representing the device) is designated by the user on the UI unit 46 of the terminal apparatus 16, information concerning functions of the device (such as function information or description information of the function) may be transmitted from the server 14 to the terminal apparatus 16 and may be displayed in the aerial display space.

The following describes the collaborative function management information 34 in detail with reference to FIG. 7. FIG. 7 illustrates an example of a collaborative function management table serving as the collaborative function management information 34. The collaborative function management table contains, as an example, a combination of device IDs, information indicating the names of devices intended for collaboration (e.g., the types of the devices), and information indicating collaborative functions (collaborative function information), which are associated with each other. For example, a device with device ID "A" is a personal computer (PC), and a device with device ID "B" is a multifunction device. The PC (A) and the multifunction device (B) work in collaboration to implement collaborative functions, for example, a "scan-and-transfer function" and a "printing function". The "scan-and-transfer function" is a function of transferring image data generated by the multifunction device (B) through a scanning process to the PC (A). The "printing function" is a function of transmitting data (e.g., image data or document data) saved in the PC (A) to the multifunction device (B) and printing the transmitted data using the multifunction device (B).

The following describes a process for the use of a standalone device and a process for the use of a collaborative function. In this exemplary embodiment, for convenience of description, a fundamental process flow will be described first, taking an example in which a planar two-dimensional image (an image with no depth (z=0)) is displayed in the aerial display space. Then, a process for displaying a three-dimensional stereoscopic image in the aerial display space will be described.

In the following, a process for the use of a standalone device will be described with reference to FIG. 8. FIG. 8 illustrates an example of a standalone device. As an example, the image forming device 10 is assumed to be a device that is used alone. The image forming device 10 is a multifunction device, for example. The image forming device 10 is a device that is present in the real space.

For example, the housing of the image forming device 10 has the marker 50, such as a two-dimensional barcode. When the marker-based AR technology or the markerless AR technology is used, the user captures an image of the image forming device 10 to be used by using the camera 42 of the terminal apparatus 16 (e.g., a smartphone). Thus, the image data indicating the marker 50 or external appearance image data indicating the external appearance of the image forming device 10 is generated. In the aerial display space, a device display screen 52 is displayed, and the device display screen 52 shows a device image 54 interrelated with the image forming device 10. The device image 54 may be, for example, an image captured by the camera 42. The device image 54 may have a size equal to that when the image is captured or may be an enlarged or reduced image.

The image data generated by capturing an image using the camera 42 is transmitted from the terminal apparatus 16 to the server 14. In the server 14, the control unit 36 applies a decoding process to the image data to extract device identification information of the image forming device 10, thereby identifying the image forming device 10. As another example, external appearance image data indicating the external appearance of the image forming device 10 may be generated and transmitted from the terminal apparatus 16 to the server 14. In the server 14, in this case, the control unit 36 refers to the external appearance image association information to specify the device identification information of the image forming device 10. Thus, the image forming device 10 is identified.

Further, the specifying unit 38 of the server 14 refers to the device function management information 32 (e.g., the device function management table illustrated in FIG. 6) to specify (or identify) functions of the image forming device 10. This point will be described in detail with reference to FIG. 6. As an example, the image forming device 10 is assumed to be a "multifunction device (B)". The specifying unit 38 specifies functions associated with the multifunction device (B) in the device function management table illustrated in FIG. 6. Thus, functions of the multifunction device (B) are specified. Information concerning the specified functions is transmitted from the server 14 to the terminal apparatus 16. It is to be understood that the terminal apparatus 16 may perform a process for identifying a device or functions.

On the device display screen 52, instead of an image captured by the camera 42, a previously prepared image (e.g., a graphical image (such as an icon) rather than a captured image) interrelated with the identified image forming device 10 or an image captured by an external camera may be displayed as the device image 54.

For instance, when image data obtained by capturing an image of a device is to be used, the current external appearance of the device (e.g., the external appearance reflecting scratches, notes, labels, or other objects affixed to the device) is reflected in the image. This may allow the user to visually distinguish the image from images of other devices of the same type.

When a graphical image is to be used, data of the graphical image is transmitted from the server 14 to the terminal apparatus 16, for example. For instance, when the image forming device 10 is identified, the specifying unit 38 of the server 14 refers to the device function management table (the device function management information 32) illustrated in FIG. 6 to specify a graphical image interrelated with the image forming device 10. Data of the graphical image is transmitted from the server 14 to the terminal apparatus 16, and the graphical image is displayed in the aerial display space as the device image 54. As illustrated in FIG. 8, a device display screen (display frame) 52 may be additionally displayed to present a display area (display range) of information concerning the device image 54 in mid-air. The data of the graphical image may be stored in the terminal apparatus 16 in advance. In this case, when the image forming device 10 is identified, the device image 54 stored in the terminal apparatus 16 is displayed on the device display screen 52. The data of the graphical image may be stored in a device other than the server 14 or the terminal apparatus 16.

Further, when a device is identified, information indicating the name of the device may be transmitted from the server 14 to the terminal apparatus 16, and the terminal apparatus 16 may display the name of the device on the device display screen 52. In the example illustrated in FIG. 8, the image forming device 10 is a multifunction device, and the name thereof, i.e., "multifunction device (B)", is displayed.

Figure 9:
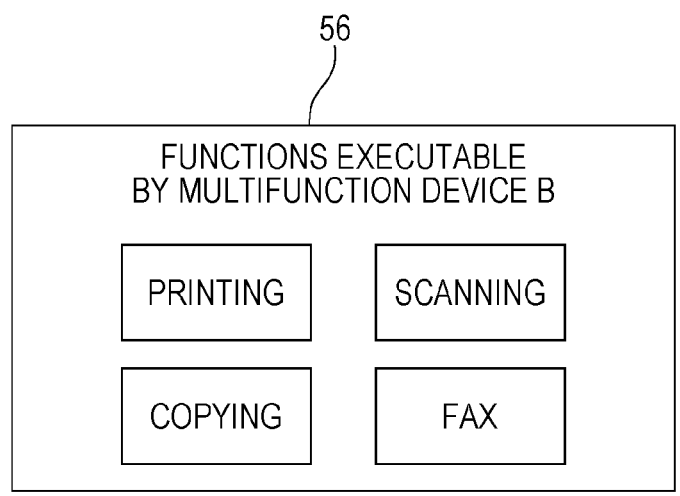
FIG. 9 illustrates an example function display screen.

When functions of the image forming device 10 are specified, for example, as illustrated in FIG. 9, the control unit 48 of the terminal apparatus 16 displays a function display screen 56 in the aerial display space to display information concerning the functions on the function display screen 56. As illustrated in FIG. 9, as in the device display screen 52, the function display screen (display frame) 56 may be additionally displayed as a display area for displaying information concerning functions in mid-air. Examples of the information concerning functions include button images for providing an instruction to execute the functions. For example, since the multifunction device (B), which is the image forming device 10, has the printing function, the scanning function, the copying function, and the facsimile function, button images, each for providing an instruction to execute one of the functions, are displayed on the function display screen 56. For example, the user designates the button image indicating the printing function by using the terminal apparatus 16 and provides an instruction to execute the printing function. Then, execution instruction information indicating the instruction for executing the printing function is transmitted from the terminal apparatus 16 to the image forming device 10. The execution instruction information includes control data for executing the printing function, data such as image data to which the printing function is applied, and so on. Upon receipt of the execution instruction information, the image forming device 10 executes printing in accordance with the execution instruction information.

A screen operated by the user, such as the function display screen 56 illustrated in FIG. 9, would otherwise be implemented as a touch panel or any other suitable device that is touched by the user for data input. The aerial display space is an illusion that is not actually touchable (or contactable) to perform an operation. In other words, a user operation screen that appears in the aerial display space is a touch panel that is not touchable.

Figure 10:
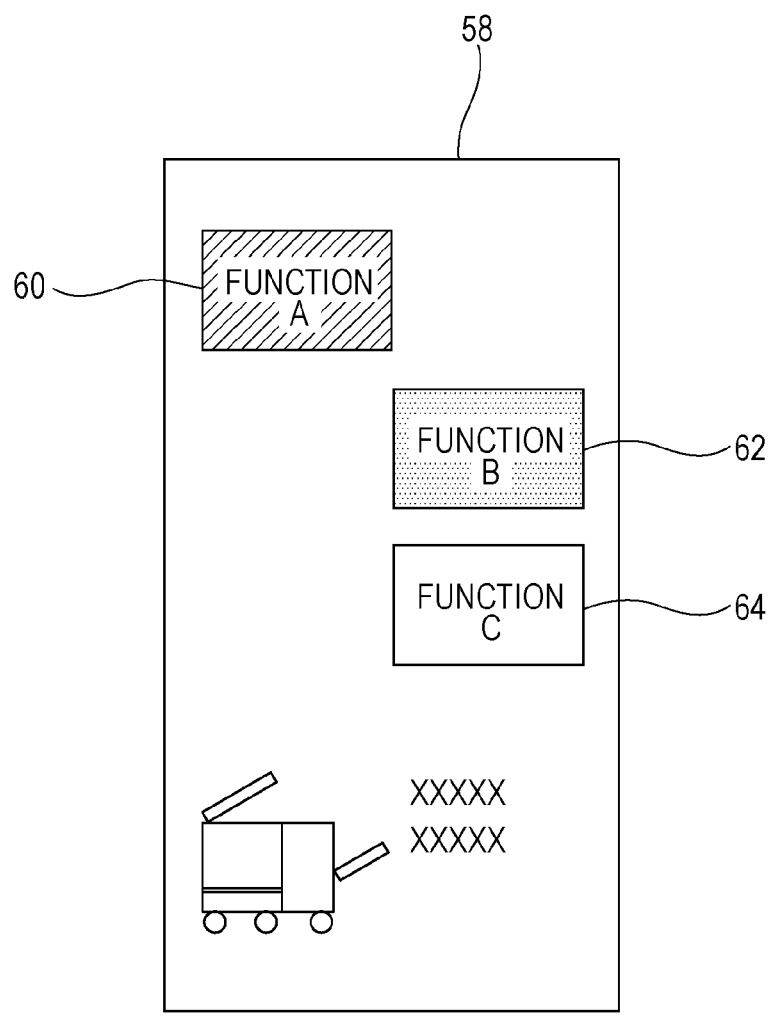
FIG. 10 illustrates an example function display screen.

FIG. 10 illustrates another example function display screen. A function display screen 58 is a screen displayed in the aerial display space when a standalone device is used, as illustrated in FIG. 8. As illustrated in FIG. 10, as in the function display screen 56, the function display screen (display frame) 58 may be additionally displayed as a display area for displaying information concerning functions in mid-air. As described above, a device to be used (e.g., the image forming device 10) is specified, and functions of the device to be used are specified. Alternatively, functions associated with user identification information of a user who uses the device to be used, that is, functions available to the user, may be specified. Since the functions of the device to be used are specified, a function that is not included in the device to be used among a group of functions to be provided may be specified. The pieces of information described above may be displayed on the function display screen 58.

The function display screen 58 illustrated in FIG. 10 shows, as an example of the function information, a button image 60 representing function A, a button image 62 representing function B, and a button image 64 representing function C. The function A is a function that is included in the device to be used (e.g., the identified image forming device 10) and that is available to the user. The function B is a function that is included in the device to be used and that is not available to the user. The function B is provided to the user, thereby making the function B available to the user. If the function B is a chargeable function, the user purchases the function B, thereby making the function B available to the user. If the function B is a free-of-charge function, the user is provided with the function B free-of-charge, thereby making the function B available to the user. The function C is a function that is not included in the device to be used, that is, a function that is not supported by the device to be used. The control unit 48 of the terminal apparatus 16 may change the display styles of the button images 60, 62, and 64 in accordance with whether each of the functions represented by the button images 60, 62, and 64 is included in the device to be used. The control unit 48 may also change the display styles of the button images 60, 62, and 64 in accordance with whether each of the functions represented by the button images 60, 62, and 64 is available to the user. For example, the control unit 48 may change the colors or shapes of the button images 60, 62, and 64. In the example illustrated in FIG. 10, the button images 60, 62, and 64 are displayed in different colors. As an example, a button image representing a function that is included in the device to be used and that is available to the user (e.g., the button image 60 representing the function A) is displayed in blue. A button image representing a function that is included in the device to be used and that is not available to the user (the button image 62 representing the function B) is displayed in yellow. A button image representing a function that is not included in the device to be used (e.g., the button image 64 representing the function C) is displayed in gray. As another example, the control unit 48 may change the shapes of the button images 60, 62, and 64 or may change the font styles of the function names displayed in the button images 60, 62, and 64. It is to be understood that any other method may be used to change the display styles. Thus, the user is visibly informed of the availability of each function.

For example, the user designates the button image 60 representing the function A, which is displayed in the aerial display space, and provides an instruction to execute the function A. Then, execution instruction information indicating the instruction for executing the function A is transmitted from the terminal apparatus 16 to the device to be used. The execution instruction information includes data such as control data for executing the function A and image data to be subjected to processing based on the function A, and so on. Upon receipt of the execution instruction information, the device to be used executes the function A in accordance with the execution instruction information. For instance, when the device to be used is the image forming device 10 and when the function A is the scan-and-transfer function, the image forming unit 20 of the image forming device 10 executes the scanning function and accordingly scan data (image data) is generated. The scan data is transmitted from the image forming device 10 to a set destination (e.g., the terminal apparatus 16).

When the user designates the button image 62 representing the function B, which is displayed in the aerial display space, and provides an instruction to provide the function B, a provision process is executed. When the provision process is to be executed by the server 14, the terminal apparatus 16 accesses the server 14. Thus, a screen (e.g., a website) for receiving the function B is displayed in the aerial display space as information for making the function B available to the user. The user performs a provision procedure through the screen, thereby making the function B available to the user. For instance, the terminal apparatus 16 stores a program for a web browser. Using the web browser, the terminal apparatus 16 accesses the server 14. When the user accesses the server 14 by using the web browser, a function providing screen (e.g., a website) is displayed in the aerial display space and the function is provided through the website. It is to be understood that the provision process may be performed by a server other than the server 14 or any other suitable device. As another example, in the aerial display space, a use permission request screen (e.g., a website) for asking the administrator or any other suitable person for permission to use the function B may be displayed as information for making the function B available to the user. The user requests the administrator or any other suitable person for permission to use the function B through the use permission request screen. When the permission is obtained, the function B becomes available to the user.

Figure 11:
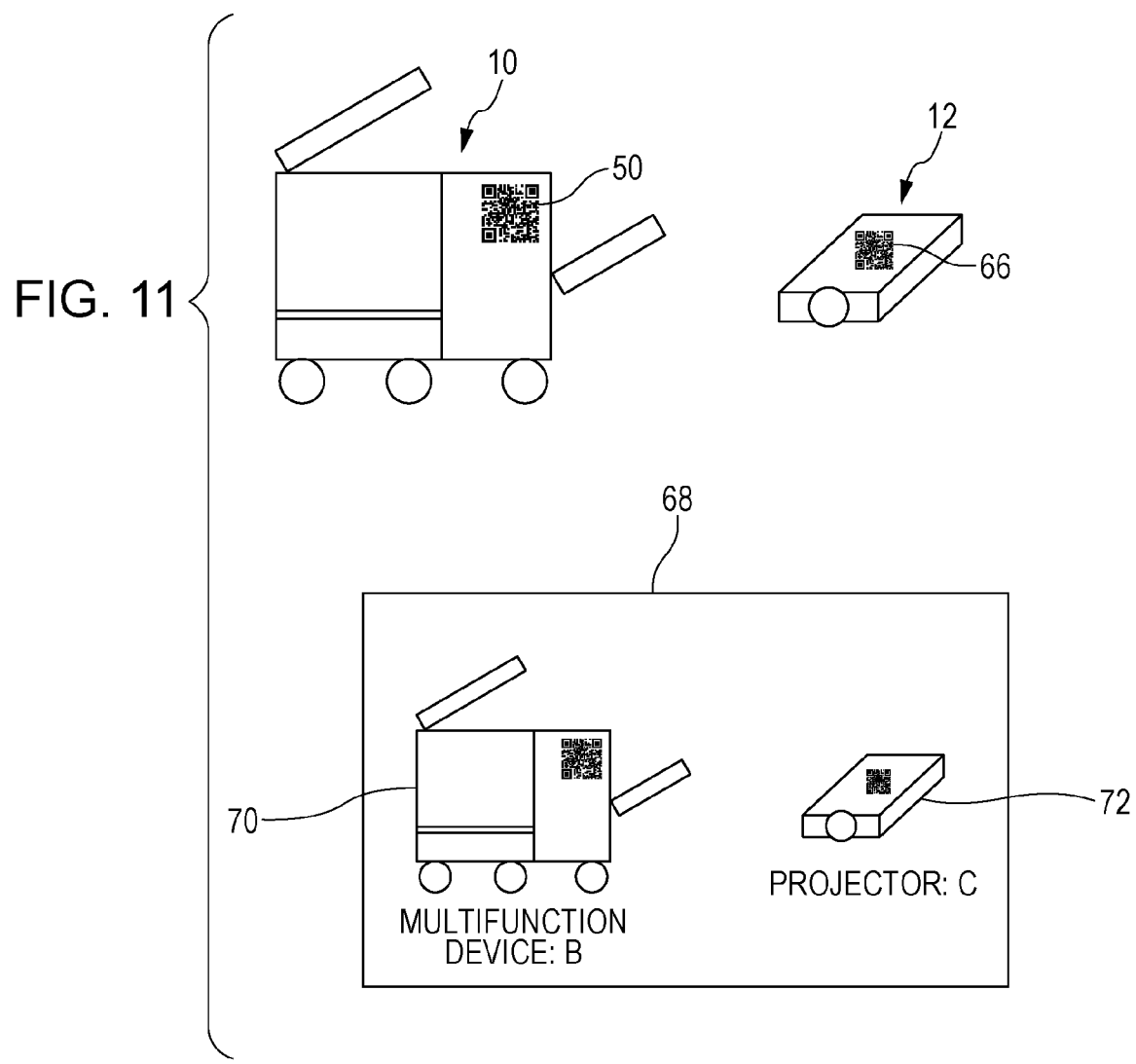
FIG. 11 illustrates devices intended for collaboration.

The following describes a process for the use of a collaborative function with reference to FIG. 11. FIG. 11 illustrates example devices intended for collaboration. As an example, the image forming device 10 and the device 12, namely, a projector (hereinafter also referred to as a projector 12), are assumed to be used as devices intended for collaboration. The image forming device 10, the projector 12, and the terminal apparatus 16 are devices that are present in the real space.

For example, the housing of the image forming device 10 has the marker 50, such as a two-dimensional barcode, and a housing of the projector 12 has a marker 66, such as a two-dimensional barcode. The marker 66 is coded information of device identification information of the projector 12. When the marker-based AR technology or the markerless AR technology is used, the user captures an image of the image forming device 10 and an image of the projector 12, which are intended for collaboration, by using the camera 42 of the terminal apparatus 16 (e.g., a smartphone). In the example illustrated in FIG. 11, an image in which the image forming device 10 and the projector 12 appear is captured such that both the image forming device 10 and the projector 12 are included in the imaging area of the camera 42. Thus, image data representing the marker 50 and image data representing the marker 66 are generated. In the aerial display space, a device display screen 68 is displayed, and the device display screen 68 shows a device image 70 interrelated with the image forming device 10 and a device image 72 interrelated with the projector 12. Each of the device images 70 and 72 may be, for example, an image captured by the camera 42. Each of the device images 70 and 72 may have a size equal to that when the image is captured or may be an enlarged or reduced image. As illustrated in FIG. 11, as in the device display screen 52, the device display screen (display frame) 68 may be additionally displayed as a display area for displaying information concerning the device images 70 and 72 in mid-air.

The image data generated by capturing an image using the camera 42 is transmitted from the terminal apparatus 16 to the server 14. In the server 14, the control unit 36 applies a decoding process to the image data to extract device identification information of the image forming device 10 and device identification information of the projector 12, thereby identifying the image forming device 10 and the projector 12. As another example, external appearance image data indicating the external appearance of the image forming device 10 and external appearance image data indicating the external appearance of the projector 12 may be generated and transmitted from the terminal apparatus 16 to the server 14. In the server 14, in this case, the control unit 36 refers to the external appearance image association information to specify the device identification information of the image forming device 10 and the device identification information of the projector 12. Thus, the image forming device 10 and the projector 12 are identified.

Further, the specifying unit 38 of the server 14 refers to the collaborative function management information 34 (e.g., the collaborative function management table illustrated in FIG. 7) to specify (or identify) a collaborative function that uses a function of the image forming device 10 and a function of the projector 12. This point will be described in detail with reference to FIG. 7. The image forming device 10 is assumed to be a "multifunction device (B)", by way of example, and the projector 12 is assumed to be a "projector (C)", by way of example. The specifying unit 38 specifies collaborative functions associated with a combination of the multifunction device (B) and the projector (C) in the collaborative function management table illustrated in FIG. 7. Thus, the collaborative functions executed by enabling collaboration between the multifunction device (B) and the projector (C) are specified. Information concerning the specified collaborative functions is transmitted from the server 14 to the terminal apparatus 16. It is to be understood that the terminal apparatus 16 may perform a process for identifying devices and collaborative functions.

On the device display screen 68, instead of an image captured by the camera 42, a previously prepared image (e.g., a graphical image (such as an icon)) interrelated with the identified image forming device 10 or an image of the image forming device 10 captured by an external camera may be displayed as the device image 70. On the device display screen 68, likewise, a previously prepared image interrelated with the identified projector 12 or an image of the projector 12 captured by an external camera may be displayed as the device image 72. As described above, data of the graphical images may be transmitted from the server 14 to the terminal apparatus 16, for example. The data of the graphical images may be stored in the terminal apparatus 16 in advance or stored in any other device.

Further, when a device is identified, information indicating the name of the device may be transmitted from the server 14 to the terminal apparatus 16, and the terminal apparatus 16 may display the name of the device on the device display screen 68. In the example illustrated in FIG. 11, the name of the image forming device 10, i.e., "multifunction device (B)", and the name of the projector 12, i.e., "projector (C)", are displayed.

Even when images of multiple devices are captured, the specifying unit 38 of the server 14 may refer to the device function management information 32 to specify the respective functions of the devices. In the example illustrated in FIG. 11, the specifying unit 38 may specify functions of the image forming device 10 and functions of the projector 12. Information concerning the specified functions may be transmitted from the server 14 to the terminal apparatus 16.

Figure 12:
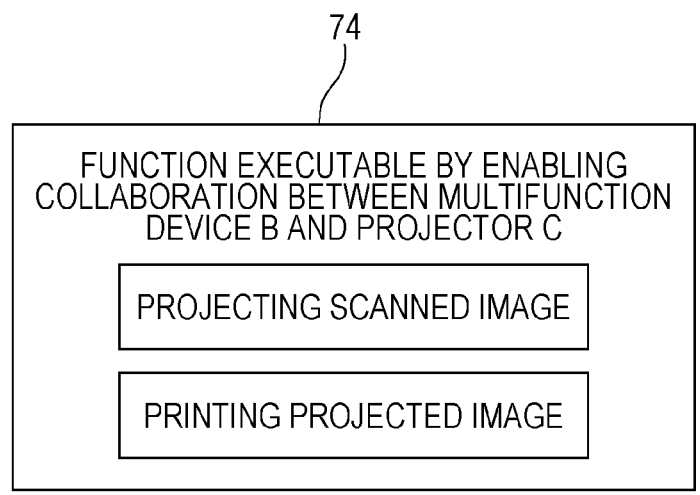
FIG. 12 illustrates an example function display screen.

When a collaborative function is specified, for example, as illustrated in FIG. 12, the control unit 48 of the terminal apparatus 16 causes a function display screen 74 to be displayed in the aerial display space and causes information concerning the collaborative function to be displayed on the function display screen 74. As illustrated in FIG. 12, as in the function display screen 56, the function display screen (display frame) 74 may be additionally displayed as a display area for displaying information concerning a collaborative function in mid-air. Examples of the information concerning a collaborative function include a button image for providing an instruction to execute the collaborative function. The multifunction device (B) and the projector (C) work in collaboration to make collaborative functions feasible. The collaborative functions include, for example, a collaborative function in which an image scanned by the multifunction device (B) is projected by the projector (C) and a collaborative function in which an image projected by the projector (C) is printed using the multifunction device (B). Button images, each for providing an instruction to execute one of the collaborative functions, are displayed on the function display screen 74. For instance, when the user designates one of the button images by using the terminal apparatus 16 and provides an instruction to execute the corresponding one of the collaborative functions, execution instruction information indicating the instruction to execute the collaborative function is transmitted from the terminal apparatus 16 to the image forming device 10 and the projector 12. Upon receipt of the execution instruction information, the image forming device 10 and the projector 12 execute the collaborative function designated by the user.

The devices intended for collaboration may be designated in accordance with user operation. For example, an image of the image forming device 10 and an image of the projector 12 are captured by the camera 42 to display, as illustrated in FIG. 11, the device image 70 interrelated with the image forming device 10 and the device image 72 interrelated with the projector 12 in the aerial display space. Each of the images interrelated with devices may be an image captured by the camera 42 or may be a previously prepared image (e.g., a graphical image (such as an icon)) interrelated with the identified device. The user designates the device images 70 and 72 on the device display screen 68, thereby designating the image forming device 10 and the projector 12 as devices intended for collaboration. For instance, when the user designates the device image 70, the marker-based AR technology or the markerless AR technology is applied to the device image 70, thereby specifying (or identifying) the image forming device 10. Likewise, when the user designates the device image 72, the marker-based AR technology or the markerless AR technology is applied to the device image 72, thereby specifying (or identifying) the projector 12. A collaborative function to be executed by the image forming device 10 and the projector 12 is thus specified, and information concerning the collaborative function is displayed in the aerial display space.

As another example, the user may touch the device image 70 on the device display screen 68 and operate the device image 70 with their finger or any other suitable object with respect to the device image 72 (e.g., move the device image 70 to the device image 72 with their fingertip or any other suitable object) to select the device images 70 and 72 and may designate the image forming device 10 and the projector 12 as devices intended for collaboration. The order or direction in which the user touches or moves the device images 70 and 72 may be opposite to that in the example described above. It is to be understood that a screen touching unit other than a finger used to move across the device display screen 68, such as a pen, may be used. The user may join the device image 70 and the device image 72 together to select the device images 70 and 72 and may designate the image forming device 10 and the projector 12 as devices intended for collaboration. The user may superimpose the device image 70 and the device image 72 on top of each other to select the device images 70 and 72 and may designate the image forming device 10 and the projector 12 as devices intended for collaboration. The user may perform a drawing operation such as encircling to designate devices intended for collaboration or may select device images interrelated with devices desired to work in collaboration within a preset time period to designate devices intended for collaboration. To cancel the collaboration, the user may designate devices between which collaboration is to be canceled on the device display screen 68 or may press a collaboration cancellation button. When a device other than the devices intended for collaboration appears in the image, the user may select the device on the device display screen 68 to remove the device from the devices intended for collaboration. The user may designate devices between which collaboration is to be canceled by performing a preset operation such as marking the devices with a cross or any other sign.

Note that the device images 70 and 72 are floating in mid-air and are actually untouchable. Since it is possible to specify the position of the device display screen 68 displayed in the aerial display space and the positions of the device images 70 and 72 displayed on the device display screen 68, the UI unit 46 detects the user touching the device images 70 and 72 on the basis of a relationship between the position of the fingertip of the user, which is detected by the human detection device 152, and the positions of the device images 70 and 72 being displayed. Alternatively, the UI unit 46 detects an operation performed by the user, such as moving or encircling, on the basis of a transition of the position of the fingertip of the user, which is detected by the human detection device 152. The position specifying unit of the UI unit 46 specifies the position of the fingertip of the user, which is detected by the human detection device 152, detects the operation performed by the user on the basis of the specified position and the transition of the position, and accepts the operation performed by the user.

Unlike a real screen on a touch panel or the like, the user is not able to move their fingertip across a screen floating in mid-air while actually touching the screen. Thus, even when the user performs an operation of moving across the screen floating in mid-air, the movement may deviate in the depth direction from what the user expected. To address this deviation, it is desirable to perform control to accept changes in position, or deviation, in the depth direction within a predetermined range in accordance with a movement of the fingertip in the two-dimensional direction (i.e., the x- and y-axis directions).

Also in the operation of touching (or contacting) a screen, in view of an operation performed by the user on an actual touch panel, an operation performed by the user at a position slightly deeper, or farther away from the user, than the position of an image being displayed in the aerial display space may be detected as a touch (or contact), instead of an operation performed by the user with the position of their fingertip in the depth direction (i.e., the z-axis direction) in the aerial display space being matched with the position of the image being displayed in the aerial display space (the position of the image in the depth direction), that is, instead of an operation performed by the user with the z-coordinate value of the detected fingertip and the z-coordinate value of a touched position in the image being identical.

The images of the devices intended for collaboration may be captured separately. For example, the camera 42 performs an image capturing operation multiple times to identify each of the devices intended for collaboration. When the camera 42 performs an image capturing operation multiple times, device identification information of a device identified during each session of image capturing is stored in the storage unit 30 of the server 14 or in the storage unit 44 of the terminal apparatus 16. For example, an image of the image forming device 10 is captured in such a manner that the image forming device 10 is included in the imaging area of the camera 42, and then an image of the projector 12 is captured in such a manner that the projector 12 is included in the imaging area of the camera 42. Thus, image data for the image forming device 10 and image data for the projector 12 are generated. The marker-based AR technology or the markerless AR technology is applied to the pieces of generated image data to specify (or identify) the image forming device 10 and the projector 12, and a collaborative function that uses a function of the image forming device 10 and a function of the projector 12 is specified (or identified). For instance, the devices intended for collaboration may be located far away from each other, and both the image forming device 10 and the projector 12 may not be included in the imaging area of the camera 42. In this case, the angle of the imaging area of the camera 42 may be changed or the size of the imaging area may be increased or reduced to enable the imaging area of the camera 42 to include the image forming device 10 and the projector 12. If the imaging area of the camera 42 does not include both the image forming device 10 and the projector 12 even through the operation described above, the image capturing operation may be performed multiple times to identify the devices intended for collaboration.

As another example, one of the devices intended for collaboration may be set as a basic collaborative device in advance. For example, the image forming device 10 is assumed to be set as a basic collaborative device in advance. Device identification information of a basic collaborative device may be stored in the storage unit 30 of the server 14 or in the storage unit 44 of the terminal apparatus 16 in advance. The user may designate a basic collaborative device by using the terminal apparatus 16. When a basic collaborative device has been set, the user captures an image of one of the devices intended for collaboration, other than the basic collaborative device, by using the camera 42 of the terminal apparatus 16. Thus, the devices intended for collaboration are specified (or identified), and a collaborative function that uses a function of the basic collaborative device and a function of the device whose image has been captured is specified (or identified).

In the example described above, the marker-based AR technology or the markerless AR technology is used. Alternatively, the position information AR technology may be used. For example, the terminal apparatus 16 has a GPS function. The terminal apparatus 16 acquires terminal position information indicating the position of the terminal apparatus 16 and transmits the terminal position information to the server 14. The control unit 36 of the server 14 refers to position association information indicating association between device position information indicating installation positions of devices and device identification information of the devices and specifies devices located within a preset range relative to the position of the terminal apparatus 16 as candidate collaborative devices. For example, a multifunction device, a PC, a printer, and a scanner are assumed to be located within a preset range relative to the position of the terminal apparatus 16. In this case, the multifunction device, the PC, the printer, and the scanner are specified as candidate collaborative devices. Device identification information of the candidate collaborative devices is transmitted from the server 14 to the terminal apparatus 16 and is displayed in the aerial display space. As the displayed device identification information, respective images of the candidate collaborative devices or character strings such as device IDs of the candidate collaborative devices may be displayed. The user designates devices intended for collaboration from among the candidate collaborative device group displayed in the aerial display space. The device identification information of the devices intended for collaboration, which are designated by the user, is transmitted from the terminal apparatus 16 to the server 14, and the server 14 specifies a collaborative function on the basis of the device identification information of the devices intended for collaboration. In the aerial display space, information concerning the collaborative function is displayed. A process for specifying candidate collaborative devices and a process for specifying a collaborative function may be performed by the terminal apparatus 16.

When AR technology or the like fails to identify a target device whose image is to be captured, a device image representing the target device may not be displayed on a device display screen. This may improve the visibility of identified devices. For instance, when identified devices and unidentified devices are concurrently present and images thereof are captured by the camera 42, device images representing the unidentified devices are hidden. This allows device images representing the identified devices to be displayed without being occluded by the device images representing the unidentified devices. Thus, the visibility of the identified devices may be improved. Alternatively, the device images representing the identified devices may be displayed in a highlighted way. For example, the device images representing the identified devices may be displayed in a specific color, may be displayed with the edges thereof enhanced, may be displayed enlarged, or may be displayed vibrating. This may improve the visibility of the identified devices.

Figure 13:
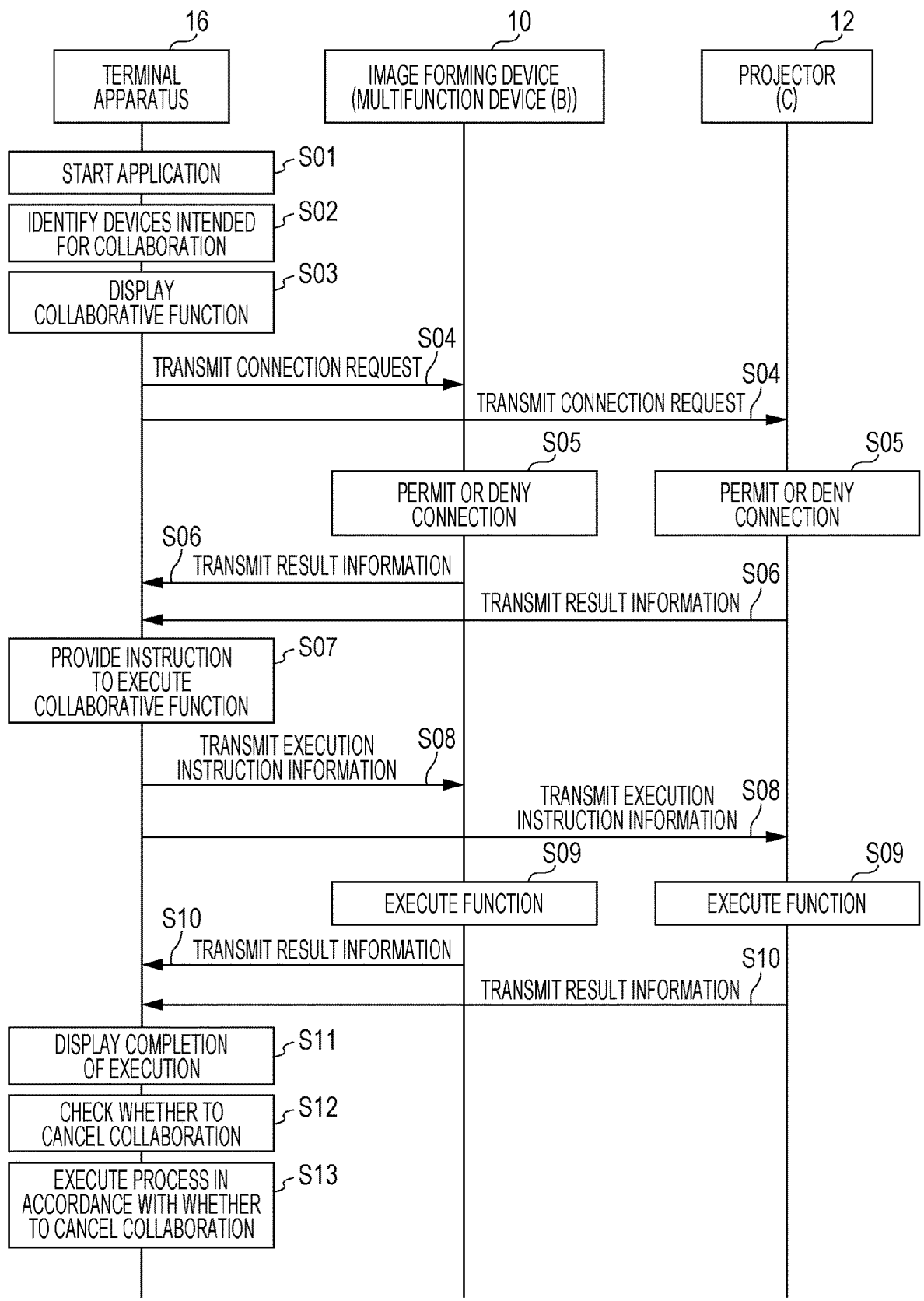
FIG. 13 is a sequence diagram illustrating a connection process.

The following describes a process for executing a function of a device. As an example, a process for executing a collaborative function will be described. In this case, the terminal apparatus 16 transmits a connection request to devices intended for collaboration, and a connection is established between the terminal apparatus 16 and each of the devices intended for collaboration. The following describes this connection process with reference to FIG. 13. FIG. 13 is a sequence diagram illustrating the process.

First, the user provides an instruction to start an application (program) for executing a device function by using the terminal apparatus 16. The control unit 48 of the terminal apparatus 16 starts the application in accordance with the instruction (S01). The application may be stored in the storage unit 44 of the terminal apparatus 16 in advance or may be downloaded from the server 14 or the like.

Then, the marker-based AR technology, the markerless AR technology, or the position information AR technology is applied to identify devices intended for collaboration (S02). It is to be understood that a technology other than AR technology may be applied to identify devices intended for collaboration. When the marker-based AR technology or the markerless AR technology is applied, for example, the user captures images of the devices intended for collaboration by using the camera 42 of the terminal apparatus 16. As an example, the image forming device 10 (i.e., the multifunction device (B)) and the projector 12 (i.e., the projector (C)) are used as devices intended for collaboration. In this case, the user captures an image of the image forming device 10 and an image of the projector 12 by using the camera 42. The device identification information of the image forming device 10 and the device identification information of the projector 12 are acquired, and the image forming device 10 and the projector 12 are identified as devices intended for collaboration. When the position information AR technology is applied, the position information of the image forming device 10 and the position information of the projector 12 are acquired, and the device identification information of the image forming device 10 and the device identification information of the projector 12 are specified on the basis of the respective pieces of position information. As a result, the image forming device 10 and the projector 12 are identified.

For instance, when the user provides an instruction for displaying a collaborative function, a collaborative function that uses functions of the multiple identified devices is identified. Information concerning the identified collaborative function is displayed in the aerial display space (S03). The process for identifying a collaborative function may be performed by the server 14 or by the terminal apparatus 16.

Then, when the user designates a collaborative function to be executed by using the terminal apparatus 16, the terminal apparatus 16 transmits information indicating a connection request to the devices intended for collaboration (e.g., the image forming device 10 and the projector 12) that execute the collaborative function (S04). For instance, when the server 14 stores address information indicating the addresses of the devices intended for collaboration, the terminal apparatus 16 acquires the address information indicating the addresses of the devices intended for collaboration from the server 14. When the address information is included in the device identification information, the terminal apparatus 16 may acquire the address information indicating the addresses of the devices intended for collaboration from the identification information of the devices intended for collaboration. As another example, the terminal apparatus 16 may store address information indicating the addresses of the devices intended for collaboration. It is to be understood that the terminal apparatus 16 may acquire the address information indicating the addresses of the devices intended for collaboration by using any other technique. The terminal apparatus 16 transmits information indicating a connection request to the devices intended for collaboration (e.g., the image forming device 10 and the projector 12) by using the address information indicating the addresses of the devices intended for collaboration (e.g., the image forming device 10 and the projector 12).

Upon receipt of the information indicating the connection request, each of the image forming device 10 and the projector 12 permits or denies a connection with the terminal apparatus 16 (S05). For example, if the image forming device 10 and the projector 12 are devices for which a connection with the terminal apparatus 16 is not permitted or devices with which the number of apparatuses or devices requesting connection exceeds the upper limit, the connection is denied. If the connection requested by the terminal apparatus 16 is permitted, the terminal apparatus 16 may be prohibited from changing setting information unique to the image forming device 10 and setting information unique to the projector 12. For example, the operation of changing color parameters of the image forming device 10, a setting time for the transition to the power-saving mode, or the like may be prohibited. This may improve security for devices intended for collaboration. As another example, when devices work in collaboration, the ability to change setting information may be restricted more than that when the devices are used alone without working in collaboration. For example, fewer setting items than that when the devices are used alone may be changed. In addition, personal information of other users, such as operating history, may be inhibited from being viewed. This may improve security for personal information of users.

Result information indicating permission or denial of connection is transmitted from each of the image forming device 10 and the projector 12 to the terminal apparatus 16 (S06). When connection with the image forming device 10 and the projector 12 is permitted, communication is established between the terminal apparatus 16 and each of the image forming device 10 and the projector 12.

Then, the user provides an instruction to execute the collaborative function by using the terminal apparatus 16 (S07). In accordance with the instruction, execution instruction information indicating the instruction for executing the collaborative function is transmitted from the terminal apparatus 16 to the image forming device 10 and the projector 12 (S08). The execution instruction information transmitted to the image forming device 10 includes information (e.g., job information) indicating a process to be executed by the image forming device 10, and the execution instruction information transmitted to the projector 12 includes information (e.g., job information) indicating a process to be executed by the projector 12.

Upon receipt of the execution instruction information, the image forming device 10 and the projector 12 execute the function in accordance with the execution instruction information (S09). For instance, when the collaborative function includes a process for transmitting and receiving data between the image forming device 10 and the projector 12, such as a function of transferring scan data from the image forming device 10 (i.e., the multifunction device (B)) to the projector 12 (i.e., the projector (C)) and projecting the data using the projector 12, communication is established between the image forming device 10 and the projector 12. In this case, for example, the execution instruction information transmitted to the image forming device 10 includes address information indicating the address of the projector 12, and the execution instruction information transmitted to the projector 12 includes address information indicating the address of the image forming device 10. These pieces of address information are used to establish communication between the image forming device 10 and the projector 12.

When the execution of the collaborative function is completed, information indicating the completion of the execution of the collaborative function is transmitted from the image forming device 10 and the projector 12 to the terminal apparatus 16 (S10). The information indicating the completion of the execution of the collaborative function is displayed in the aerial display space (S11). When the information indicating the completion of the execution of the collaborative function is not displayed after a preset time has elapsed since the time point when the execution instruction was provided, the control unit 48 of the terminal apparatus 16 may display information indicating an error in the aerial display space and may transmit execution instruction information or information indicating a connection request to the image forming device 10 and the projector 12 again.

Then, the user checks whether to cancel collaboration between the image forming device 10 and the projector 12 (S12), and a process is executed in accordance with whether to cancel the collaboration (S13). When the collaboration is canceled, the user provides a cancellation instruction by using the terminal apparatus 16. In accordance with this instruction, communication is disabled between the terminal apparatus 16 and each of the image forming device 10 and the projector 12. Likewise, communication is also disabled between the image forming device 10 and the projector 12. When the collaboration is not canceled, an execution instruction may be continuously provided.

More devices may work in collaboration. For example, device identification information of a third device may be acquired and a collaborative function that is executed by enabling collaboration between three devices including the image forming device 10 and the projector 12 may be specified. Information indicating that the image forming device 10 and the projector 12 have been identified as devices that execute the collaborative function is stored in the server 14 or the terminal apparatus 16.

Device identification information indicating devices intended for collaboration or collaborative function information indicating an executed collaborative function may be stored in the terminal apparatus 16, the server 14, or the like. For example, user account information (user identification information) of a user who uses the terminal apparatus 16 may be acquired, and history information may be created and stored in the terminal apparatus 16, the server 14, or the like. The history information indicates association among the user account information, the device identification information indicating the devices intended for collaboration, and the collaborative function information indicating the executed collaborative function. The history information may be created by the terminal apparatus 16 or by the server 14. The history information is referred to, thereby specifying which collaborative function has been executed and which devices have been used to execute the collaborative function.

The devices intended for collaboration (e.g., the image forming device 10 and the projector 12) may store, as history information, user account information of a user who has sent a connection request or terminal identification information indicating the terminal apparatus 16 of the sender of the connection request. The history information is referred to, thereby specifying a user who has used a device. The history information may be used to specify a user for specific purposes such as determining who was using a device when the device was broken or charging a user fee for consumables. The history information may be stored in the server 14 or the terminal apparatus 16 or may be stored in any other device.

The user account information is stored in, for example, the storage unit 44 of the terminal apparatus 16 in advance. The control unit 48 of the terminal apparatus 16, which functions as an example of a user identification unit, reads user account information of a user from the storage unit 44 and identifies a user who uses the terminal apparatus 16. When the storage unit 44 stores multiple pieces of user account information of users, the user designates the user account information thereof by using the terminal apparatus 16. Thus, the user account information of the user is read, and the user is identified. As another example, the control unit 48 of the terminal apparatus 16 may read user account information of a user logging into the terminal apparatus 16 to identify the user. As still another example, when the terminal apparatus 16 stores user account information of only one user, the control unit 48 of the terminal apparatus 16 may read the user account information to identify the user. When no user account is set up or no user account information is created, an initial setup is performed to create user account information.

A history of using collaborative functions may be managed for each user, and information indicating collaborative functions previously used by a user indicated by read user account information may be displayed in the aerial display space. Information indicating the history of using collaborative functions may be stored in the terminal apparatus 16 or in the server 14. Alternatively, information indicating a collaborative function used with a frequency equal to or greater than a preset frequency of use may be displayed. Such a shortcut function may reduce the time taken for a user to perform an operation related to collaborative functions.

When a standalone function is to be executed, information indicating an instruction for executing the standalone function is transmitted from the terminal apparatus 16 to a device that executes the standalone function. The device executes the standalone function in accordance with the execution instruction.

The foregoing has described a process for the use of a standalone device and a process for the use of a collaborative function. The foregoing has also described a process for executing a function of a device. In the foregoing description, a two-dimensional image (planar image) is used as an image of a device to be operated, for convenience. When a space is represented using a coordinate system, a two-dimensional image is an image having no depth direction, which can be represented by the x-axis direction and the y-axis direction, whereas a three-dimensional image (stereoscopic image) is an image additionally having information in the depth direction (i.e., the z-axis direction). In other words, a two-dimensional image only allows a function such as the printing function or the function A, as illustrated in FIG. 9 or FIG. 10, to be associated with a position on (a surface of) a device, whereas a three-dimensional image allows information to be associated with a position in the depth direction of the device. That is, a three-dimensional image allows a function to be associated with a position in the depth direction of the device, that is, a position inside the device. For example, functions can be associated with positions in the depth direction of a device appearing in a three-dimensional image such that the function A is associated with a surface of the device and the function B is associated with the center of the device. In other words, the function A can be associated with a position (x1, y1, z1) in the three-dimensional image and the function B can be associated with a position (x1, y1, z2) in the same three-dimensional image. Accordingly, different functions can be associated with positions indicated by the same coordinate values (x1, y1) in the two-dimensional coordinate system in accordance with depth information (the z-coordinate value).

A device image appearing in the aerial display space is typically an image of the exterior (front surface) of a device and is displayed in such a manner that the inside of the device is invisible. In addition, as described above, an image displayed in the aerial display space is actually untouchable if a person desires to touch it. That is, if a user moves their fingertip to a position inside the device in the device image being displayed in the aerial display space from the exterior (front surface) of the device in the device image to touch the inside of the device in the device image, the user may not be able to visually locate the position pointed at with their fingertip. In this case, the user may not be able to visually determine to which position inside the device, which is an illusion, the user has reached their hand, that is, which position in the device image is being pointed at.

Accordingly, the control unit 48 according to this exemplary embodiment is configured to perform, in addition to the display control described above, control to display an image in accordance with information in the depth direction of an image being displayed in the aerial display space. First, a fundamental operation according to this exemplary embodiment will be described with reference to FIG. 14 and FIG. 15.

Figure 14:
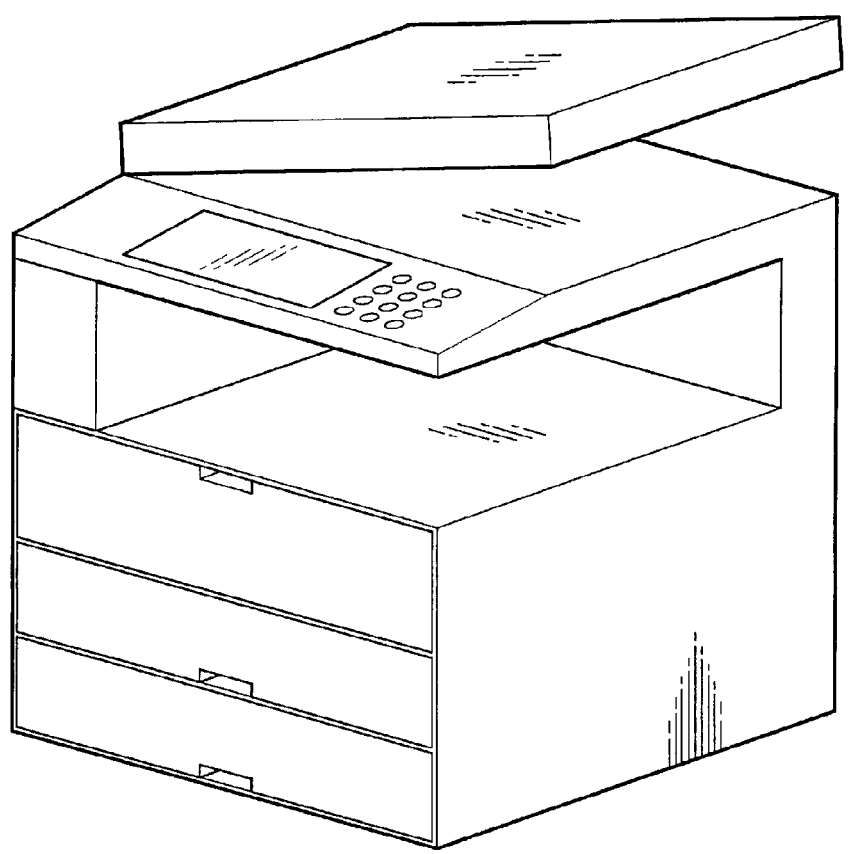
FIG. 14 illustrates a schematic three-dimensional image of a multifunction device displayed in an aerial display space in the first exemplary embodiment.

FIG. 14 illustrates an image of a multifunction device as an example image being displayed in the aerial display space. An image of the multifunction device, viewed by the user immediately from the front, is a front-view image thereof (an image viewed in a plane facing the user), which is similar to a two-dimensional image, and the depth of the image is difficult to recognize. Thus, in the image illustrated in FIG. 14, the multifunction device is illustrated in perspective view, for convenience of illustration. In this way, the image is stereoscopically displayed in the aerial display space.

Figure 15:
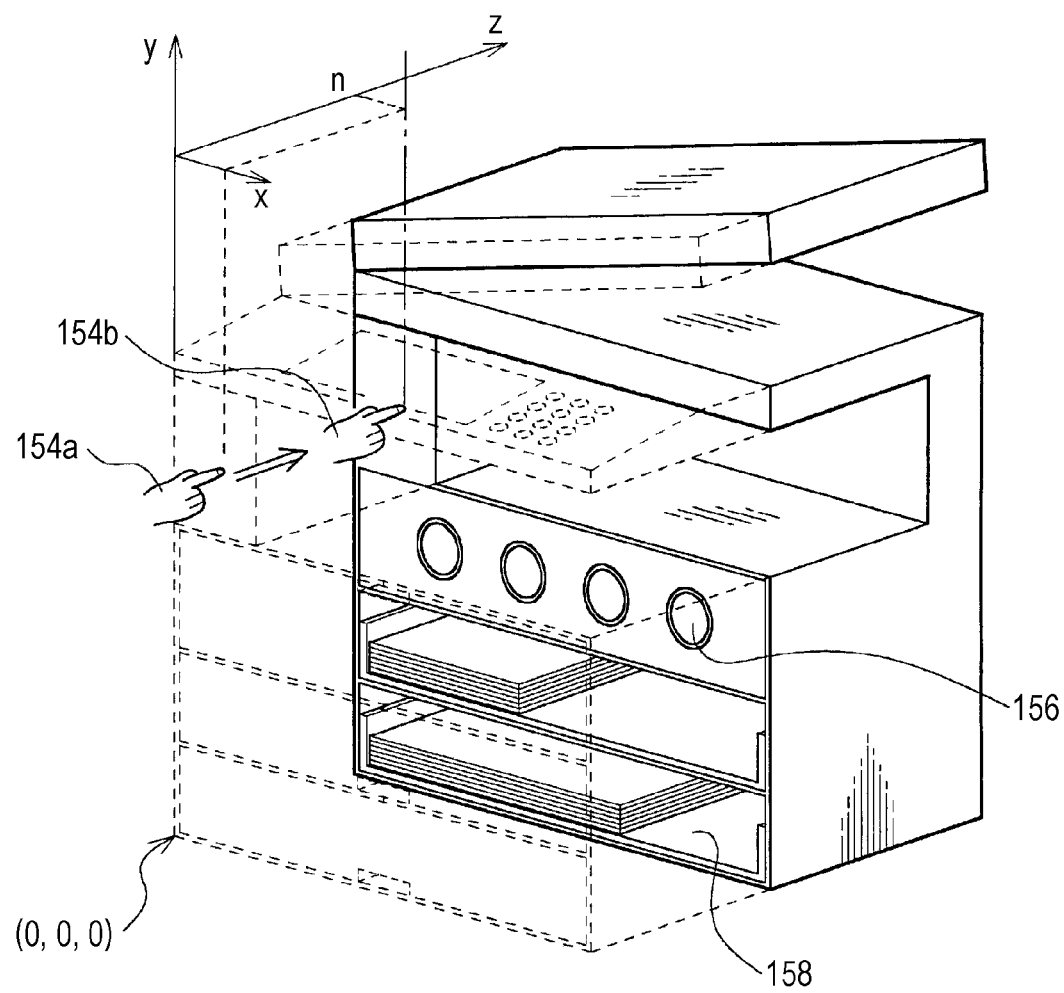
FIG. 15 illustrates a schematic three-dimensional image of the multifunction device displayed in the aerial display space when a certain position inside the multifunction device appearing in the image illustrated in FIG. 14 is pointed at with a fingertip.

FIG. 15 illustrates an image of the multifunction device, which is displayed in the aerial display space, when the user inserts their fingertip into the multifunction device in the image being displayed in the manner illustrated in FIG. 14. As illustrated in FIG. 15, the lower left corner of the image, that is, the position at which corners of the left side surface and front surface (i.e., the surface facing the user) of the image overlap the bottom of the image (i.e., the floor surface on which the multifunction device is installed), is set as the origin (0, 0, 0). Further, a direction that is the horizontal direction of the floor and is also the width direction of the device image is represented as the x-axis direction, a direction that is the vertical direction of the floor (i.e., the height direction of the device image) is represented as the y-axis direction, and a direction that is the horizontal direction of the floor and is also the depth direction of the device image is represented as the z-axis direction. In this case, the position of a fingertip 154a that is in contact with the surface of the image has a depth of 0 (z=0), which is similar to that in an operation on a two-dimensional image. A direction toward the inside of the multifunction device appearing in the image from the position indicated by z=0 (i.e., the front surface of the external appearance image) is the depth direction of the image and is the positive z direction. When the user does not touch the image with their fingertip and when the fingertip of the user is in contact with the front surface of the image (z≤0), as illustrated in FIG. 14, the image of the external appearance of the multifunction device is displayed in the aerial display space. That is, the image of the entirety of the multifunction device is displayed.

In this state, when the user inserts their fingertip into the multifunction device, an image illustrated in FIG. 15 is displayed. In FIG. 15, an example display is illustrated which is obtained when the user moves their fingertip to the position indicated by z=n (where n is a positive number). Note that the fingertip remains inside the multifunction device (at a position farther away from the user than the exterior of the multifunction device in the image), irrespective of the x and y coordinate values.

If the display style of the image is not changed depending on the position of the fingertip, that is, if the displayed image illustrated by way of example in FIG. 14 remains unchanged, the user is able to view only the exterior of the multifunction device. Thus, an image portion representing the position pointed at with the fingertip (an interior image of the device image) is invisible.

In this exemplary embodiment, accordingly, the display of an image is controlled in accordance with the position of the fingertip. In this exemplary embodiment, the term "information in the depth direction of an image" refers to information indicating the position of the fingertip and is represented by coordinate values. In the example display exemplarily illustrated in FIG. 15, the user points at a position at a depth of n (z=n) with a fingertip 154b. In FIG. 15, the exterior (such as the contour) of a portion of the multifunction device in the image located in a range of z=n to z=0 is depicted in broken lines. The control unit 48 of the terminal apparatus 16 performs display control on the image portion included in this range.

For example, in this exemplary embodiment, the color depth used to display the image is controlled. For example, the image portion included in the range of z=0 to n is displayed in a lighter color. The use of a lighter color makes the interior image of the device image, more specifically, an image portion located at the position indicated by z=n, visible. Alternatively, the image portion included in the range of z=0 to n may be displayed in a transparent color. The use of a transparent color makes the exterior (the contour) of the portion of the multifunction device in the image included in the range of z=0 to n invisible. This ensures that the image portion located at the position indicated by z=n is visible, compared with when the image portion included in the range of z=0 to n is displayed in a lighter color. Alternatively, when the image portion included in the range of z=0 to n is displayed in a transparent color, the contour of the multifunction device may still be made visible.

In this way, the control unit 48 slices the device image at a position (z=n) pointed at by the user in the depth direction to obtain a cross-sectional plane and performs display control to display an image portion closer to the user relative to the cross-sectional plane, that is, the image portion included in the range of z=0 to n, in a lighter color or a transparent color.

In some cases, the aerial display device 150 displays an image in the aerial display space in such a manner that the image is entirely displayed in a light color or a semi-transparent color. The term "semi-transparent color" refers to a color that allows a background behind the image to be seen through the image. In this case, an interior image of a portion of the device located at the position indicated by z=n may be still difficult to see even if the image portion included in the range of z=0 to n is displayed in a lighter color. To address this difficulty, the control unit 48 may perform control to display the image portion located at the position indicated by z=n in a darker color. That is, the control unit 48 may slice the device image at a position (z=n) pointed at by the user in the depth direction to obtain a cross-sectional plane and may perform display control to display an image portion on the cross-sectional plane in a darker color. In this way, the color of the interior image of a portion of the device including a position (z=n) designated by the user may be controlled.

In the foregoing description, in display control with the use of a lighter color or a transparent color, the color of the entire image portion included in the range of z=0 to n is controlled. Alternatively, the color of only part of the image portion included in the range of z=0 to n may be controlled. For example, display control may be performed such that only an image portion included in the range of z=0 to n within a predetermined range centered on a position (x1, y1) pointed at with the fingertip 154b is displayed in a lighter color. This may also apply to display control to increase the color depth. That is, display control may be performed such that only an image portion located at a position indicated by z=n within a predetermined range centered on a position (x1, y1, z1=n) pointed at with the fingertip 154b is displayed in a darker color. In this way, display control may be performed on a portion of the image included in a range (z=0 to n) closer to the user relative to a position (z=n) designated by the user or may be performed on a portion of the interior image of the device including a portion located at the position (z=n) designated by the user. This may facilitate visual recognition of at least a position pointed at by the user with the fingertip 154b. Note that no visible image (i.e., no image to be displayed) is associated with a position where an actual device has no object in a hollow or the like, and thus no need exists to control the color of an image portion at such a non-object position.

The device function management information 32 stored in the server 14 includes the external appearance images and interior images of the devices 10 and 12, which may be displayed in the aerial display space, as well as those of the multifunction device illustrated in FIG. 14. The device function management information 32 also includes information on the position of each part of the devices 10 and 12 and an image of each part of the devices 10 and 12. When the position specifying unit detects a fingertip in the aerial display space, the terminal apparatus 16 transmits information on the display position of the multifunction device in the aerial display space and the position of the fingertip in the aerial display space, which is specified by the position specifying unit, to the server 14. The server 14 transmits the image of the device and the image of the part located at the position (z=n) of the fingertip to the terminal apparatus 16 in accordance with the transmitted information. The terminal apparatus 16 forms a cross-sectional image at the position indicated by z=n on the basis of the images transmitted from the server 14 and displays the cross-sectional image in the aerial display space. The server 14 transmits the external appearance image of the multifunction device to the terminal apparatus 16 when displaying the image of the multifunction device in the aerial display space. At this time, the server 14 may also transmit the images of parts and position information and the like of the parts, which may be necessary to display an image of the inside of the multifunction device. This eliminates the need for the terminal apparatus 16 to transmit information such as information on the position of the fingertip to the server 14 each time the fingertip moves. Alternatively, the device function management information 32 including information concerning the parts of the device may be stored in the terminal apparatus 16. In some cases, the terminal apparatus 16 displays a device image in an enlarged or reduced manner. Thus, it is desirable to store the device function management information 32 in the terminal apparatus 16. In the description with reference to FIG. 15, the device function management information 32 is stored in the terminal apparatus 16.

As described above, in this exemplary embodiment, controlling the color depth used to display an image facilitates visual recognition of an interior image of a device. When the color depth is controlled, that is, when the color depth is changed, changes in color may be controlled. That is, the speed or timing of changing the color may be controlled together with the color depth. For instance, when a position (z=n) in the depth direction is designated with the fingertip, the currently displayed color of an image portion located in the range of z=0 to n may be gradually changed to a predetermined color. The term "gradually" refers to changes in color depth that occur stepwise. The speed of change may or may not increase monotonously (or constantly). Alternatively, the changes in color may be controlled in accordance with the movement of the fingertip. That is, as the fingertip moves across the device image from the position z=0 to the position z=n in the depth direction, the colors at the positions through which the fingertip has passed in the depth direction become lighter. That is, the color depth gradually decreases in the direction away from the front surface of the device image in accordance with the movement of the fingertip.

When the color depth of the image portion located in the range of $z=0$ to n decreases, the term "predetermined color" refers to a color that makes the image portion located at the position indicated by $z=n$ visible. When the color depth of the image portion located at the position indicated by $z=n$ increases, the predetermined color is a color that makes the image portion located at the position indicated by $z=n$ visible. The image portion located at the position indicated by $z=n$ is displayed in, desirably but not limited to, the original color of the device.

Alternatively, the currently displayed color may be instantaneously changed to a predetermined color after a predetermined time has elapsed since the user designated a position with their fingertip. The predetermined time may be set as desired. The predetermined color is as described above.

As described above, this exemplary embodiment may allow an image portion at a position pointed at by the user in the depth direction (an image of the inside of a stereoscopic image) to be displayed in a visible manner.

Also in a three-dimensional image, functions are associated with positions on a device image in the way described above with reference to a two-dimensional image, and the functions can be executed in accordance with user operation. In a three-dimensional image, functions can also be associated with positions in the depth direction in addition to positions on a device image. To this end, information indicating functions of each device, which are included in the device function management information 32, includes information indicating functions associated with parts of the device or predetermined positions inside the device. For instance, each of toner cartridges 156 illustrated in FIG. 15 is assumed to be associated with a function (application) of displaying information concerning the toner cartridge. In addition, each of paper trays 158 is assumed to be associated with a function (application) of displaying information concerning the paper tray.

A user has pointed at (a cross-sectional image of) one of the toner cartridges 156 with their fingertip. In this case, the terminal apparatus 16 refers to the device function management information 32 to specify a function corresponding to the position of the fingertip (the toner cartridge 156), which is specified by the position specifying unit. Accordingly, toner cartridge related information, for example, information indicating the toner color, the remaining amount of toner, the recommended replacement (replenishment) time, and so on, is displayed in the aerial display space. The toner cartridge related information may include only information specific to a designated one of the toner cartridges 156 or information on all the toner cartridges 156.

A user has pointed at (a cross-sectional image of) one of the paper trays 158 with their fingertip. In this case, the terminal apparatus 16 refers to the device function management information 32 to specify a function corresponding to the position of the fingertip (the paper tray 158), which is specified by the position specifying unit. Accordingly, paper tray related information (such as the sheet size and the remaining number of sheets) is displayed in the aerial display space. The paper tray related information may include only information on a designated one of the paper trays 158 or information on all the paper trays 158.

The terminal apparatus 16 acquires the toner cartridge related information and the paper tray related information, described above for the illustrative purpose, by inquiring of the multifunction device being displayed. The acquired information may be displayed in an unoccupied portion of the aerial display space together with the image of the multifunction device being displayed or may be displayed instead of the image of the multifunction device. When the position pointed at with the fingertip shifts from the image of one of the toner cartridges 156 or one of the paper trays 158, the currently displayed information may be deleted immediately or after a predetermined time has elapsed or may remain displayed until any other function is executed. When the image of the multifunction device has been deleted, the image of the multifunction device may be displayed again.

The foregoing has described control such that an image portion closer to the user relative to the position ($z=n$) pointed at by the user in the depth direction, that is, an image portion located in the range of $z=0$ to n, is displayed in a lighter color and control such that an image portion located at the position ($z=n$) pointed at by the user in the depth direction is displayed in a darker color. That is, in any case, a device image is sliced at the position indicated by $z=n$ to obtain a cross-sectional plane, and an interior image of the device image on the cross-sectional plane is displayed so as to be visible to the user. In this respect, the image to be provided to the user is not limited to an image in a simple cross-sectional plane obtained by slicing the image at the position indicated by $z=n$. The following describes modifications of an interior image of a device provided to the user with reference to FIGS. 16A to 16H.

FIGS. 16A to 16H illustrate images (planar images) displayed in the aerial display space, as viewed exactly from above. Each of the planar images is depicted as a rectangular shape, for convenience of illustration. In FIGS. 16A to 16H, the x- and z-coordinate axes are illustrated, with the lower left corner of each of the planar images being set as the origin. A user is assumed to view each of the images from the lower portion to the upper portion in FIGS. 16A to 16H. That is, the surface of each of the images that the user faces (i.e., the user's viewing side) lies in a lower portion of each of FIGS. 16A to 16H.

In FIGS. 16A to 16H, the arrows indicate directions in which the user points at the images with their fingertip, that is, directions in which positions within the images are designated. That is, as exemplarily illustrated in FIGS. 16A to 16H, the direction in which the user points at a point in the image with their fingertip is not always identical to the direction in which the user views the image (i.e., the direction from the lower portion to the upper portion in FIGS. 16A to 16H). The position of the head of each of the arrows indicates a position pointed at by the user and corresponds to the position of the fingertip. In FIGS. 16A to 16H, image portions corresponding to hatched regions are image portions to be subjected to display control so as to be displayed in a lighter color. In addition, cross-sectional planes are indicated by broken lines. Image portions on the cross-sectional planes are image portions to be subjected to display control so as to be displayed in a darker color. The following describes how a cross-sectional plane, that is, a boundary plane for which the color is to be controlled (i.e., a plane that forms the boundary between the region shown hatched and the region not shown hatched in each of FIGS. 16A to 16H), is set for a position pointed at by the user.

Figure 16A:
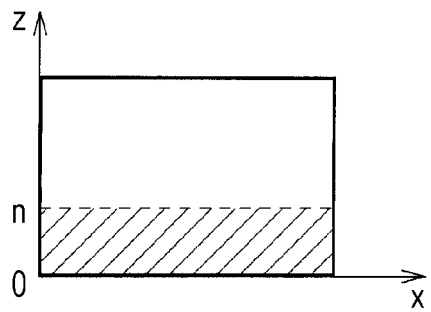
FIGS. 16A to 16H illustrate patterns of forming an interior image to be provided to a user in the first exemplary embodiment.

FIG. 16A illustrates an example in which display control is performed in the way described above with reference to FIG. 15. That is, FIG. 16A illustrates that the user points at an image portion located at the position indicated by $z=n$. In FIG. 16A, a plane facing the user and including a designated position in the depth direction (i.e., a plane perpendicular to the viewing direction of the user) is used as a cross-sectional plane regardless of the direction in which the position is designated by the user. For this reason, no arrow is illustrated in FIG. 16A.

Figure 16B:
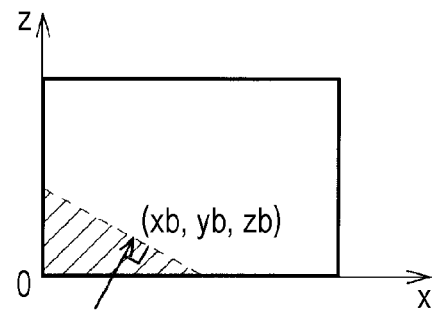

In the example of display control illustrated in FIG. 16B, when the user designates a position within the image, a cross-sectional plane that includes the designated position (xb, yb, zb) in the depth direction and that is perpendicular to the direction in which the position is designated is used as a boundary plane. Then, an image portion closer to the user relative to the designated position in the direction in which the position is designated is to be subjected to display control so as to be displayed in a lighter color. If the user designates the position exactly from the front (the viewing side), the same image as that illustrated in FIG. 16A is obtained.

Figure 16C:
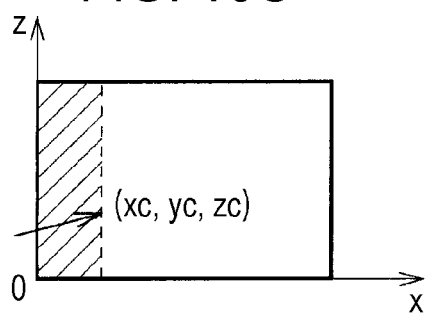

In the example of display control illustrated in FIG. 16C, when the user designates a position (xc, yc, zc) within the image, the device image is sliced along a plane (x=xc) including the designated position and extending along the z axis to form a boundary plane. Then, an image portion closer to the user relative to the designated position in the direction in which the position is designated is to be subjected to display control so as to be displayed in a lighter color. In FIG. 16C, the user designates the position from the left in FIG. 16C. Thus, a portion of the device image located in a hatched left-hand portion (x=0 to xc) is to be subjected to display control.

Figure 16D:
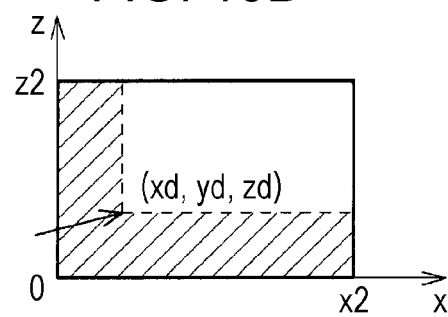

In the example of display control illustrated in FIG. 16D, when the user designates a position (xd, yd, zd) within the image, the device image is sliced along a plane (x=xd) extending along the z axis and a plane (z=zd) extending along the x axis, both planes including the designated position, to form a boundary plane. Then, an image portion closer to the user relative to the designated position in the direction in which the position is designated is to be subjected to display control so as to be displayed in a lighter color. In FIG. 16D, the user designates the position from the left in FIG. 16D. Thus, a portion of the device image located in a hatched left-hand portion is to be subjected to display control.

Figure 16E:
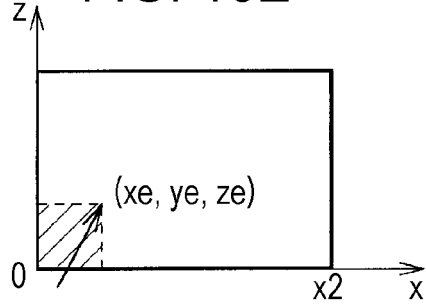

In the example of display control illustrated in FIG. 16E, when the user designates a position (xe, ye, ze) within the image, an image portion closer to the user relative to the designated position in the direction in which the position is designated is to be subjected to display control. In FIG. 16E, the user designates the position obliquely from the left in FIG. 16E. Thus, a boundary plane is formed in such a manner that the designated position is designated as the corner of the boundary plane opposite the origin and in such a manner that an image portion in a range of x=0 to xe and z=0 to ze is cut away from the entire image. Then, a portion of the device image located in a hatched left-hand portion is to be subjected to display control so as to be displayed in a lighter color. When the user designates the position (xe, ye, ze) from the right in FIG. 16E, an image portion in a range of x=xe to x2 and z=0 to ze is to be subjected to display control.

For instance, there are assumed to be two users, namely, a user (an operator) who points at a position inside a device appearing in an image, and a user (an observer) who only observes the inside of the device appearing in the image. When the observer is located to the left of the user (near the left side surface of the device image), as illustrated in FIGS. 16C, 16D, and 16E, the operator operates the image from the left in FIGS. 16C, 16D, and 16E to display an interior image of the device such that the interior image of the device is easily visible not only to the operator but also to the observer. When the human detection device 152 detects two users (i.e., the operator and the observer), the operator designates which of the users is the operator (or the observer).

Figure 16F:
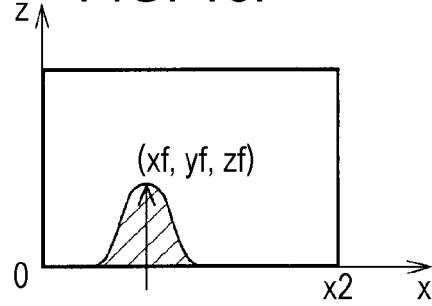

In the example of display control illustrated in FIG. 16F, when the user designates a position (xf, yf, zf) in the image, a boundary plane is formed in such a manner that a curved portion having an apex that is the designated position is extracted (or cut away). Then, an image portion corresponding to the extracted portion is to be subjected to display control so as to be displayed in a lighter color. In a planar image, as illustrated in FIG. 16F, a boundary plane is formed such that a normal distribution graph with a peak (maximum value) at the position indicated by x=xf and z=zf is plotted. While a cross-sectional plane is formed in such a manner that a shape having an apex at the position designated by the user is cut away, a cross-sectional plane may be formed in such a manner that a circular or rectangular cylindrical shape centered on a position designated by the user (a line segment starting at (xf, yf, z=0) and ending at (xf, yf, zf)) is cut away.

Figure 16G:
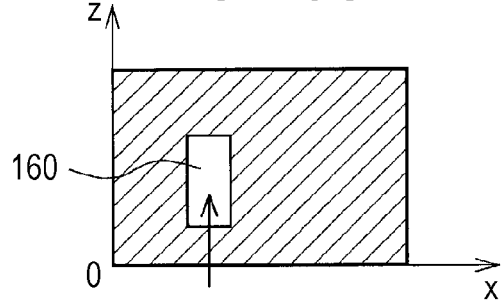

In the example of display control illustrated in FIG. 16G, when the user designates a position inside the device appearing in the image, if the device has a part at the designated position, a boundary plane is formed such that only an image 160 of the part can be displayed. Then, an image portion other than the image 160 of the part is to be subjected to display control so as to be displayed in a lighter color.

Figure 16H:
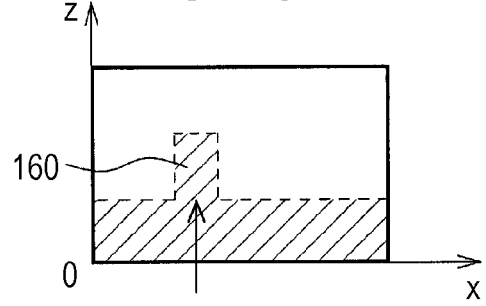

In the example of display control illustrated in FIG. 16H, when the user designates a position inside the device appearing in the image, if the device has a part at the designated position, an interior image from which an image 160 of the part has been removed is provided to the user. That is, the image portion facing the user illustrated in FIG. 16A and the image 160 of the part are to be subjected to display control so as to be displayed in a lighter color.

As described above, several patterns for setting a cross-sectional plane along which the device image is taken to allow the user to see the interior image of the device are illustrated, by way of example but not limitation. Any other pattern may be used to form a boundary plane. In addition, one of the multiple patterns described above may be constantly used or one of the multiple patterns described above may be selected by the user as a pattern used for display in the aerial display space. For example, the formation of the boundary plane in FIG. 16A may be set as a first display mode, and the formation of the boundary plane in FIG. 16B may be set as a second display mode. The user may select one of the display modes, and the control unit 48 may execute the selected display mode.

In FIGS. 16A to 16H, planar images are used, for convenience of illustration. Thus, the description is based on the assumption that the device image is sliced longitudinally. However, the device image may not necessarily be sliced longitudinally to obtain a cross-sectional plane (a surface of the image to be provided to the user). As exemplarily illustrated in FIGS. 16A to 16H, when the image is viewed exactly from above, the direction in which the user views the image (viewing side) and the side of the image facing the user are identical. Note that when the image is viewed just from the side (a side surface of the image), for example, the image is not always displayed at the height of the user's eye. The image may be displayed close to the user's foot. When the image is displayed close to the user's foot, the user views the image obliquely from above. In this case, the interior image of the device, which is obtained by slicing the image vertically at the position indicated by z=n, may be difficult to view. To address this difficulty, the position of the user's head, which is detected by the human detection device 152, may be regarded as the position of the user's eye, and the image is not sliced longitudinally but sliced at an angle that makes the image easily visible to the user to obtain an interior image which is then displayed. That is, the image may be sliced transversely from the viewing position (the position of the user's eye) to a position designated by the user to display an image of the inside of the device. In the example described above, the image is displayed below the position of the user's eye. Also when the image is displayed above the position of the user's eye and the user looks up at the image or when the image is displaced leftward, rightward, or obliquely from the front of the user, it is desirable that the image be sliced by taking into account the viewing position.

Next, a collaborative function that uses a three-dimensional image of a device to be displayed in the aerial display space will be described. A collaborative function to be performed on a two-dimensional image is as described above. Since a three-dimensional image (stereoscopic image) further has information in the depth direction (i.e., the z-axis direction), it is also possible to associate a function with a position in the depth direction of the image.

FIG. 17 illustrates an example collaborative function management table for a three-dimensional device image. The following describes the collaborative function management information 34 for a three-dimensional image in detail with reference to FIG. 17. In the collaborative function management table illustrated in FIG. 17, a matrix table including devices, examples of which include a multifunction device, a robot, and a television set, is illustrated. Each device is associated with a depth position, a name, and position information. The depth position is information indicating a position in each device in the depth direction. In this exemplary embodiment, each device is divided simply into three sections, namely, front, middle, and deepest position (back), by way of exemplary illustration. Each device may be divided as appropriate. The name is the name of a portion of each device disposed at the corresponding depth position, such as a part or a member (hereinafter, represented as a "part"). The number or type of parts disposed at the corresponding depth position is set in accordance with the device. The position information is information indicating the position of the corresponding part in the corresponding device. Since each position is interrelated with a function, the position information is set as three-dimensional coordinate values. For example, a coordinate position relative to a certain point in each device as a reference (the origin) may be set as position information. An image of a part has a certain size (display range), and this range may be set as position information. If the device actually includes no parts, a partial image corresponding to a position (range) designated by coordinate values set in the position information may be used as a part. For example, the coordinate values (range) of a certain space (hollow) in the device may be set as position information, thereby allowing a function to be interrelated with a position at which no parts are actually disposed. In this way, a partial image in a three-dimensional image may be an image of a real part or member or may be an image of a non-real portion such as a hollow.

In order to set a collaborative function, a function is set in a cell in the collaborative function management table illustrated in FIG. 17. For example, "col-1" is set in a cell at which the "cartridge" of the "multifunction device" and the "arm" of the "robot" cross each other. The "col-1" (collaborative function 1) indicates that functions interrelated with the "cartridge" of the "multifunction device" and functions interrelated with the "arm" of the "robot" work in collaboration. For example, a collaborative function of supplying a toner cartridge designated by the user to the robot is executed. Further, "col-2" is set in a cell at which the "screen" of the "television set" and the "camera" of the "robot" cross each other. The "col-2" (collaborative function 2) indicates that functions interrelated with the "screen" of the "television set" and functions interrelated with the "camera" of the "robot" work in collaboration. For example, a collaborative function of taking a picture of the screen of the television set with the camera of the robot when the television set is turned on is executed.

In the illustrated table, as described above, the priorities of the respective functions are configurable. For example, in the "col-1" (collaborative function 1) described above, the functions interrelated with the cartridges of the multifunction device are executed preferentially. In "col-3" (collaborative function 3), functions interrelated with the arm of the robot are executed by priority (or preferentially).

As the detailed operation will be described below, when multiple device images are being displayed in the aerial display space, for instance, a user selects a part in the device image interrelated with which a function to be preferentially executed, and then selects part in the device image interrelated with a function with which the function is to work in collaboration. The priorities of functions to be executed are designated in this way.

In the foregoing description, the collaborative function management table illustrated in FIG. 17, that is, a two-dimensional matrix table, is used. Thus, functions interrelated with two parts work in collaboration, by way example but not limitation. Functions interrelated with three or more parts may work in collaboration to set a collaborative function. The functions to be set as a collaborative function may be not only a function interrelated with a device but also a function interrelated with an icon image of an application or a function interrelated with an image interrelated with a currently running application. Furthermore, the collaborative function management table illustrated in FIG. 17 may be set for each user. This enables a collaborative function to be set on a user-by-user basis.

The collaborative function management information 34 represented as a collaborative function management table is stored in the storage unit 30 of the server 14. Alternatively, the collaborative function management information 34 may be stored in the storage unit 44 of the terminal apparatus 16. This eliminates the need for the terminal apparatus 16 to inquire of the server 14 each time the terminal apparatus 16 requires the collaborative function management information 34. In the description of the operation below, the collaborative function management information 34 is assumed to be stored in the terminal apparatus 16.

In the collaborative function management table illustrated in FIG. 17, a television set is set as an example of a device but not limitation. As a device that executes a collaborative function, an IoT device, such as a television set, is selectable. An IoT device is any device connected to the Internet. A typical IoT device is a device other than an information technology (IT) device such as a PC or a smartphone. However, for convenience of description, the term "IoT device" is construed in a broader sense and is used herein to collectively include any device capable of accessing the Internet and exchanging information.

Thus, each collaborative function may be a function executable using an IoT device. For example, each collaborative function may be used in a connected home. The connected home is a system that allows devices such as household electrical appliances to be networked for interconnection by using IoT technology. In this case, devices may be connected to each other via a specific server, or devices may be connected to each other without using any specific server. Alternatively, devices or pieces of software may work in collaboration via IFTTT (if this, then that) to execute a collaborative function. That is, when an event that triggers the content of a collaborative function occurs in a certain device or software, another device or software may execute an action (processing). Also, when an event that triggers the content of a collaborative function occurs in a certain file, an action (processing) may be executed on another file. In addition, a function of executing, in response to a certain action as another trigger, still another action may also be included in a collaborative function according to this exemplary embodiment. In addition, a function of enabling collaboration among multiple web services, and an application programming interface (API) collaboration function for enabling collaboration among multiple systems, services, and so on by using an API may be included in a collaborative function according to this exemplary embodiment. Furthermore, software may be implemented as a block-by-block collection of functions such as Robotics Process Automation (RPA).

In this exemplary embodiment, the terminal apparatus 16 may be a device whose image is displayed in the aerial display space to execute a collaborative function. In the terminal apparatus 16, serving as an IoT device, the communication unit 40 is constituted by multiple communication units (communication devices such as communication chips) to communicate with other IoT devices. Each communication device has a function of performing communication in accordance with its communication standard (or scheme). The communication devices may be based on different communication standards or may be based on the same communication standard. Alternatively, some of the communication devices may be based on different communication standards and other communication devices may be based on the same communication standard. The communication unit 40 may be constituted by a single communication device supporting multiple communication standards. The communication unit 40 may communicate with a communication partner in accordance with a communication standard suitable for the communication partner (i.e., a communication standard supported by the communication partner). Examples of the communication standard (or scheme) include standards (or schemes) for infrared communication, visible-light communication, Wi-Fi communication, and short-range wireless communication (such as NFC). Examples of the short-range wireless communication include Felica (registered trademark) based communication, Bluetooth (registered trademark) based communication, and RFID-based communication. It is to be understood that wireless communication based on any other scheme may be used as short-range wireless communication. The communication unit 40 may switch communication standards or frequency bands in accordance with the communication partner or may switch communication standards or frequency bands in accordance with the surrounding conditions.

In this exemplary embodiment, the control unit 48 performs control to provide a notification of a function interrelated with information in a depth direction of an image being displayed in mid-air. The following describes a collaborative function that uses a three-dimensional image displayed in the aerial display space. The collaborative function may be a collaborative function in which functions interrelated with parts included in a device appearing in the three-dimensional image work in collaboration or may be a combination of a three-dimensional image and a two-dimensional image, as described below by way of example. Alternatively, the collaborative function may be a collaborative function between an image interrelated with a part included in a three-dimensional device image and an image interrelated with a function of a part included in the three-dimensional device image.

The "notification" for which the control unit 48 performs control refers to notifying a user through, as well as display in the aerial display space, any means capable of providing a notification to the user with the use of the five human senses, such as audio output, in addition to display on any other display or display of visible notifications, as described below. In the following exemplary embodiments, as well as in this exemplary embodiment, a screen that displays text is displayed in the aerial display space. If any difficulties may occur, such as when characters displayed in the aerial display space are difficult to read, the screen may be displayed on any other display such as a liquid crystal panel included in the terminal apparatus 16.

The operations up to the display of a three-dimensional image in the aerial display space may be similar to those for a two-dimensional image described above with reference to FIG. 11. When a three-dimensional device image is displayed in the aerial display space, as described above, the user moves their fingertip to the inside of a device appearing the device image being displayed in the aerial display space to point at a desired part. At this time, as described above with reference to FIG. 15, the color depth of the image may be controlled such that an image portion in front of a position pointed at by the user (image portion closer to the user) is displayed in a lighter color or an image portion in a cross-sectional plane including the position pointed at by the user is displayed in a darker color to facilitate visual recognition of the position pointed at by the user.

The user designates a desired part with their fingertip. The user may designate a part by holding their fingertip at the corresponding position for a predetermined time period, or the terminal apparatus 16 may be notified that the part has been designated by any other action. When the user designates a part with their fingertip, the position specifying unit of the UI unit 46 specifies the position of the fingertip. At this time, the control unit 48 refers to the collaborative function management information 34 to determine which part has been designated by the user.

The position information in the collaborative function management information 34 (the collaborative function management table illustrated in FIG. 17) includes information indicating the position of the corresponding part. When the display range of the part in the device image is set as position information, the control unit 48 matches the position designated by the user against the display range of the part included in the device image to specify the part designated by the user. However, when coordinate values that do not indicate a range are set as position information in the collaborative function management table, it may be difficult for the user to locate exactly the position indicated by the coordinate values included in the position information of the part. In this case, if the position information of the part falls within a predetermined range from the position designated by the user, the user recognizes the part as the designated part. In this way, a permissible range around a position designated by the user may be set.

Alternatively, when a part designated by the user is successfully specified, the display style of a position designated by the user or the designated part may be changed. For example, the position or part designated by the user may be displayed with different brightness settings (displayed brighter or displayed in a darker color) or may be flashed to prompt the user to determine whether the user's desired position has been correctly pointed at.

When the user stops designating a part, that is, when the user performs a predetermined operation such as moving their fingertip out of the aerial display space to cancel the designation of a part, display control is performed so that the part for which designation has been canceled is displayed in the original state. In addition, display control is performed so that an image portion in front of the part for which designation has been canceled (an image portion controlled to be displayed in a lighter color) is displayed in the original state.

When the user designates a part in one device image, the user moves their fingertip to designate a part in another device image. It is to be understood that the user may designate another part in the same device image. The control unit 48 refers to the collaborative function management information 34 to determine which parts have been designated by the user. Since the position specifying unit of the UI unit 46 has detected the movement (transition) of the fingertip, the control unit 48 is able to determine the order of the parts in the device image or device images. Thus, the control unit 48 specifies a collaborative function on the basis of the collaborative function management information 34 (the collaborative function management table illustrated in FIG. 17). For example, the respective device images (three-dimensional images) of a multifunction device and a robot are being displayed in the aerial display space. In this state, when the user designates a cartridge of the multifunction device and then designates an arm of the robot, the control unit 48 specifies that the "col-1" (collaborative function 1) has been designated by the user.

In this way, the user operates information in the depth direction of an image being displayed in mid-air (the position of the cartridge of the multifunction device) to provide a notification of a collaborative function executable using functions interrelated with the information in the depth direction, which has been operated by the user. The term "notification", as used herein, is used to include a notification of the start of a collaborative function or a notification of the result of the collaborative function, and a notification for prompting the user to select multiple functions of a collaborative function (see, for example, FIG. 10).

If no function is interrelated with a part designated by the user, the display style of a position designated by the user or the designated part may be changed. For example, the position or part designated by the user may be displayed with different brightness settings (displayed at low brightness or displayed in a lighter color) or may be flashed to notify the user of no function being interrelated with the part. Alternatively, a function interrelated with a device including the designated position (or part) may be used. When a function interrelated with a device is to be used, a function interrelated with a designated position (or part) may be understood as a function interrelated with a device including the designated position (or part).

When a collaborative function is to be executed, account information of a user may be referred to and a notification may be provided in accordance with the user. This is made feasible by referring to a collaborative function management table set for each user. For example, as exemplarily illustrated in FIG. 10, the functions A and B displayed on the same function display screen may be set such that some users are allowed to select the function A but are not allowed to select the function B or some users are allowed to select both the functions A and B. Alternatively, a user for which a collaborative function management table is disabled may be inhibited from executing a collaborative function.

In this exemplary embodiment, furthermore, a function display screen is displayed in the aerial display space (the destination of the notification). If multiple users are viewing the aerial display space, it is difficult to determine which of the users is notified. Accordingly, the destination of the notification is not limited to the aerial display space, and an object assigned to each user may be notified. For example, a display of the terminal apparatus 16 may be assigned to user A, the aerial display space may be assigned to user B, and a smartphone carried by user C may be assigned to the user C. An object to be notified may be designated by each user at the time when the user is detected by the human detection device 152, for example.

In the foregoing description, priority is set on notifications of functions of a collaborative function, that is, the order in which the functions are executed is set, in accordance with the user's operation, namely, joining part images together which are located in the depth direction of a device image or device images being displayed in the aerial display space. However, the method for setting the priorities is not limited to that described above. For example, priority may be set on the notifications of functions of a collaborative function in accordance with the positional relationship between pieces of information (part images) in the depth direction of multiple images designated by user operation. More specifically, when images are to be displayed in the aerial display space, for example, the images are displayed in order from closest to farthest from the user. The functions may be executed in order, starting from the function associated with the image closest to the user. Alternatively, the functions in the collaborative function may be executed in reverse order, namely, starting from the function associated with the image farthest from the user. As a specific operation will be described below taking an example of a two-dimensional image, priority may be set on the notifications of the functions included in the collaborative function in accordance with the user's operation, namely, joining part images together which are located in the depth direction of images in accordance with the order in which pieces of information in the depth direction of the images are overlaid.

On a two-dimensional screen such as a screen of a touch panel, a user is able to move an image through a drag-and-drop operation, for example. While a drag-and-drop operation may be performed in the aerial display space, it may be difficult to move an image in the depth direction. Thus, a need exists for a predetermined operation of moving an image in the depth direction. For example, a user may push an image being displayed in the aerial display space away with their palm to move the image farther away from the user. A user may perform an operation of grabbing an image with all five fingers (holding an image in the palm) to move the image closer to the user. Alternatively, a user may hold an image with both hands and move the image back and forth (closer to and farther away from the user). In this way, a user may be able to move an image in the aerial display space back and forth through such a predetermined operation.

In recent years, IoT devices have been operable in collaboration with one another. This is made feasible by installing a predetermined application into a terminal apparatus such as a smartphone or a tablet and by performing predetermined settings. For example, a terminal apparatus operates in collaboration with a room hub so as to be available as a remote control for multiple household electrical appliances such as an air-conditioner and a television set. That is, a terminal apparatus and household electrical appliances operate in collaboration with each other. To this end, as described above, a terminal apparatus serving as an IoT device includes multiple communication units for communicating with the household electrical appliances. The terminal apparatus and the household electrical appliances are displayed in the aerial display space, and a user operates the terminal apparatus in the aerial display space, thereby being able to operate the household electrical appliances. For instance, a user wishes to use the terminal apparatus as a remote control for a television set. In this case, the user associates functions of a remote control for the television set, which are interrelated with the terminal apparatus, with the broadcasting function of the television set to execute a collaborative function. This enables the terminal apparatus (first device) to communicate with the television set (second device) in accordance with a specific communication standard to operate in collaboration with the television set. Alternatively, a user performs predetermined settings by using the terminal apparatus to allow a lighting device (a smart LED light) and a door sensor, which are IoT devices, to operate in collaboration with each other. For instance, when the door sensor detects the opening of a door, the lighting device is turned on. While a television set, a door sensor, and the like are exemplified as IoT devices, the terminal apparatus may operate in collaboration with other devices such as a smart plug or a motion sensor. In the foregoing description, furthermore, a terminal apparatus operates in collaboration with an IoT device via a relay device, namely, a room hub, or IoT devices operate in collaboration with each other. Devices may execute a collaborative function via smart speakers as a relay device or via multiple relay devices such as a room hub and a server. Further, instead of the terminal apparatus, the smart speakers may provide an instruction directly to multiple IoT devices to execute a collaborative function.

Second Exemplary Embodiment

The following describes a system according to a second exemplary embodiment. In the first exemplary embodiment described above, a device image interrelated with a device is selected to control the display of a collaborative function, whereas in the second exemplary embodiment, a function image interrelated with a function is selected to control the display of a collaborative function. Each function image may be an image interrelated with software (such as an application, or an image interrelated with a device to be subjected to processing), for example. Each function image is an image such as an icon and may be a virtual image in order to distinguish it from an image (e.g., a picture) representing the external appearance of an actual device implemented as hardware or an image representing the device itself. For instance, when a user selects a function image interrelated with software, information indicating a collaborative function executable using the software interrelated with the function image is displayed. The following describes the second exemplary embodiment in detail. In this exemplary embodiment, for convenience of description, a fundamental process flow will be described first, taking an example in which a planar two-dimensional image (an image with no depth ($z=0$)) is displayed in the aerial display space. Then, a process for displaying a three-dimensional stereoscopic image in the aerial display space will be described.

Figures 18, 19:
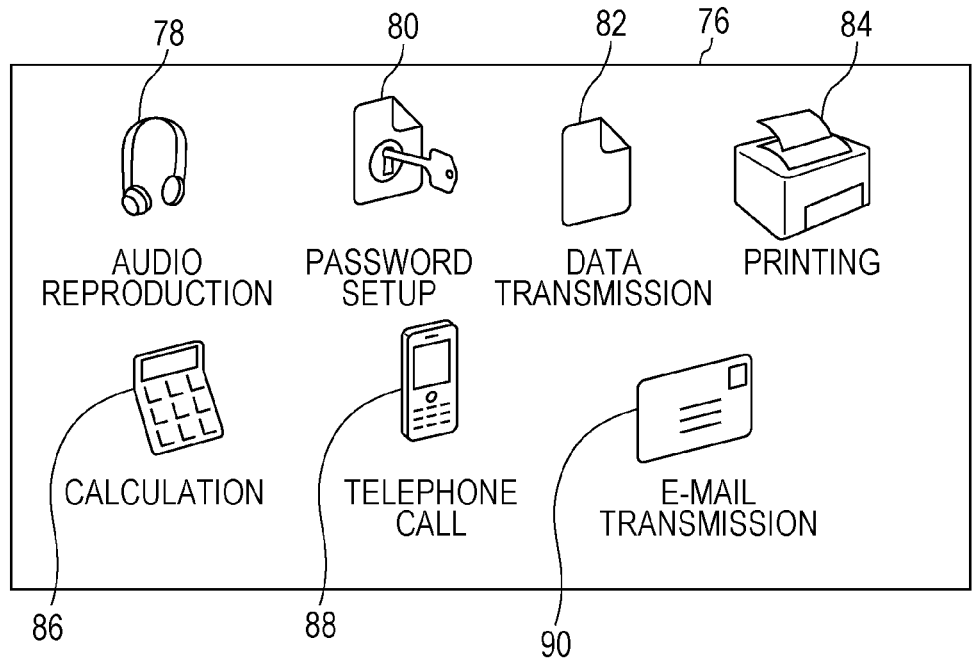
FIG. 18 illustrates an example collaborative function management table according to a second exemplary embodiment.
FIG. 19 illustrates an example screen.

FIG. 18 illustrates an example of a collaborative function management table according to the second exemplary embodiment. The illustrated collaborative function management table is information indicating a collaborative function executable using multiple functions. The collaborative function management table contains, as an example, a function ID (e.g., an ID for identifying software), information indicating a function name (e.g., a software name), and information indicating a collaborative function executable using multiple functions, which are associated with each other. The collaborative function management table is referred to, thereby specifying a collaborative function executable using multiple functions. For instance, software $\alpha$ serving as a function is software for transmitting data, and software $\beta$ serving as a function is software for setting a password for data. A combination of the software $\alpha$ and the software $\beta$ implements a collaborative function of setting a password for data and transmitting the data, for example. Also for other software, executable collaborative functions are defined.

FIG. 19 illustrates a screen 76 to be displayed in the aerial display space. In this exemplary embodiment, as in the first exemplary embodiment, the screen (display frame) 76 is additionally displayed to present a display area (display range) for information in mid-air. The same applies to the following exemplary embodiment. The screen 76 shows one or more function images. For example, the screen 76 shows function images interrelated with software installed in the terminal apparatus 16. In the example illustrated in FIG. 19, function images 78, 80, 82, 84, 86, 88, and 90 are displayed.

The function image 78 is an image interrelated with an audio reproduction function (e.g., an image interrelated with audio reproduction software or an image interrelated with a device (e.g., a reproduction player) that reproduces audio). When the function image 78 is selected by a user and an instruction is provided to start the audio reproduction function, for example, the audio reproduction software is started to reproduce audio or the reproduction player reproduces audio.

The function image 80 is an image interrelated with a password setting function (e.g., an image interrelated with password setting software). When the function image 80 is selected by a user and an instruction is provided to start the password setting function, for example, the password setting software is started to perform a process for setting a password for data or the like.

The function image 82 is an image interrelated with a data transmission function (e.g., an image interrelated with data transmission software). When the function image 82 is selected by a user and an instruction is provided to start the data transmission function, for example, the data transmission software is started to transmit data or the like to be transmitted to the destination.

The function image 84 is an image interrelated with a printing function (e.g., an image interrelated with printing software or an image interrelated with a device that performs printing (e.g., a printer or a multifunction device)). When the function image 84 is selected by a user and an instruction is provided to start the printing function, for example, the printing software is started to perform printing in accordance with set printing conditions.

The function image 86 is an image interrelated with a calculation function (e.g., an image interrelated with calculation software). When the function image 86 is selected by a user and an instruction is provided to start the calculation function, the calculation software is started.

The function image 88 is an image interrelated with a telephone function. When the function image 88 is selected by a user and an instruction is provided to start the telephone function, an input screen for a telephone number or an address book is displayed and a telephone number designated by the user is dialed to make a telephone call.

The function image 90 is an image interrelated with an e-mail function (e.g., an image interrelated with e-mail software). When the function image 90 is selected by a user and an instruction is provided to start the e-mail function, the e-mail software is started.

As in the first exemplary embodiment, when a user designates multiple function images, the specifying unit 38 identifies multiple functions interrelated with the multiple function images designated by the user, and refers to the collaborative function management table illustrated in FIG. 18 to specify a collaborative function executable using the multiple functions. Information indicating the collaborative function is displayed in the aerial display space. For example, the user joins multiple function images together or superimposes multiple function images on top of each other to designate the multiple function images, and information indicating a collaborative function is displayed. Referring to the example illustrated in FIG. 19, for instance, when the function images 80 and 82 are designated (e.g., when the function images 80 and 82 are joined together or superimposed on top of each other), information indicating a collaborative function executable using a function of setting a password and a function of transmitting data is displayed. The function images are displayed on a home screen of a smartphone or a desktop screen of a personal computer, for example. When multiple function images are designated on the screen, information indicating a collaborative function is displayed on the screen. When three or more function images are designated, information indicating a collaborative function executable using the three or more functions may be displayed.

Next, description will be made of a case where a function image interrelated with a function is represented as a stereoscopic image (three-dimensional image) having a depth component.

In some cases, each function has multiple functions (sub-functions). Examples of functions of a multifunction device include a copying function, a facsimile (fax) function, and a printing function. The printing function is categorized into a variety of functions, such as monochrome/color printing, printing at A4/A3 sizes, and simplex/duplex printing. In this way, when a single function has multiple functions (hereinafter also referred to as "sub-functions"), these functions have a hierarchical relationship. That is, the functions can be represented using a hierarchical structure. In the hierarchical structure, a depth of hierarchy is represented as information in the depth direction of a three-dimensional image. When the function image 84 represented as a two-dimensional image is selected, finer setting is performed by setting a variety of printing conditions while displaying several setting screens through a setting screen (sub-menu screen) that appears after the selection of the function image 84.

When the function image 84 is displayed as a stereoscopic image (three-dimensional image) in the aerial display space, a user moves their fingertip in the depth direction of the function image 84 and selects a desired sub-function to select a desired function (a function for which a desired printing condition is set). For instance, when the user moves their fingertip in the depth direction of the function image 84 to designate a position, a function (i.e., a printing condition) interrelated with the position is displayed in the aerial display space. If the displayed function is not the desired function (i.e., the desired printing condition), the user moves their fingertip to another position. Since the sub-functions are displayed in a hierarchical structure, the user may move their hand to the preceding stage to redo the previous action or may slide the fingertip to the left or right. When the user designates the desired function, the user performs a predetermined confirmation operation. In order to implement this operation, the collaborative function management table illustrated in FIG. 7 according to the first exemplary embodiment needs to be set.

When an image interrelated with data is to be displayed in the aerial display space, an image of the data alone may be displayed. However, it is common to store a data file in a folder having a hierarchical structure. Thus, when data is handled by using the aerial display space, as in the hierarchical structure of functions described above, an image of a root folder (a root image) is displayed as a stereoscopic image, and images of sub-folders or data files are displayed in the depth direction of the root image. A user may insert their fingertip into the root image and move the fingertip to designate the desired data stored in a sub-folder.

Third Exemplary Embodiment

The following describes a system according to a third exemplary embodiment. In the third exemplary embodiment, when a user designates a device image and a function image, information indicating a collaborative function executable using a device interrelated with the device image and a function interrelated with the function image is displayed. The following describes the third exemplary embodiment in detail. Also in this exemplary embodiment, for convenience of description, description will be made of a fundamental process flow for displaying a planar two-dimensional image (an image with no depth (z=0)) in the aerial display space.

Figures 20, 21:
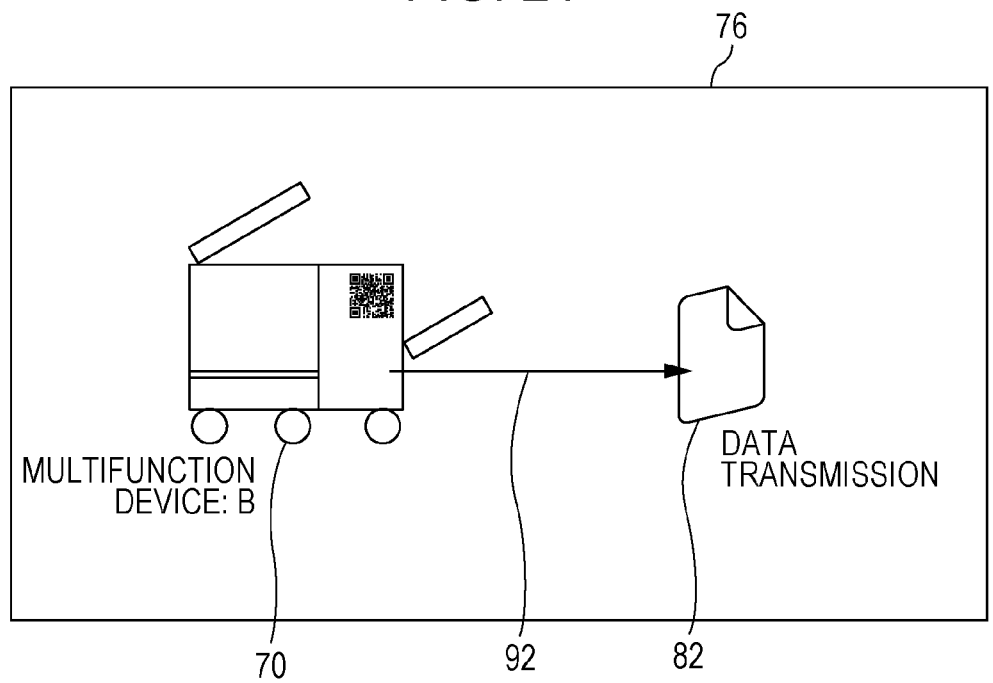
FIG. 20 illustrates an example collaborative function management table according to a third exemplary embodiment.
FIG. 21 illustrates an example screen.

FIG. 20 illustrates an example of a collaborative function management table according to the third exemplary embodiment. The illustrated collaborative function management table is information indicating a collaborative function executable using a device and a function (e.g., software). The collaborative function management table contains, as an example, a combination of IDs (a combination of a device ID and a function ID), information indicating a device name and a function name, and information indicating a collaborative function executable using a device and a function, which are associated with each other. The collaborative function management table is referred to, thereby specifying a collaborative function executable using a device and a function. For example, device A, namely, a PC (A), and function α, namely, a data transmission function, are combined to implement a collaborative function of transmitting data by using the PC (A), for example. Also for other devices and functions, executable collaborative functions are defined.

As in the first and second exemplary embodiments, when a user designates a device image and a function image, the specifying unit 38 identifies a device interrelated with the device image designated by the user and a function interrelated with the function image designated by the user, and refers to the collaborative function management table illustrated in FIG. 20 to specify a collaborative function executable using the device and the function. Information indicating the collaborative function is displayed in the aerial display space. For example, the user joins the device image and the function image together or superimposes the device image and the function image on top of each other to designate the device image and the function image, and information indicating a collaborative function is displayed. When one or more function images and one or more function images are designated, information indicating a collaborative function executable using the one or more devices and the one or more functions may be displayed.

FIG. 21 illustrates a screen 76 displayed in the aerial display space. On the screen 76, a device image 70 and a function image 82 are displayed, as an example. The device image 70 is an image interrelated with the multifunction device (B), and the function image 82 is an image interrelated with the data transmission function (e.g., data transmission software). For instance, when the multifunction device (B) is identified by using the AR technology or the like described above, the device image 70, which is interrelated with the multifunction device (B), is displayed on the screen 76. When the data transmission software (α) is installed into the terminal apparatus 16, the function image 82, which is interrelated with the data transmission software (α), is displayed on the screen 76.

For example, as indicated by an arrow 92, the user joins the device image 70 and the function image 82 together. In this case, the specifying unit 38 identifies the multifunction device (B) interrelated with the device image 70 as a device intended for collaboration, and identifies the data transmission software (α) interrelated with the function image 82 as a function intended for collaboration. Then, the specifying unit 38 refers to the collaborative function management table illustrated in FIG. 20 to specify a collaborative function executable using the multifunction device (B) and the data transmission software (α). Information indicating the collaborative function is displayed in the aerial display space. For instance, the user moves their fingertip among multiple images over the screen 76, thereby joining the multiple images together. As described above, since the fingertip moves in mid-air, the movement of the trajectory of the fingertip is detected by the human detection device 152. The control unit 48 of the terminal apparatus 16 detects a user operation on the screen 76 being displayed in the aerial display space. Also when the user joins the function image 82 to the device image 70, information indicating a collaborative function executable using the multifunction device (B) and the data transmission software (α) is displayed. When the user joins one or more device images and one or more function images together, information indicating a collaborative function executable using the one or more devices and the one or more functions may be displayed.

Figure 22:
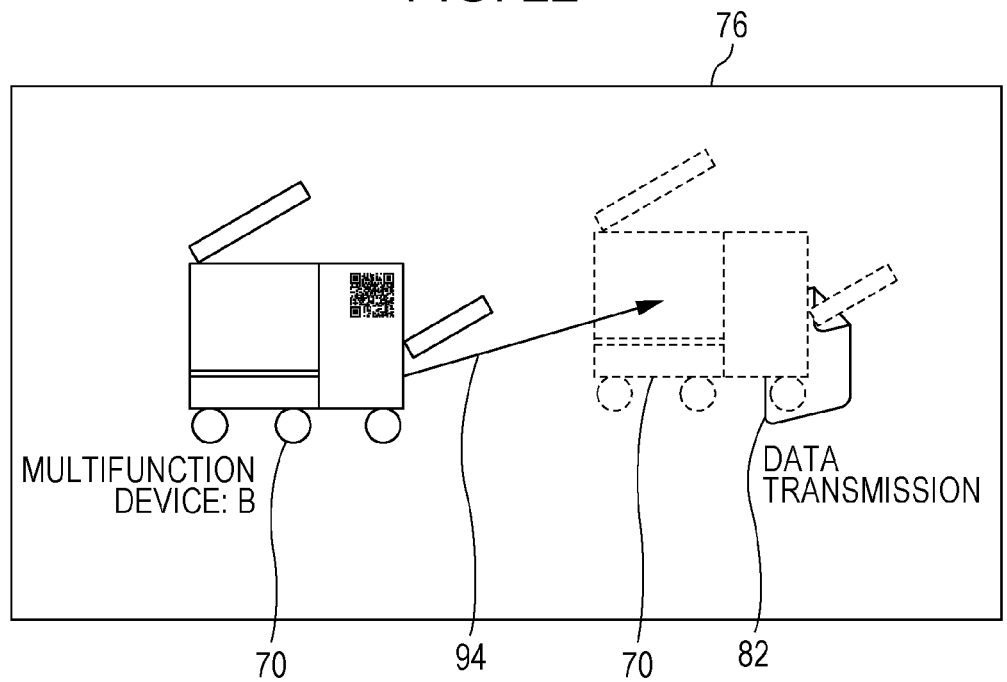
FIG. 22 illustrates an example screen.

FIG. 22 illustrates another example operation. For example, as indicated by an arrow 94, the user moves the device image 70 to the function image 82 and superimposes the device image 70 on top of the function image 82. In this case, the specifying unit 38 identifies the multifunction device (B), which is interrelated with the device image 70, as a device intended for collaboration, and identifies the data transmission software (α), which is interrelated with the function image 82, as a function intended for collaboration. Then, the specifying unit 38 refers to the collaborative function management table illustrated in FIG. 20 to specify a collaborative function executable using the multifunction device (B) and the data transmission software (α). Information indicating the collaborative function is displayed in the aerial display space. For example, the user performs a drag-and-drop operation with their fingertip, thereby superimposing an image on top of another image. In the example illustrated in FIG. 22, the user drags the device image 70 and drops the device image 70 at a position that overlaps the function image 82. The images to be superimposed on top of each other may be designated in accordance with an audio instruction given by the user. Also when the user superimposes the function image 82 on top of the device image 70, information indicating a collaborative function executable using the multifunction device (B) and the data transmission software (α) is displayed. When the user superimposes one or more device images and one or more function images on top of each other, information indicating a collaborative function executable using the one or more devices and the one or more functions may be displayed.

Figure 23:
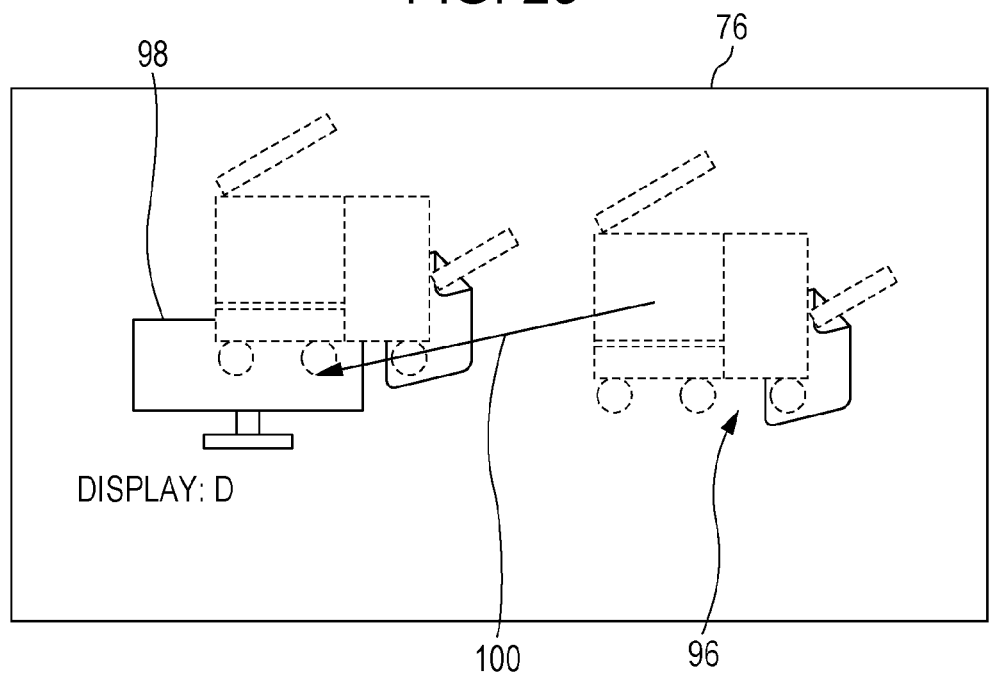
FIG. 23 illustrates an example screen.

When multiple images are superimposed on top of each other, a new image indicating the superimposition of the images may be generated and displayed. For example, as illustrated in FIG. 22, the device image 70 and the function image 82 are assumed to be superimposed on top of each other. In this case, as illustrated in FIG. 23, the device image 70 and the function image 82, which are superimposed on top of each other, are grouped to generate a new composite image 96 which is then displayed. The composite image 96 may be generated by the control unit 48 of the terminal apparatus 16 or by the control unit 36 of the server 14, for example. The composite image 96 is an image indicating that the device image 70 is superimposed on top of the function image 82. The composite image 96 may be an image directly representing a state in which the device image 70 is superimposed on top of the function image 82 or may be an image graphically representing this state (e.g., an icon). Also when the composite image 96 is generated, the device image 70 and the function image 82 are displayed in the original states.

Also in the first exemplary embodiment, when multiple device images are superimposed on top of each other, a composite image indicating that the multiple device images are superimposed on top of each other may be generated. Also in the second exemplary embodiment, when multiple function images are superimposed on top of each other, a composite image indicating that the multiple function images are superimposed on top of each other may be generated.

When the composite image 96 is generated in the way described above, the control unit 48 of the terminal apparatus 16 displays the composite image 96 so as to remain displayed on the screen 76. When the composite image 96 is superimposed on top of another device image or superimposed on top of another function image, a device interrelated with the device image or a function interrelated with the function image is identified as a device or function intended for collaboration. For example, as illustrated in FIG. 23, display (D) is identified and a device image 98 interrelated with the display (D) is displayed on the screen 76. When the composite image 96 is moved and is superimposed on top of the device image 98 in a way indicated by an arrow 100, the display (D) is identified as a device intended for collaboration. In this case, the specifying unit 38 refers to the collaborative function management table illustrated in FIG. 20 to specify a collaborative function executable using the multifunction device (B), the data transmission software (α), and the display (D). Information indicating the collaborative function is displayed in the aerial display space. In addition, a new composite image indicating that the composite image 96 is superimposed on top of the device image 98 interrelated with the display (D) is generated and displayed. When the composite image 96 and the device image 98 are joined together, information indicating a collaborative function may be displayed. When the composite image 96 and a function image are superimposed on top of each other or when the composite image 96 and a function image are joined together, information indicating a collaborative function executable using a function interrelated with the function image, the multifunction device (B), and the data transmission software (α) is displayed.

As described above, a composite image is displayed and is superimposed on top of a device image interrelated with the next candidate collaborative device or superimposed on top of a function image interrelated with the next candidate collaborative function, thereby increasing the number of devices or functions that work in collaboration. In addition, each composite image indicates that images interrelated with devices or functions intended for collaboration are superimposed on top of each other. Thus, the display of a composite image allows the user to easily visually recognize which devices or functions have been designated as devices or functions intended for collaboration.

The composite image described above may be used as a shortcut image to execute a collaborative function later. For instance, when a user provides an instruction to register a composite image as a shortcut image by using the terminal apparatus 16, a registration screen is displayed in the aerial display space. The registration screen displays the composite image and also displays information indicating registration content of a collaborative function executable using a device and a function that are intended for collaboration. Examples of the information indicating the registration content include the name of the collaborative function, an overview of the collaborative function, and information indicating the device and function necessary for collaboration. The user may edit the registration content (such as the name of the collaborative function or the overview of the collaborative function) by using the terminal apparatus 16. When the user provides a registration instruction on the registration screen, the composite image is registered as a shortcut image. Further, when the user edits the registration content, the edited content is also registered to be interrelated with the composite image. A shortcut image serving as the composite image is generated and displayed in the aerial display space. The shortcut image may be generated by the terminal apparatus 16 or by the server 14. When multiple shortcut images are generated and registered, the shortcut images may be displayed as a list in the aerial display space. The shortcut image and the information indicating the registration content are stored in the terminal apparatus 16. As another example, the shortcut image and the information indicating the registration content may be stored in the server 14 to be interrelated with user account information. In this case, when user account information is transmitted from the terminal apparatus 16 to the server 14, information (a shortcut image and information indicating registration content) interrelated with the user account information is transmitted from the server 14 to the terminal apparatus 16 and is displayed in the aerial display space.

The shortcut image may include, for each device or function intended for collaboration, information (such as an image) indicating the status of the device or function. For instance, if the device or function intended for collaboration is ready to execute a collaborative function, an image (e.g., a green or blue image) indicating that the device or function is ready to execute the collaborative function is displayed as information indicating the status. If the device or function intended for collaboration is not ready to execute a collaborative function, an image (e.g., a white or red image) indicating that the device or function is not ready to execute the collaborative function is displayed as information indicating the status. Examples of the state of being ready to execute a collaborative function include a state in which the device or function is not occupied, and a state in which the device or function is not malfunctioning. Examples of the state of being not ready to execute a collaborative function include a state in which the device or function is occupied, and a state in which the device or function is malfunctioning. For example, the terminal apparatus 16 acquires information indicating the status of a device intended for collaboration from the device intended for collaboration, acquires information indicating the status of a function intended for collaboration, and displays status information on the basis of the acquired pieces of information. The pieces of information may be acquired by the server 14.

When the user designates a shortcut image, which is being displayed in the aerial display space, and provides an instruction to execute a collaborative function (e.g., when the user clicks or double-clicks on the shortcut image), information indicating a collaborative function interrelated with the shortcut image is displayed or the execution of the collaborative function is controlled.

As described above, the management of a collaborative function and a shortcut image to be interrelated with each other reduces the burden imposed on the user to execute the collaborative function in the next and subsequent iterations.

After images to be superimposed on top of each other are operated by the user (e.g., after a drag operation is performed), if the operation is canceled (e.g., a drop operation is performed) in an area where no image is displayed on the screen 76, the collaborative function may be canceled. For example, as illustrated in FIG. 22, the device image 70 is superimposed on top of the function image 82, and then, as illustrated in FIG. 23, the composite image 96 is generated and displayed. In this case, when the user cancels the operation on the composite image 96 in an area where no image is displayed on the screen 76, the collaborative function executable using the multifunction device (B) and the data transmission software (α) is canceled. That is, the user drags the composite image 96 to an area where no image is displayed and then drops the composite image 96 in the area, thereby canceling the collaborative function. This enables the collaborative function to be canceled with a simple operation. It is to be understood that a button image (e.g., an icon) for canceling a collaborative function may be displayed on the screen and the user may operate the button image (e.g., press the button image) to cancel a collaborative function.

Further, when an image (e.g., an icon) interrelated with data (also referred to as a file) is superimposed on top of a device image, the control unit 48 of the terminal apparatus 16 may register the data as a target to be processed by the device interrelated with the device image. When the user provides an instruction to execute the process, the device executes a process designated by the user on the registered data. Examples of the data include document data and image data. For instance, when document data is superimposed on top of a device image interrelated with a multifunction device, the document data is registered as a target to be processed by the multifunction device. When the user provides a printing instruction to the multifunction device, the registered document data is printed by the multifunction device.

Further, when an image interrelated with data is superimposed on top of a function image, the control unit 48 of the terminal apparatus 16 may register the data as a target to be processed using a function interrelated with the function image. When the user provides a process execution instruction, a process using the function is executed on the registered data. For instance, when document data is superimposed on top of a function image interrelated with data transmission software, the document data is registered as a target to be transmitted. When the user provides a transmission instruction, the registered document data is transmitted to a destination.

Further, after an image interrelated with data is superimposed on top of a device image and is registered as a target to be processed, when the device image is superimposed on top of a function image, the control unit 48 of the terminal apparatus 16 registers the data as a target to be processed using a collaborative function executable using a device interrelated with the device image and a function interrelated with the function image. Likewise, after an image interrelated with data is superimposed on top of a function image and is registered as a target to be processed, when the function image is superimposed on top of a device image, the control unit 48 of the terminal apparatus 16 registers the data as a target to be processed using a collaborative function executable using a function interrelated with the function image and a device interrelated with the device image. When the user provides an instruction to execute the collaborative function, a process using the collaborative function is executed on the registered data.

The following describes another operation for executing a collaborative function.

Figure 24:
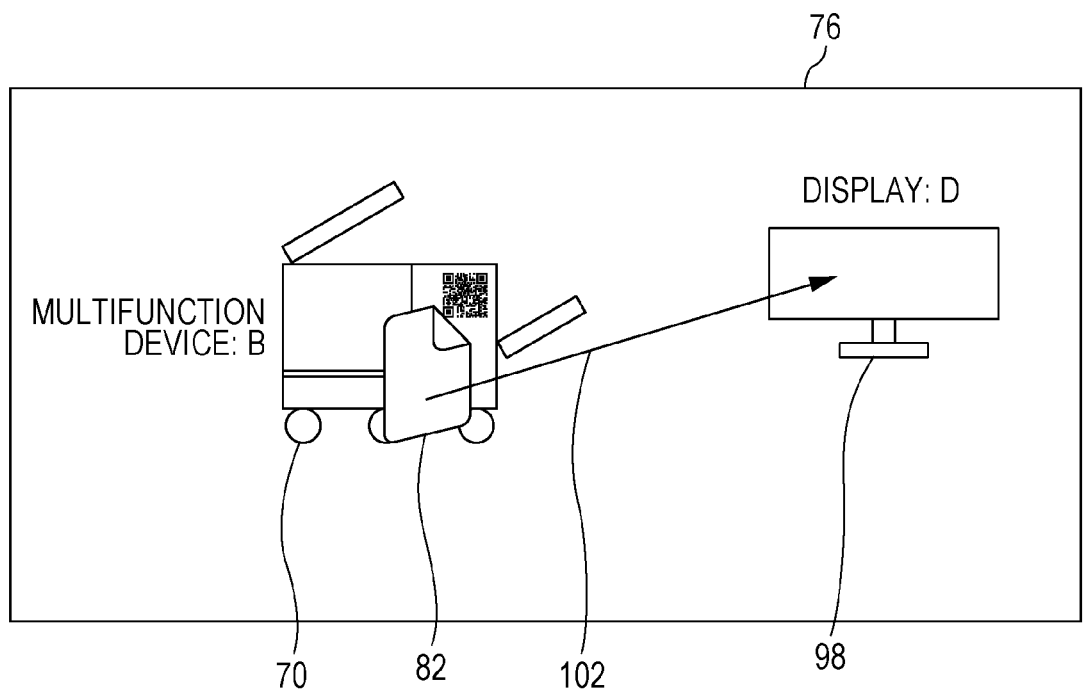
FIG. 24 illustrates an example screen.
Figure 25:
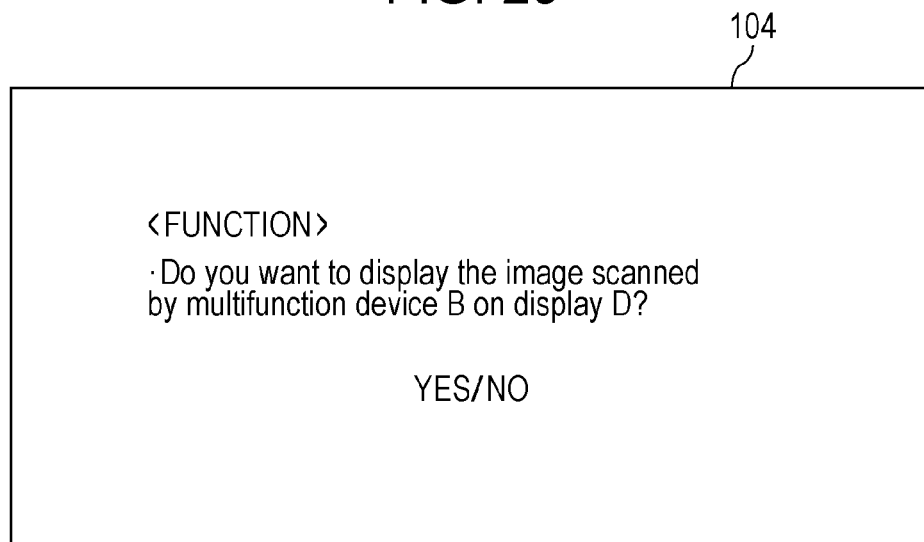
FIG. 25 illustrates an example screen.

FIG. 24 illustrates a screen 76 to be displayed in the aerial display space. For instance, when the user operates the function image 82 interrelated with data transmission software (α) from the device image 70 interrelated with a multifunction device (B) to the device image 98 interrelated with a display (D) in a way indicated by an arrow 102, the specifying unit 38 specifies a collaborative function executable using the data transmission software (α), the multifunction device (B), and the display (D). Information indicating the collaborative function is displayed in the aerial display space. The user may designate the function image 82 and the device images 70 and 98 as images to be operated, may join the function image 82 and the device images 70 and 98 together, or may superimpose the function image 82 on top of the device images 70 and 98. Examples of the collaborative function executable using the data transmission software (α), the multifunction device (B), and the display (D) include a function of transmitting image data generated by the multifunction device (B) through scanning to the display (D) and displaying an image based on the image data. As illustrated in FIG. 25, a screen 104 is displayed in the aerial display space, and information indicating the collaborative function described above is displayed on the screen 104. When the user selects "YES", the collaborative function is executed. When the user selects "NO", the screen returns to the screen for selecting an image.

Figure 26:
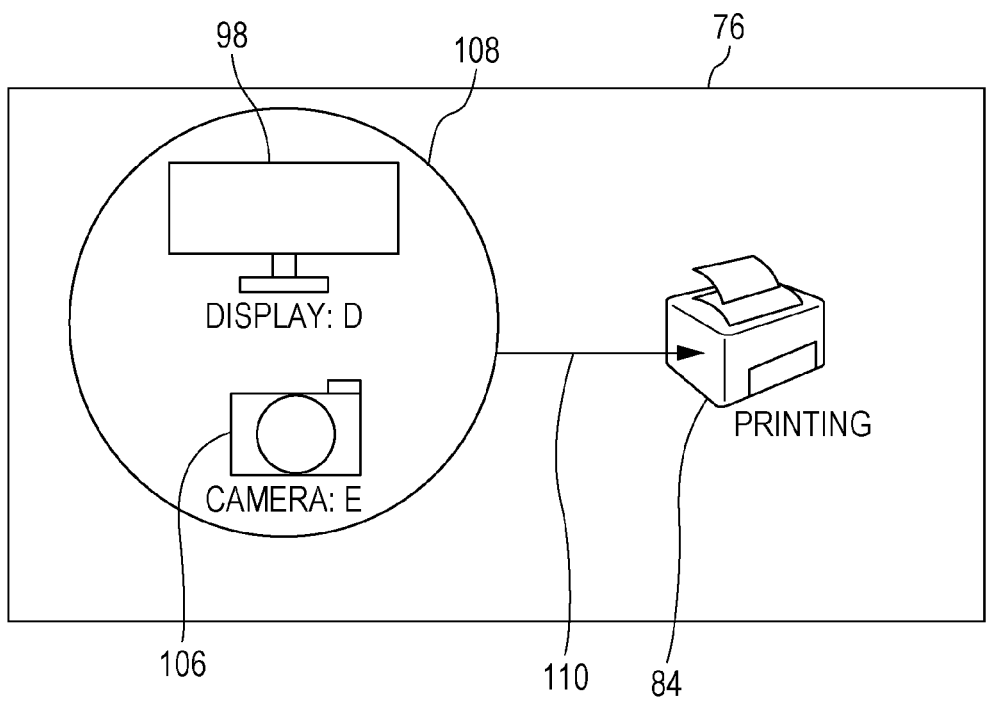
FIG. 26 illustrates an example screen.

FIG. 26 illustrates another example operation. The screen 76 of the terminal apparatus 16 displays device images 98 and 106 and a function image 84. For example, the device image 98 is an image interrelated with the display (D). When the display (D) and a camera (E) are identified by using AR technology or the like, the device image 98 interrelated with the display (D) and the device image 106 interrelated with the camera (E) are displayed. Further, the function image 84 is an image interrelated with a printing function (e.g., printing software). For instance, when the printing software is installed into the terminal apparatus 16, the function image 84 is displayed on the screen 76.

Figure 27:
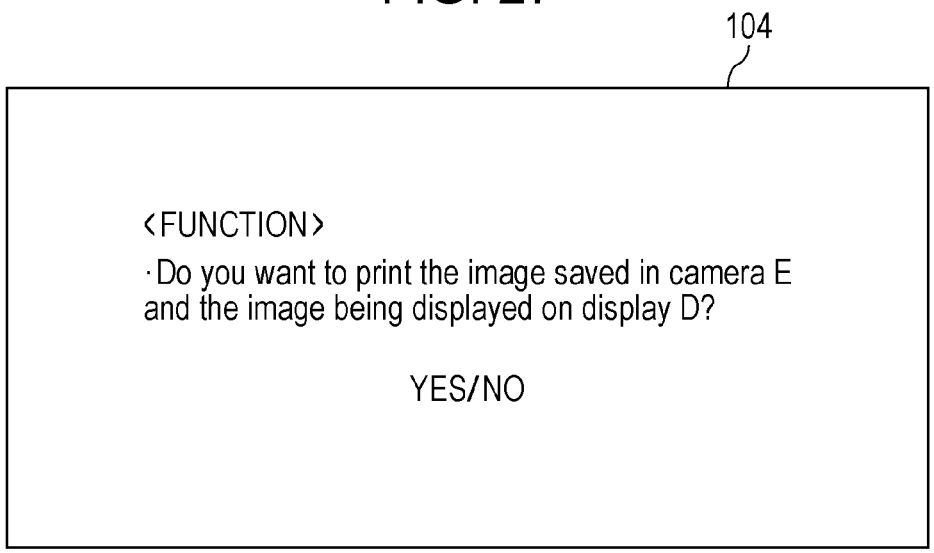
FIG. 27 illustrates an example screen.

For example, the user selects (e.g., groups) multiple device images (e.g., the device images 98 and 106) in a way indicated by a circle 108, collectively superimposes the multiple device images on top of the function image 84 in a way indicated by an arrow 110, and joins the selected area and the function image 84 together. In this case, the specifying unit 38 specifies a collaborative function executable using the display (D), the camera (E), and the printing software. The collaborative function is a function of printing an image saved in the camera and an image being displayed on the display. Information indicating the collaborative function is displayed in the aerial display space. For example, as illustrated in FIG. 27, the screen 104 is displayed in the aerial display space, and information indicating the collaborative function is displayed on the screen 104. When the user selects "YES", the collaborative function is executed. When the user selects "NO", the screen is returned to a screen such as the screen 76.

In the example illustrated in FIG. 26, multiple device images are selected and then the selected multiple device images are operated with respect to a function image. Alternatively, multiple function images may be selected and then the selected multiple function images may be operated with respect to a device image. Alternatively, both a device image and a function image may be selected and then the selected device image and function image may be operated with respect to a device image or a function image. It is to be understood that multiple device images may be selected and then the selected multiple device images may be operated with respect to another device image or multiple function images may be selected and then the selected multiple function images may be operated with respect to another function image.

Figure 28:
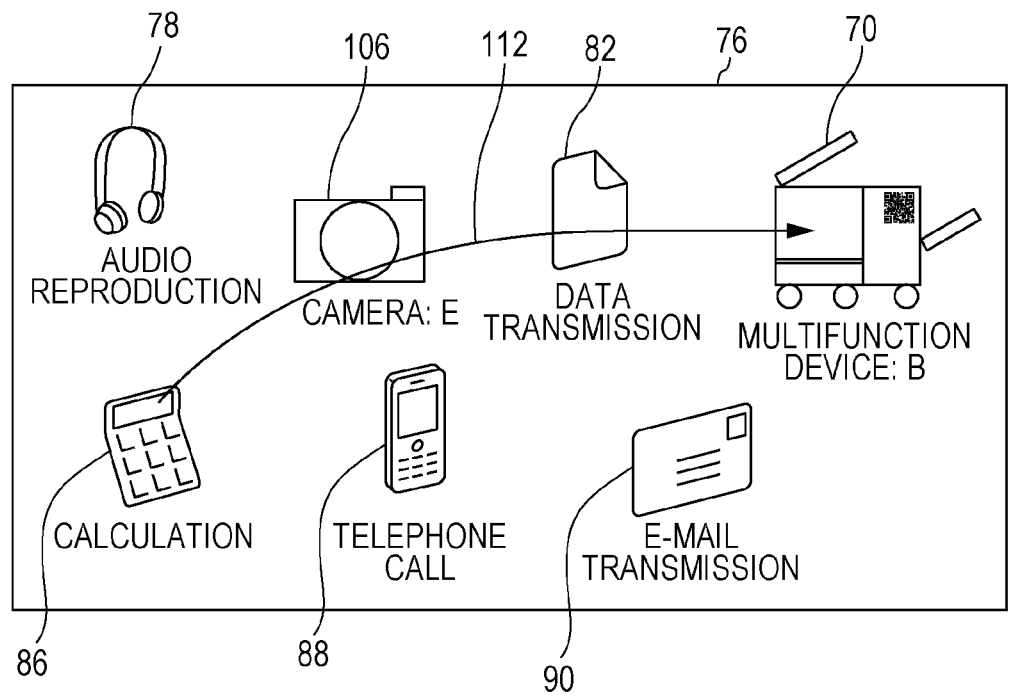
FIG. 28 illustrates an example screen.

FIG. 28 illustrates still another example operation. The screen 76 in the aerial display space displays device images 70 and 106 and function images 78, 82, 86, 88, and 90. For example, a function (e.g., calculation software) interrelated with the function image 86 and a multifunction device (B) interrelated with the device image 70 are assumed to work in collaboration. When the user performs an operation for establishing the collaboration, any function image other than the function image 86 or any device image other than the device image 70 may be unintentionally operated by the user. For example, as indicated by a trajectory 112, when the user moves their fingertip from the function image 86 to the device image 70 over the screen 76 (touches the screen 76 with their fingertip) in order to join the function image 86 and the device image 70 together as an operation for establishing the collaboration, the device image 106 and the function image 82, which appear along the trajectory 112, are also designated. In this case, a camera (E) interrelated with the device image 106 and data transmission software (α) interrelated with the function image 82 are also designated as objects intended for collaboration. The designation of the camera (E) and the data transmission software (α) is not desired by the user.

To address the undesired behavior described above, for instance, when a device image or a function image is superimposed on top of another device image for a predetermined time or longer, the specifying unit 38 identifies a device interrelated with the other device image as a device intended for collaboration. Likewise, when a device image or a function image is superimposed on top of another function image for a predetermined time or longer, the specifying unit 38 identifies a function interrelated with the other function image as a function intended for collaboration.

Alternatively, a user moves their fingertip from the function image 86 to the device image 70 while changing the position thereof in the depth direction so as not to pass through the display positions of the other images 78, 82, 88, 90, and 106. For instance, when the positions of the images are aligned to be identical with each other in the depth direction, after designating the function image 86, the user moves their fingertip from the function image 86 to the device image 70 while pulling their hand back toward the body, and then touches the device image 70 to designate the device image 70.

Referring to the example illustrated in FIG. 28, when the user moves the function image 86 onto the device image 70 along the trajectory 112 and superimposes the function image 86 on top of the device image 70 for a predetermined time or longer, the specifying unit 38 identifies the multi-function device (B) interrelated with the device image 70 as a device intended for collaboration. In this case, information indicating a collaborative function executable using calculation software and the multifunction device (B) is displayed. As another example, when, after designating the function image 86, the user moves their fingertip from the function image 86 to the device image 70 over the screen 76 along the trajectory 112 and designates the device image 70 for a predetermined time or longer, the specifying unit 38 may identify the multifunction device (B) interrelated with the device image 70 as a device intended for collaboration. When the function image 86 is designated for a predetermined time or longer, the specifying unit 38 may identify the calculation software interrelated with the function image 86 as a function intended for collaboration. Thus, a device interrelated with the device image 106 and a function interrelated with the function image 82, which appear along the trajectory 112, are not selected as a device and function intended for collaboration. This prevents the user's unintended device and function from being selected as objects intended for collaboration. In FIG. 28, the function image 86 and the device image 70 being displayed on a single screen 76 are objects intended for collaboration. Alternatively, images on different screens displayed in the aerial display space may be objects intended for collaboration. That is, objects intended for collaboration may be designated over screens.

Figure 29:
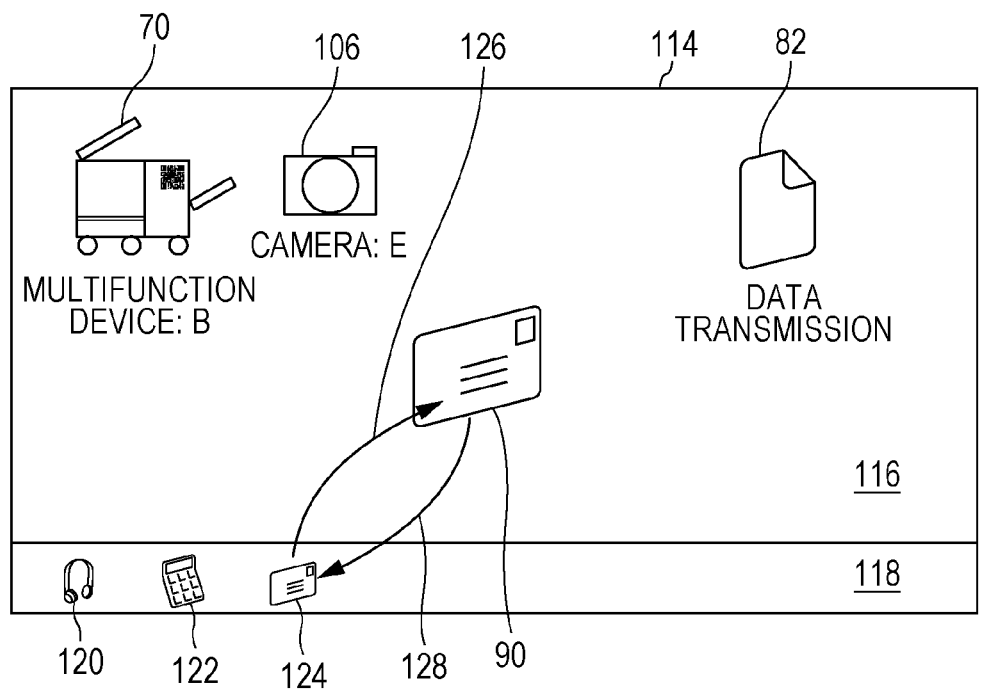
FIG. 29 illustrates an example screen.

FIG. 29 illustrates still another example operation. A screen 114 is displayed in the aerial display space. The screen 114 is a desktop screen serving as a basic operation screen and includes, for example, a main display area 116 and a sub-display area 118.

The main display area 116 shows device images, function images, images interrelated with files, images interrelated with folders, and so on. When software is executed (or started), the main display area 116 shows an operation screen for the software (such as a document editing screen, a spreadsheet screen, an image viewer, an image processing screen, or a web browser). The main display area 116 also shows information indicating a collaborative function.

The sub-display area 118 is a horizontally elongated area displayed in a lower region of the screen 114 and is an area called a taskbar. The sub-display area 118 shows, for example, device images, function images, other icons, and so on. The images displayed in the sub-display area 118 may be each an image having a smaller size than the original image, an image having the same size as the original image, or an image having a larger size than the original image. In the example illustrated in FIG. 29, the sub-display area 118 shows images having smaller sizes. For example, an image 120 is a size-reduced image corresponding to the function image 78, an image 122 is a size-reduced image corresponding to the function image 86, and an image 124 is a size-reduced image corresponding to the function image 90. It is to be understood that a size-reduced image corresponding to a device image may be displayed in the sub-display area 118. The sub-display area 118 may show predetermined device images, function images, other icons, and so on or may show device images, function images, other icons, and so on designated by a user. The sub-display area 118 may be a horizontally elongated area displayed in an upper region of the screen 114 or a vertically elongated area displayed in the right or left side region of the screen 114.

The user may perform an operation to move an image displayed in the sub-display area 118 to the main display area 116 or move an image displayed in the main display area 116 to the sub-display area 118. In the example illustrated in FIG. 29, as indicated by an arrow 126, the image 124 is moved from the sub-display area 118 to the main display area 116. In this case, the control unit 48 of the terminal apparatus 16 enlarges the image 124, which is a size-reduced image, and displays the enlarged function image 90 in the main display area 116. After movement, the image 124 is no longer displayed in the sub-display area 118. Further, as indicated by an arrow 128, the function image 90 may be moved from the main display area 116 to the sub-display area 118. In this case, the control unit 48 of the terminal apparatus 16 reduces the size of the function image 90 and displays the size-reduced image 124 in the sub-display area 118. After movement, the function image 90 is no longer displayed in the main display area 116.

The main display area 116 corresponds to an example of a collaborative area, and a device image or a function image displayed in the main display area 116 can be operated to display a collaborative function. That is, as in the exemplary embodiments described above, the user operates a device image or a function image displayed in the main display area 116 to designate a device or a function that is intended for collaboration, and information indicating a collaborative function executable using the designated device or function is displayed.

For instance, when no collaborative function is to be used, the user may move a device image or a function image to the sub-display area 118. When a collaborative function is to be used, the user may move a device image interrelated with a device necessary to execute the collaborative function or a function image interrelated with a function necessary to execute the collaborative function from the sub-display area 118 to the main display area 116. This prevents a device image interrelated with a device unnecessary to execute the collaborative function or a function image interrelated with a function unnecessary to execute the collaborative function from being displayed in the main display area 116, and facilitates user operation for enabling collaboration between a device or a function.

In the first through third exemplary embodiments described above, if a collaborative function executable using a device or function designated by the user is not registered in the collaborative function management table, the specifying unit 38 of the server 14 determines that the collaborative function executable using the device or function designated by the user is not registered. In this case, the control unit 36 of the server 14 outputs a message indicating that the collaborative function is not executable using the designated device or function. This message is displayed in the aerial display space. Even in this case, the collaborative function may be rendered available depending on the operating state of the device, the environment (surroundings) in which the device is installed, a change (or an update) of the function of the device, the conditions under which a process is executed with software, and so on. For instance, when a multifunction device and a dryer are selected as devices to be connected to each other, there may be initially no collaborative function executable using the multifunction device and the dryer. Even in this case, condensation created in an environment where the multifunction device is installed can be removed or prevented by using the dryer. In this case, the collaborative function executable using the multifunction device and the dryer becomes available, and thus information indicating the collaborative function may be displayed in the aerial display space. For example, the control unit 36 of the server 14 monitors the operating state of each device, the environment (surroundings) in which each device is installed, the update state of functions of each device, the conditions under which a process is executed with software, and so on, and may determine the availability of the collaborative function on the basis of the monitoring results. In the following description, a combination of a multifunction device and a dryer is taken as an example. When the surroundings of the multifunction device satisfy a specific condition (e.g., when condensation is created in the surroundings of the multifunction device), the control unit 36 determines that the collaborative function is available, and specifies (or identifies) a collaborative function that uses a dryer. The same applies to the operating state of devices. When a group of identified or designated devices are in a specific operating state, the control unit 36 determines that a collaborative function that uses the group of devices is available. The same applies when a function of a device is updated and a collaborative function becomes available due to the update of the function, when software becomes available, when a collaborative function becomes available due to the update of software, and other cases.

The following describes related processes.

Related Process 1: Process for Switching Display of Information Concerning Collaborative Function The following describes related process 1. In the first exemplary embodiment, the display of information concerning a collaborative function may be switched in accordance with the order of selecting multiple devices. The following describes this process in more detail with reference to FIG. 30 to FIG. 32.

FIG. 30 illustrates a collaborative function management table as another example of the collaborative function management information 34. The illustrated collaborative function management table contains, as an example, information indicating a combination of device IDs, information indicating the names of devices intended for collaboration (e.g., the types of the devices), information indicating collaborative functions (collaborative function information), information indicating the connection order, and information indicating the priority order, which are associated with each other. The device IDs and the device names correspond to an example of device identification information. The connection order corresponds to the order of designation of devices and corresponds to, for example, the order in which device images are joined together or superimposed on top of each other. For instance, when a user sequentially designates multiple devices, the order of designation of the devices corresponds to the connection order. When a user joins a first device image to a second device image, the designation of a first device interrelated with the first device image is placed in the first position, and the designation of a second device interrelated with the second device image is placed in the second position. When a user superimposes the first device image on top of the second device image, the designation of the first device interrelated with the first device image is placed in the first position, and the designation of the second device interrelated with the second device image is placed in the second position. The priority order is the order of priorities assigned to pieces of information in a collaborative function when the pieces of information are displayed. For example, a device with device ID "A" is a PC, and a device with device ID "B" is a multifunction device. The PC (A) and the multifunction device (B) work in collaboration to implement collaborative functions, for example, a "scan-and-transfer function" and a "printing function". The "scan-and-transfer function" is a function of transferring image data generated by the multifunction device (B) through a scanning process to the PC (A). The "printing function" is a function of transmitting data (e.g., image data or document data) saved in the PC (A) to the multifunction device (B) and printing the transmitted data using the multifunction device (B). For instance, when the multifunction device (B) is connected to the PC (A), that is, when the multifunction device (B) and the PC (A) are designated by a user in this order, the "scan-and-transfer function" is assigned the highest priority ("1") and the "printing function" is assigned the second highest priority ("2"). In this case, information concerning the "scan-and-transfer function" is displayed more preferentially than information concerning the "printing function". Conversely, when the PC (A) is connected to the multifunction device (B), that is, when the PC (A) and the multifunction device (B) are designated by a user in this order, the "printing function" is assigned the highest priority ("1") and the "scan-and-transfer function" is assigned the second highest priority ("2"). In this case, information concerning the "printing function" is displayed more preferentially than information concerning the "scan-and-transfer function".

For instance, when the user designates the multifunction device (B) and the PC (A) in this order, the designation order is designated as the connection order. For example, a user joins a device image interrelated with the multifunction device (B) to a device image interrelated with the PC (A) or superimposes the device image interrelated with the multifunction device (B) on top of the device image interrelated with the PC (A), thereby designating these devices and the connection order. Information indicating the connection order of the devices is transmitted from the terminal apparatus 16 to the server 14. The specifying unit 38 of the server 14 specifies a collaborative function associated with a combination of the PC (A) and the multifunction device (B) in the collaborative function management table illustrated in FIG. 30. Thus, a collaborative function executing by enabling collaboration between the PC (A) and the multifunction device (B) is specified. When the user designates the connection order of devices, the specifying unit 38 specifies the priority order associated with the connection order in the collaborative function management table. A specific example will be described with reference to FIG. 30. Since the PC (A) and the multifunction device (B) are designated as devices intended for collaboration, collaborative functions execute by the PC (A) and the multifunction device (B) are the "scan-and-transfer function" and the "printing function". Furthermore, since the multifunction device (B) is connected to the PC (A) (B→A), the "scanand-transfer function" is assigned the highest priority ("1") and the "printing function" is assigned the second highest priority ("2").

The information concerning the collaborative function specified in the way described above and the information indicating the priority order are transmitted from the server 14 to the terminal apparatus 16. The control unit 48 of the terminal apparatus 16 causes information concerning the collaborative function to be displayed in the aerial display space as information concerning candidate collaborative functions in accordance with the priority order.

FIG. 31 illustrates a screen 130 displayed in the aerial display space. The screen 130 shows information concerning candidate collaborative functions. Since the "scan-and-transfer function" is assigned the highest priority ("1") and the "printing function" is assigned the second highest priority ("2"), the information concerning the "scan-and-transfer function" is displayed more preferentially (e.g., in a higher position) than the information concerning the "printing function". For example, as the information concerning the "scan-and-transfer function", the description of the "scan-and-transfer function", namely, "transferring data scanned by the multifunction device (B) to the PC (A)", is displayed. Further, as the information concerning the "printing function", the description of the "printing function", namely, "printing data saved in the PC (A)", is displayed.

When a user designates a collaborative function and provides an execution instruction, the designated collaborative function is executed. For instance, when the user presses a "YES" button, a collaborative function interrelated with the "YES" button is executed. When the user presses a "Return" button, which is displayed on the screen, the device connection process is suspended.

The process of specifying a collaborative function and the process of specifying priorities may be performed by the terminal apparatus 16.

As another example, when the user designates the PC (A) and the multifunction device (B) in this order, the designation order is designated as the connection order. For example, a user joins the device image interrelated with the PC (A) to the device image interrelated with the multifunction device (B) or superimposes the device image interrelated with the PC (A) on top of the device image interrelated with the multifunction device (B), thereby designating these devices and the connection order. Information indicating the connection order of the devices is transmitted from the terminal apparatus 16 to the server 14. Referring to the collaborative function management table illustrated in FIG. 30, the "printing function" is assigned the highest priority ("1") and the "scan-and-transfer function" is assigned the second highest priority ("2"). In this case, as illustrated in FIG. 32, the information concerning the "printing function" is displayed on the screen 130 more preferentially (e.g., in a higher position) than the information concerning the "scan-and-transfer function".

As described above, the order of display of pieces of information concerning collaborative functions is changed in accordance with the order of designation of devices. The connection order of devices also serves as the order of functions used in the devices and the order of movement of pieces of data to be moved between devices that work in collaboration, and the operation of designating devices also serves as an operation of designating the order of functions and the order of movement of pieces of data. For this reason, the order of display of pieces of information concerning collaborative functions is changed in accordance with the connection order, thereby allowing information concerning a collaborative function presumably used by the user to be displayed by priority. That is, information concerning a collaborative function that is more likely to be used by the user is displayed by priority. For instance, when the multifunction device (B) and the PC (A) are selected in this order, it is predicted that the user will use a collaborative function of "using the functions of the multifunction device (B) more preferentially than those of the PC (A) and transferring data from the multifunction device (B) to the PC (A)". When the PC (A) and the multifunction device (B) are selected in this order, it is predicted that the user will use a collaborative function of "using the functions of the PC (A) more preferentially than those of the multifunction device (B) and transferring data from the PC (A) to the multifunction device (B)". For this reason, the order of display of pieces of information concerning collaborative functions is changed in accordance with the order in which devices are selected, thereby allowing information concerning a collaborative function that is more likely to be used by the user to be displayed by priority.

The related process 1 may be applied to the second exemplary embodiment. In this case, the collaborative function management table contains, as an example, information indicating a combination of function IDs, information indicating the names of functions intended for collaboration, information indicating collaborative functions, information indicating the connection order, and information indicating the priority order, which are associated with each other. The connection order corresponds to the order of designation of functions and corresponds to, for example, the order in which function images are joined together or superimposed on top of each other. For instance, when a user sequentially designates multiple functions, the order of designation of the multiple functions corresponds to the connection order. When a user joins a first function image to a second function image, the designation of a first function interrelated with the first function image is placed in the first position, and the designation of a second function interrelated with the second function image is placed in the second position. When a user superimposes the first function image on top of the second function image, the designation of the first function interrelated with the first function image is placed in the first position, and the designation of the second function interrelated with the second function image is placed in the second position. As described above, the collaborative function management table is referred to, thereby specifying a collaborative function associated with a combination of the designated functions and further specifying the priority order associated with the connection order as the order of designation of the functions. In the aerial display space, the pieces of information concerning the collaborative functions are displayed in accordance with the priority order.

The related process 1 may be applied to the third exemplary embodiment. In this case, the collaborative function management table contains, as an example, information indicating a combination of a device ID and a function ID, information indicating the names of a device and function intended for collaboration, information indicating collaborative functions, information indicating the connection order, and information indicating the priority order, which are associated with each other. The connection order corresponds to the order of designation of a device and a function and corresponds to, for example, the order in which a device image and a function image are joined together or superimposed on top of each other. For instance, when a user sequentially designates a device and a function, the order of designation of the device and the function corresponds to the connection order. When a user joins a device image to a function image, the designation of a device interrelated with the device image is placed in the first position, and the designation of a function interrelated with the function image is placed in the second position. Conversely, when a user joins the function image to the device image, the designation of the function interrelated with the function image is placed in the first position, and the designation of the device interrelated with the device image is placed in the second position. Further, when a user superimposes the device image on top of the function image, the designation of the device interrelated with the device image is placed in the first position, and the designation of the function interrelated with the function image is placed in the second position. Conversely, when a user superimposes the function image on top of the device image, the designation of the function interrelated with the function image is placed in the first position, and the designation of the device interrelated with the device image is placed in the second position. As described above, the collaborative function management table is referred to, thereby specifying a collaborative function associated with a combination of the designated device and function and further specifying a priority order associated with the connection order as the order of designation of the device and function. In the aerial display space, the pieces of information concerning the collaborative functions are displayed in accordance with the priority order.

Related Process 2: Collaboration Process Using Portions of Device

The following describes related process 2. Positions in a device image interrelated with a device may be each assigned a different function. When a user designates a position in the device image, information concerning a collaborative function that uses a function corresponding to the position designated by the user is displayed. The following describes this process in more detail. Note that the term "position in a device image", as used in the related process 2, refers to a position in an image on a planar image (the x- and y-axis directions in the three-dimensional coordinate system), rather than a position in the depth direction of a stereoscopic image (the z-axis direction in the three-dimensional coordinate system).

Figures 33, 34:
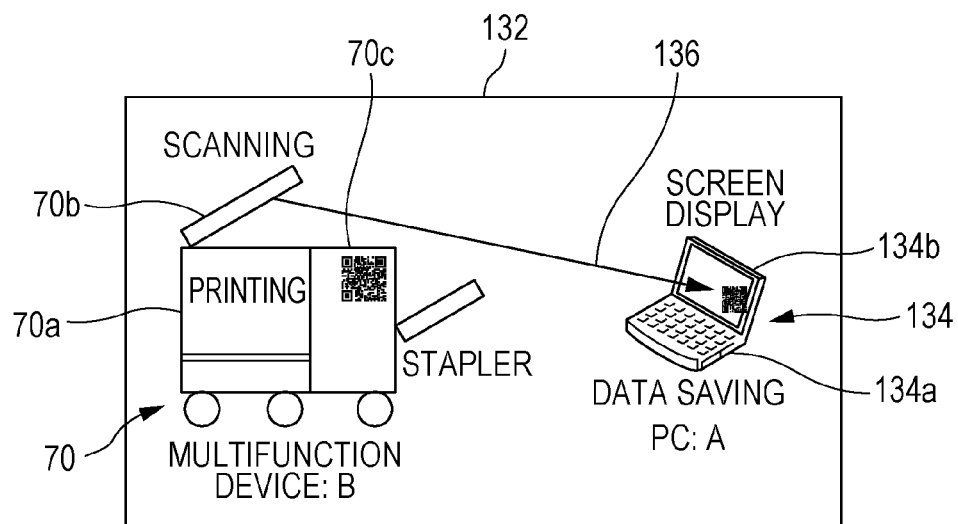
FIG. 33 illustrates an example device function management table.
FIG. 34 illustrates an example screen.

FIG. 33 illustrates an example device function management table. Data of the device function management table is stored in the server 14 as the device function management information 32. The device function management table contains, as an example, a device ID, information indicating the name of the device (e.g., the type of the device), information indicating the position of the device in a device image, information (function information) indicating functions corresponding to the position in the device image, and an image ID, which are associated with each other. The position in the device image is a specific position (specific member) in a device image interrelated with the device and is, for example, a specific position in a device image graphically representing the device or a specific position in a device image captured by a camera. Each specific position in the device image is associated with a different function.

FIG. 34 illustrates an example screen displayed in the aerial display space. For example, the multifunction device (B) and the PC (A) are identified, and a screen 132 shows device images 70 and 134. Further, portions included in the multifunction device (B) and the PC (A) are also identified. The identification of portions is also implemented using the identification technique (e.g., AR technology) according to the first exemplary embodiment. For example, images of portions of a device are captured and subjected to the markerless AR technology to identify the portions.

The device image 134 is an image interrelated with the PC (A). In the device image 70, for example, a specific position (a partial image 70*a*) corresponding to the main body of the multifunction device (B) is assigned the "printing function". In the device image 70, a specific position (a partial image 70*b*) corresponding to a document cover, a document glass, and an automatic document feeder of the multifunction device (B) is assigned the "scanning function". In the device image 70, a specific position (a partial image 70*c*) corresponding a post-processing device is assigned a "stapling function". The "stapling function" is a function of fastening output sheets of paper together with a stapler. In the device image 134, a specific position (a partial image 134*a*) corresponding to the main body of the PC (A) is assigned a "data saving function". In the device image 134, a specific position (a partial image 134*b*) corresponding to a display unit of the PC (A) is assigned a "screen display function". The "data saving function" is a function of saving data transmitted from another device in the PC (A). The "screen display function" is a function of displaying data transmitted from another device on the PC (A).

The control unit 48 of the terminal apparatus 16 may cause the names of functions (such as printing and scanning) assigned to the specific positions in the device image to be displayed on the screen 132. This allows the user to be provided with information to facilitate understanding which function is associated with each specific position. It is to be understood that the names of the functions may not necessarily be displayed.

When a position in a device image associated with a function is designated by a user, a function associated with the designated position is designated as a function intended for collaboration. A user joints the specific positions (partial images) associated with the functions in the device image together with their fingertip. For example, as indicated by an arrow 136, the user joins the partial image 70*b* and the partial image 134*b* together with their fingertip. Thus, the multifunction device (B) interrelated with the device image 70 including the partial image 70*b* and the PC (A) interrelated with the device image 134 including the partial image 134*b* are designated as devices intended for collaboration, and the "scanning function" corresponding to the partial image 70*b* and the "screen display function" corresponding to the partial image 134*b* are designated.

When the devices intended for collaboration (e.g., the PC (A) and the multifunction device (B)) are identified, the specifying unit 38 of the server 14 specifies a collaborative function implemented by enabling collaboration between the PC (A) and the multifunction device (B) in the collaborative function management table illustrated in FIG. 7. Further, the specifying unit 38 refers to the device function management table illustrated in FIG. 33 to specify a function associated with the specific position designated by the user in the device image. Then, the specifying unit 38 increases the priority of a collaborative function that uses a function associated with the position designated by the user among a group of collaborative functions implemented by enabling collaboration between the PC (A) and the multifunction device (B) and decreases the priority of a collaborative function that does not use the function.

Information concerning the collaborative function specified in the way described above and information indicating the priority order are transmitted from the server 14 to the terminal apparatus 16. The control unit 48 of the terminal apparatus 16 causes the information concerning the collaborative function to be displayed in the aerial display space as information concerning candidate collaborative functions in accordance with the priority order.

For example, as illustrated in FIG. 35, the control unit 48 of the terminal apparatus 16 causes a screen 138 to be displayed in the aerial display space, and causes the information concerning candidate collaborative functions to be displayed on the screen 138. Since the "scanning function" and the "screen display function" have been designated by the user in this order, information concerning a collaborative function "scan-and-transfer-and-then-display function", which is executed by enabling collaboration between the "scanning function" and the "image function", is displayed more preferentially (e.g., in a higher position) than information concerning other collaborative functions. For example, the information concerning the "scan-and-transfer-and-then-display function" is displayed more preferentially than the information concerning a collaborative function "scan-and-transfer-and-then-saving function", which is executed by enabling collaboration between the "scanning function" and the "data saving function". The scan-and-transfer-and-then-display function is a function of transferring data generated by the multifunction device (B) through a scanning process to the PC (A) and displaying an image based on the data on a screen of the PC (A). The scan-and-transfer-and-then-saving function is a function of transferring data generated by the multifunction device (B) through a scanning process to the PC (A) and saving the data in the PC (A). In the example illustrated in FIG. 35, the description of each collaborative function is displayed as information concerning the collaborative function.

In the related process 2, when devices intended for collaboration have multiple functions, each of functions is designated and information concerning a collaborative function that uses the designated function is displayed by priority. This enables a collaborative function presumably used by the user to be displayed by priority.

Each collaborative function may be a function that uses a combination of portions of the same device or different devices or may be a function that uses a combination of the entire device and a portion of the device. Alternatively, each collaborative function may be a function that uses a combination of entire devices.

In addition, the related processes 1 and 2 may be combined to switch the display of information concerning a collaborative function in accordance with the order of designation of devices or portions.

When a user designates only one device or only one portion, information indicating a standalone function executable by the device or portion is displayed in the aerial display space.

Related Process 3: Another Example of Collaboration Process Using Portion of Device The following describes related process 3, namely, another example of a collaboration process using a partial image with reference to FIG. 36 and FIG. 37.

FIG. 36 illustrates an example device function management table. Data of the device function management table is stored in the server 14 as the device function management information 32. The device function management table contains, as an example, a device ID, information indicating the name of the device (e.g., the type of the device), information indicating the name of a portion of the device (e.g., the type of the portion), a portion ID as portion identification information for identifying the portion, information indicating a function assigned to the portion (a function of the portion), and a partial image ID for identifying a partial image interrelated with the portion, which are associated with each other. The partial image is an image representing the external appearance of the portion of the device, which is captured by a camera. It is to be understood that a partial image graphically representing the portion of the device may be associated with the portion. For example, each portion of the device is assigned a different function.

A specific example will be described. A display unit of the PC (A) is assigned a screen display function, and a partial image interrelated with the display unit has a partial image ID associated with information indicating the screen display function. The screen display function is a function of displaying information on the PC (A). A main body of the PC (A) is assigned a data saving function, and a partial image interrelated with the main body has a partial image ID associated with information indicating the data saving function. The data saving function is a function of saving data in the PC (A).

A main body of the multifunction device (B) is assigned a printing function, and a partial image interrelated with the main body has a partial image ID associated with information indicating the printing function. A reader of the multifunction device (B) (e.g., a portion corresponding to the document cover, the document glass, or the automatic document feeder of the multifunction device (B)) is assigned a scanning function, and a partial image interrelated with the reader has a partial image ID associated with information indicating the scanning function. A post-processing device of the multifunction device (B) is assigned a stapling function, and a partial image interrelated with the post-processing device has a partial image ID associated with information indicating the stapling function. The stapling function is a function of fastening output sheets of paper together with a stapler.

The function assigned to each portion of a device is specified (or identified) using, for example, the markerless AR technology. For example, an image of a portion of a device is captured by a camera (e.g., the camera 42 of the terminal apparatus 16). In this case, external appearance image data indicating the portion is transmitted from the terminal apparatus 16 to the server 14. The specifying unit 38 of the server 14 specifies (or identifies) a function associated with the external appearance image data in the device function management table. Thus, a function assigned to the portion whose image has been captured is specified (or identified). For example, an image of the main body of the multifunction device (B) is captured by the camera 42. In this case, external appearance image data indicating the main body of the multifunction device (B) is transmitted from the terminal apparatus 16 to the server 14. The specifying unit 38 of the server 14 specifies a printing function associated with the external appearance image data in the device function management table. Thus, a function assigned to the main body of the multifunction device (B), namely, the printing function, is specified.

A function assigned to each portion of a device may be specified (or identified) using the marker-based AR technology. For example, each portion of a device has a marker such as a two-dimensional barcode, which is coded portion identification information (e.g., a coded portion ID) for identifying the portion. When an image of a marker on a portion is captured by a camera and is subjected to the marker-based AR technology, portion identification information (e.g., the portion ID) of the portion is acquired. The marker-based AR technology may be applied by the terminal apparatus 16 or by the server 14. When portion identification information is acquired in this way, the specifying unit 38 of the server 14 specifies (or identifies) a function associated with the portion identification information (e.g., the portion ID) in the device function management table.

Figures 37, 38:
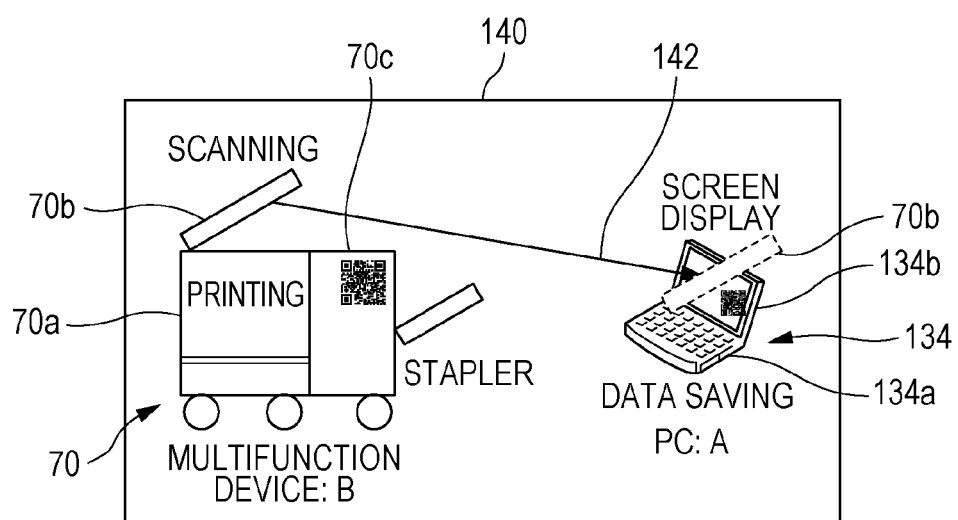
FIG. 37 illustrates an example collaborative function management table.
FIG. 38 illustrates an example screen.

FIG. 37 illustrates an example collaborative function management table. Data of the collaborative function management table is stored in the server 14 as the collaborative function management information 34. The collaborative function management table is information indicating a collaborative function that uses functions of multiple portions. The collaborative function management table contains, as an example, information indicating a combination of portions of a device, information indicating a combination of portion IDs, and information indicating a collaborative function that uses functions of the multiple portions included in the combination of the portions, which are associated with each other. It is to be understood that, in the collaborative function management table, information indicating a combination of portions of a device and the entire device and information indicating a collaborative function that uses functions of a portion of the device and functions of the entire device may be associated with each other.

A specific example will be described. A combination of the display unit of the PC (A) and the main body of the multifunction device (B) is assigned the printing function serving as a collaborative function, and information indicating a combination of a portion ID of the display unit of the PC (A) and a portion ID of the main body of the multifunction device (B) is associated with information indicating the printing function serving as a collaborative function. The printing function serving as a collaborative function is, for example, a function of transmitting data saved in the PC (A) to the multifunction device (B) and printing the data using the multifunction device (B).

Further, a combination of the main body of the multifunction device (B) and the main body of the projector (C) is assigned the printing function serving as a collaborative function, and information indicating a combination of a portion ID of the main body of the multifunction device (B) and a portion ID of the main body of the projector (C) is associated with information indicating the printing function serving as a collaborative function. The printing function serving as a collaborative function is, for example, a function of transmitting data projected by the projector (C) to the multifunction device (B) and printing the data using the multifunction device (B).

Further, a combination of the reader of the multifunction device (B) and the main body of the projector (C) is assigned a scan-and-projection function serving as a collaborative function, and information indicating a combination of a portion ID of the reader of the multifunction device (B) and a portion ID of the main body of the projector (C) is associated with information indicating the scan-and-projection function serving as a collaborative function. The scan-and-projection function serving as a collaborative function is, for example, a function of transmitting data generated by the multifunction device (B) through a scanning process to the projector (C) and projecting an image based on the data using the projector (C).

Each collaborative function may be a function that uses functions of multiple portions included in the same device or may be a function that uses functions of portions of multiple different devices. Alternatively, each collaborative function may be a function that uses functions of three or more portions.

For instance, when multiple portions of a device or devices (e.g., multiple portions of multiple different devices or multiple portions of the same device) are specified (or identified) by using the marker-based AR technology or the markerless AR technology, the specifying unit 38 of the server 14 specifies (or identifies) a collaborative function associated with a combination of the identified multiple portions in the collaborative function management table. Thus, a collaborative function that uses functions of the identified multiple portions (e.g., multiple portions whose images have been captured) is specified (or identified). For instance, when an image of the main body of the multifunction device (B) and an image of the main body of the projector (C) are captured by the camera 42 of the terminal apparatus 16 and the main body of the multifunction device (B) and the main body of the projector (C) are identified, the specifying unit 38 of the server 14 specifies the printing function or the like as a collaborative function associated with a combination of the main body of the multifunction device (B) and the main body of the projector (C) in the collaborative function management table.

As in the related process 2, when multiple portions are designated, the collaborative function management table is referred to, thereby specifying a collaborative function executable using the multiple portions, and information indicating the collaborative function is displayed on the terminal apparatus 16.

In addition, the related processes 1 and 3 may be combined to switch the display of information concerning a collaborative function in accordance with the order of designation of device images or partial images.

Each partial image may be an image that is separable from a device image and movable. For example, as illustrated in FIG. 38, when a user moves the partial image 70b in a direction indicated by an arrow 142 and superimposes the partial image 70b on top of the partial image 134b, a collaborative function executable using a function interrelated with the partial image 70b and a function interrelated with the partial image 134b is specified, and information indicating the collaborative function is displayed. It is to be understood that when a partial image is superimposed on top of an entire device image, information indicating a collaborative function executable using a function interrelated with the partial image and a device interrelated with the device image may be displayed.

Figure 39:
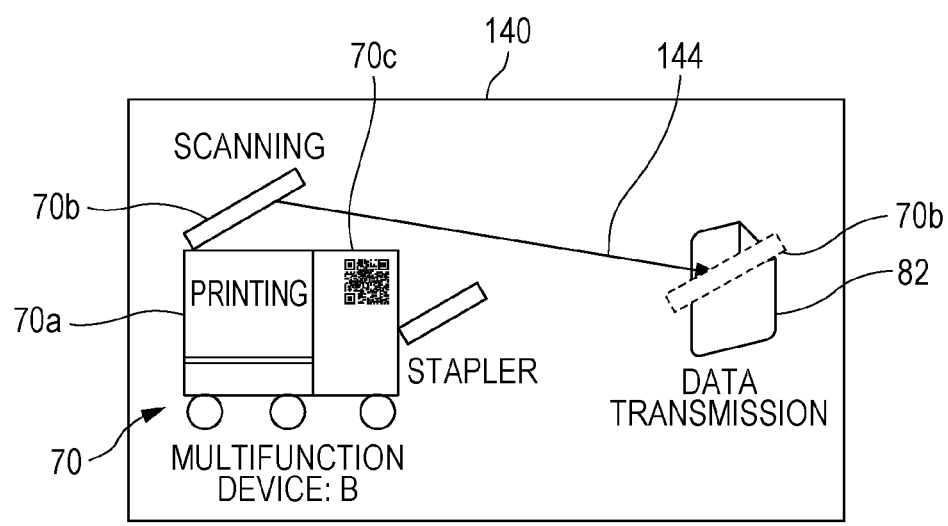
FIG. 39 illustrates an example screen.

The related processes 2 and 3 may be applied to the third exemplary embodiment. For example, as illustrated in FIG. 39, a screen 140 shows a device image 70 interrelated with the multifunction device (B) and a function image 82 interrelated with the data transmission software (α). In this case, when a user joins the partial image 70b and the function image 82 together, a collaborative function executable using a function interrelated with the partial image 70b and a function interrelated with the function image 82 is specified, and information indicating the collaborative function is displayed. When a user moves the partial image 70b in a direction indicated by an arrow 144 and superimposes the partial image 70b on top of the function image 82, information indicating a collaborative function executable using a function interrelated with the partial image 70b and a function interrelated with the function image 82 may be displayed.

In addition, the related processes 1, 2, and 3 may be applied to the third exemplary embodiment. In this case, the display of information concerning a collaborative function is switched in accordance with the order of designation of device images, partial images, or function images. For instance, the display of information concerning a collaborative function is switched in accordance with the order in which images are joined together or superimposed on top of each other.

Each function image may also include multiple partial images. In this case, each portion of the entire function image is assigned a different function. When a portion of the entire function image is designated, the function assigned to the designated portion may be designated. Also in this case, when a partial image in a function image and a partial image in a device image are designated, a function executable using the respective functions interrelated with the partial images is specified, and information concerning the collaborative function is displayed.

The first through third exemplary embodiments described above may be combined. For example, the control unit 48 of the terminal apparatus 16 may switch among a first control mode, a second control mode, and a third control mode and may execute one of them. The first control mode is a control mode corresponding to the first exemplary embodiment. The first control mode is a mode for, when multiple device images are designated, controlling the display of a collaborative function executable using multiple devices interrelated with the multiple device images. The second control mode is a control mode corresponding to the second exemplary embodiment. The second control mode is mode for, when multiple function images are designated, controlling the display of a collaborative function executable using multiple functions interrelated with the multiple function images. The third control mode is a control mode corresponding to the third exemplary embodiment. The third control mode is mode for, when a device image and a function image are designated, controlling the display of a collaborative function executable using a device interrelated with the device image and a function interrelated with the function image.

For example, as illustrated in FIG. 11, when the screen in the aerial display space shows a device image but does not show a function image, the control unit 48 executes the first control mode. As illustrated in FIG. 19, when the screen shows a function image but does not show a device image, the control unit 48 executes the second control mode. As illustrated in FIG. 21, when the screen shows both a device image and a function image, the control unit 48 executes the third control mode.

For instance, when the main display area 116 illustrated in FIG. 29 shows a device image but does not show a function image, the first control mode is executed. When the main display area 116 shows a function image but does not show a device image, the second control mode is executed. When the main display area 116 shows both a device image and a function image, the third control mode is executed. For example, a user adds or removes a device image or a function image between the main display area 116 and the sub-display area 118, thereby changing the image displayed in the main display area 116 and changing the control mode accordingly.

Other Exemplary Embodiments

When both a device image and a function image are being displayed in a specific display area on a screen, information indicating a collaborative function executable using a device interrelated with the device image and a function interrelated with the function image may be displayed on the terminal apparatus 16. For instance, when a user moves a device image interrelated with a device and a function image interrelated with a function, which are desired to work in collaboration, to the specific display area on the screen and provides an instruction to display the collaborative function, information indicating a collaborative function executable using the device and the function is displayed.

The collaborative function may be changed in accordance with the relationship between the display position of a device image and the display position of a function image in the aerial display space. For instance, when the relationship between the display position of the device image and the display position of the function image corresponds to a first positional relationship (e.g., when the device image and the function image are arranged side-by-side laterally), information indicating a collaborative function corresponding to the first positional relationship is displayed on the terminal apparatus 16. When the positional relationship corresponds to a second positional relationship (e.g., when the device image and the function image are arranged side-by-side longitudinally), information indicating a collaborative function corresponding to the second positional relationship (a function different from the collaborative function corresponding to the first positional relationship) is displayed on the terminal apparatus 16. For instance, when a user moves a device image and a function image over a screen and provides an instruction to display a collaborative function, information indicating a collaborative function corresponding to the positional relationship between the device image and the function image is displayed. The display control described above enables a collaborative function to be changed with a simple operation (e.g., an operation of rearranging images).

When the relationship between the display position of a device image and the display position of a function image corresponds to the first positional relationship, information indicating a collaborative function executable using a device interrelated with the device image and a function interrelated with the function image may be displayed. When the relationship corresponds to the second positional relationship, information indicating a standalone function included in the device and information indicating the function (i.e., the standalone function) may be displayed. This enables the display of a standalone function and the display of a collaborative function to be switched with a simple operation.

Alternatively, the control unit 48 of the terminal apparatus 16 may cause a list of collaborative functions to be displayed in the aerial display space and may cause information indicating a device or function capable of executing a collaborative function selected by the user from the list to be displayed in the aerial display space. This device or function is specified by referring to the collaborative function management table described above. The specification of a device or function is performed by, for example, the specifying unit 38, and information specified through the specification process is transmitted from the server 14 to the terminal apparatus 16 and is displayed in the aerial display space. It is to be understood that the specification process may be performed by the terminal apparatus 16. For instance, when a collaborative function selected by the user is a function executable using a first device and a second function (e.g., software), information indicating the first device (such as an image or a name interrelated with the first device) and information indicating the second device (such as an image or a name interrelated with the second device) are displayed in the aerial display space. This enables a device or function necessary to execute a collaborative function selected by the user to be provided to the user. When a collaborative function selected by the user is executable by multiple devices, information indicating the multiple devices is displayed in the aerial display space. When the collaborative function is executable by multiple functions, information indicating the multiple functions is displayed in the aerial display space. The list of collaborative functions displayed in the aerial display space may be a list of collaborative functions registered in advance or may be updated at a predetermined timing or any desired timing. When software necessary to execute a collaborative function selected by the user is not available to the user (e.g., when the software has not been installed in the terminal apparatus 16 or use permission of the software is not given), information indicating an operation or the like necessary to use the software may be displayed in the aerial display space. For example, information that prompts the user to install the software, information indicating an operation necessary to obtain a use right, or any other suitable information is displayed.

The image forming device 10, the server 14, and the terminal apparatus 16 are each implemented by using hardware and software in cooperation of each other, as an example. Specifically, each of the image forming device 10, the server 14, and the terminal apparatus 16 includes one or more processors such as a central processing unit (CPU) (not illustrated). The one or more processors read and execute a program stored in a storage device (not illustrated), thereby implementing the function of each unit of the image forming device 10, the server 14, and the terminal apparatus 16. The program is stored in the storage device via a recording medium such as a compact disc (CD) or a digital versatile disk (DVD) or via a communication path such as a network. As another example, the units included in each of the image forming device 10, the server 14, and the terminal apparatus 16 may be implemented by hardware resources such as a processor, an electronic circuit, or an application specific integrated circuit (ASIC). In the implementation of the units included in each of the image forming device 10, the server 14, and the terminal apparatus 16, a device such as a memory may be used. As still another example, the units included in each of the image forming device 10, the server 14, and the terminal apparatus 16 may be implemented by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a controller configured to:
display a plurality of images intended for collaboration in an aerial display space;
acquire image identification information based on the plurality of images;
display a plurality of functions in the aerial display space using the image identification information;
display a notification of a collaboration function executable when information on at least one image is dragged and dropped by an operation performed by a user in a depth direction to superimpose on top of at least one of the plurality of images or the plurality of functions;
provide instruction to execute collaborative function.

2. The information processing apparatus according to claim 1, wherein the controller is configured to control display of the at least one image in accordance with the information in the depth direction of the at least one image.

3. The information processing apparatus according to claim 2, wherein the controller is configured to control a color depth used to display the at least one image.

4. The information processing apparatus according to claim 3, wherein the information in the depth direction of the at least one image indicates a position designated by a user in the depth direction in the at least one image being displayed in the aerial display space, and the controller is configured to cause an image portion of the at least one image closer to the user relative to the designated position to be displayed in a lighter color.

5. The information processing apparatus according to claim 1, wherein the information in the depth direction of the at least one image indicates a position designated by the user in the depth direction in the at least one image among the plurality of images being displayed in the aerial display space, and the controller is configured to provide a notification of a collaborative function executable using a function interrelated with the position designated by the user in the depth direction.

6. The information processing apparatus according to claim 5, wherein the controller performs control to provide a notification of a collaborative function executable using a function interrelated with a partial image in the at least one image including the position designated by the user in the depth direction.

7. The information processing apparatus according to claim 5, wherein the information on which the operation is performed by the user corresponds to the at least one image being a device image interrelated with a device or a function image interrelated with a function.

8. The information processing apparatus according to claim 5, wherein the information on which the operation is performed by the user corresponds to the plurality of images including a device image interrelated with a first device and a device image interrelated with a second device, each of the first device and the second device having a communication function, and
wherein the first device includes
a plurality of communication units, wherein one of the plurality of communication units communicates with the second device, and
an execution controller that performs control to execute a collaborative function executable using the first device and the second device in response to the one of the plurality of communication units communicating with the second device in accordance with a specific communication standard.

9. The information processing apparatus according to claim 1, wherein the controller sets priority on notifications of functions included in the collaborative function in accordance with the operation performed by the user on the information in the depth direction of the at least one image among the plurality of images being displayed in the aerial display space.

10. The information processing apparatus according to claim 9, wherein the controller sets priority on notifications of the functions included in the collaborative function in accordance with an order in which the plurality of images are superimposed on top of each other in accordance with the pieces of information in the depth direction of the plurality of images.

11. The information processing apparatus according to claim 9, wherein the controller sets priority on the notifications of the functions included in the collaborative function in accordance with a positional relationship between pieces of information in the depth direction of the plurality of images, the positional relationship being designated by the operation performed by the user.

12. The info nation processing apparatus according to claim 11, wherein the controller assigns priorities to the plurality of images in order with highest priority given to an image located at a position closest to the user.

13. The information processing apparatus according to claim 9, wherein the controller sets priority on the notifications of the functions included in the collaborative function in accordance with an order in which the user joins the plurality of images being displayed in the aerial display space together in accordance with the pieces of information in the depth direction of the plurality of images.

14. The information processing apparatus according to claim 1, wherein in response to a user performing an operation on the information in the depth direction of the at least one image, the controller provides a notification in accordance with the user who performs the operation.

15. The information processing apparatus according to claim 14, wherein in response to detection of a plurality of users who are to perform an operation on the information in the depth direction of the at least one image, the controller provides a notification to objects each assigned to one of the plurality of users.

16. The information processing apparatus according to claim 15, wherein each of the objects is a display other than the aerial display space.

17. A non-transitory computer readable medium storing a program causing a computer to execute a process for information processing, the process comprising:
    displaying a plurality of images intended for collaboration in an aerial display space;
    acquiring image identification information based on the plurality of images;
    displaying a plurality of functions in the aerial display space using the image identification information;
    displaying a notification of a collaboration function executable when information on at least one image is dragged and dropped by an operation performed by a user in a depth direction to superimpose on top of at least one of the plurality of images or the plurality of functions;
    providing instruction to execute collaborative function.

* * * * *